United States Patent
Salem et al.

(10) Patent No.: US 11,870,373 B2
(45) Date of Patent: Jan. 9, 2024

(54) PREDICTIVE TORQUE CONTROL AND CAPACITOR BALANCING OF A SILICON-CARBIDE BASED DUAL T-TYPE DRIVE SYSTEM

(71) Applicant: King Fahd University of Petroleum and Minerals, Dhahran (SA)

(72) Inventors: Aboubakr Salem, Dhahran (SA); Mohamed Ali Abido, Dhahran (SA); Mohamed Mamdouh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/814,137

(22) Filed: Mar. 10, 2020

(65) Prior Publication Data
US 2023/0198436 A1 Jun. 22, 2023

(51) Int. Cl.
H02P 21/00 (2016.01)
(52) U.S. Cl.
CPC ................. *H02P 21/0017* (2013.01)
(58) Field of Classification Search
CPC .................................................. H02P 21/0017
See application file for complete search history.

(56) References Cited

U.S. PATENT DOCUMENTS

| | | | |
|---|---|---|---|
| 6,281,659 B1 * | 8/2001 | Giuseppe ................ | H02P 21/18 318/807 |
| 11,119,457 B2 * | 9/2021 | El Shormbably ...... | G05B 17/02 |
| 11,515,818 B2 * | 11/2022 | Salem ..................... | H02P 21/20 |
| 2017/0160760 A1 * | 6/2017 | Blasko ................. | G05B 13/048 |

FOREIGN PATENT DOCUMENTS

| | | |
|---|---|---|
| CN | 107453664 A | 12/2017 |
| CN | 106059428 B | 7/2019 |
| WO | 2019/051621 A1 | 3/2019 |

OTHER PUBLICATIONS

Salem, et al. ; DC Link Capacitor Voltage Balancing of a Dual Three-Level T-Type AC Drive Using Switching State Redundancy. ; IEEE 2017 ; 8 Pages.
Zhang, et al. ; Predictive Torque Control of Induction Machines Fed by 3L-NPC Converters with Online Weighting Factor Adjustment using Fuzzy Logic ; IEEE 2017 ; 6 Pages.
Sale ; Design and analysis of five-level T-type power converters for rotating field drives ; Thesis ; Jan. 2015 ; 208 Pages.
Shen, et al. ; Finite Control Set Model Predictive Control with Feedback Correction for Power Converters ; CES Transactions on Electrical Machines and Systems, vol. 2, No. 3 ; Sep. 2018 ; 8 Pages.

(Continued)

*Primary Examiner* — Kawing Chan
(74) *Attorney, Agent, or Firm* — Oblon, McClelland, Maier & Neustadt, L.L.P.

(57) ABSTRACT

Capacitor balancing of a dual three-level (3L) T-type converter based on silicon carbide (SiC) discrete semiconductors was performed with the converter feeding an open-ends induction motor (OEIM). A model predictive control (MPC) using a two step cost function calculation was developed to balance the DC link capacitors and control the machine torque simultaneously. The number of redundant switching states used was reduced without affecting the operating voltage vectors, which substantially reduced the computational time. A simulation and experimental results are in good agreement.

10 Claims, 34 Drawing Sheets

(56) References Cited

OTHER PUBLICATIONS

Newark ; LV 25-P—Voltage Transducer, 10 mA, +/−15V, PCB ; Jan. 23, 2020 ; 3 Pages.
LEM ; LA 55-P—Current Transducer, LA Series, 50A,—70A to 70A, 0.9%, Closed Loop Output, 12 Vdc to 15 VDC ; Jan. 23, 2020 ; 2 Pages.
ASES ; DS1103 PPC Contoller Board ; Jan. 23, 2020 ; 3 Pages.
Wang, et al. ; Model Predictive Control for Electrical Drive Systems—An Overview ; CES Transactions on Electrical Machines and Systems, vol. 1, No. 3 ; Sep. 2017 ; 12 Pages.
Wolfspeed ; C2M0080120D ; Jan. 23, 2020 ; 9 Pages.
Wolfspeed ; CGD15HB62P1 2cd GateDriver 1200-V SiC MOSFET ; Jan. 23, 2020 1 6 Pages.
Chroma Systems Solutions ; Modular DC Electronic Load—63600 ; Jan. 27, 2020 ; 5 Pages.

\* cited by examiner

PREDICTIVE TORQUE CONTROL AND CAPACITOR BALANCING OF A SILICON-CARBIDE BASED DUAL T-TYPE DRIVE SYSTEM

STATEMENT REGARDING PRIOR DISCLOSURE BY THE INVENTORS

Aspects of this technology are described in an article "Predictive Torque Control and Capacitor Balancing of a SiC-Based Dual T-Type Drive System" published in IEEE Transactions on Power Electronics, Vol. 35, Issue 3, 10704-10711, on Jul. 31, 2019, which is incorporated herein by reference in its entirety.

STATEMENT OF ACKNOWLEDGEMENT

The inventors would like to acknowledge the support provided by the Center of Energy and Geo-Processing (CeGP), King Fand University of Petroleum and Minerals, through Project No. GTEC1701. Additionally, the inventors would like to acknowledge the funding support provided by King Abdullah City for Atomic and Renewable Energy (K.A.CARE).

BACKGROUND

Technical Field

The present disclosure is directed to methods and systems for predictive torque control and capacitor balancing of a silicon-carbide (SiC) based dual T-type drive system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Multilevel converters (MLCs) have been preferred for medium voltage and high power industrial applications rather than conventional two-level (2L) voltage source converters (VSCs), as higher harmonic contents associated with 2L VSCs affect drive losses and life-time. (See N. Margarita, S. Kouro, S. Dieckerhoff, and J. Rodriguez. "Reduced Multilevel Converter: A Novel Multilevel Converter With a Reduced Number of Active Switches." *IEEE Transactions on Industrial Electronics* 65, no. 5 (2018): 3636-3645, incorporated herein by reference in its entirety).

A diode-clamped converter (DCC), named "T-type" converter, has been a topic of research. A three-level, T-type MLC based on discrete semiconductor switches was described in 2011. (See M. Schweizer; J. W. Kolar, "High efficiency drive system with 3-level T-type inverter." In *Power Electronics and Applications (EPE 2011), Proceedings of the* 2011-14th *European Conference on,* pp. 1-10. IEEE, 2011, incorporated herein by reference in its entirety).

Power modules for a single-phase three-level (3L) T-type MLCs became commercially available in early 2013. Two different five-level (5L) T-type topologies were proposed. (See A. Salem, M. F. Elsied, J. Druant, F. De Belie, A. Oukaour, H. Gualous, and J. Melkebeek. "An advanced multilevel converter topology with reduced switching elements." In *Industrial Electronics Society, IECON* 2014-40th *Annual Conference of the IEEE,* pp. 1201-1207. IEEE, 2014; M. Elsied, A. Salem, A. Oukaour, H. Gualous, H. Chaoui, T. Youssef, F. De Belie, J. Melkebeek, and O. Mohammed. "Efficient power-electronic converters for electric vehicle applications." In 12th *IEEE Vehicle Power and Propulsion Conference (VPPC),* pp. 978-983. 2015; and H. Vahedi, S. Rahmani, and K. Al-Haddad. "Pinned mid-points multilevel inverter (PMP): three-phase topology with high voltage levels and one bidirectional switch." In *Industrial Electronics Society, IECON* 2013-39th *Annual Conference of the IEEE,* pp. 102-107. IEEE, 2013, each incorporated herein by reference in their entirety).

Modifications to T-type converters have been investigated for a single-phase converter. (See B. Peter, P. Steimer, L. Meysenc, M. Winkelnkemper, J. Steinke, and N. Celanovic, "Active neutral point clamped multilevel converters." In *Power Electronics Specialists Conference,* 2005. *PESC'05. IEEE* 36th, pp. 2296-2301. IEEE, 2005; J. Korhonen, S. Arto, S. Juha-Pekka, and S. Pertti, "Hybrid five-level T-type inverter." In *Industrial Electronics Society, IECON* 2014-40th *Annual Conference of the IEEE,* pp. 1506-1511. IEEE, 2014; and A. Saddam, S. Mekhilef, and H. Mokhlis. "Proposed new N-multilevel family of topologies for T-type inverter." *IEICE Electronics Express* 14, no. 15 (2017): 20170342-20170342, each incorporated herein by reference in their entirety).

The T-type topology has the advantage of using fewer semiconductor switches than diode-clamped converters (DCC). Additionally, the T-type topology achieves higher efficiency than a DCC or a conventional 2L VSC. Studies of T-type converters using Silicon Carbide (SiC) semiconductors have shown that the switching performance of the metal-oxide semiconductor field-effect transistor (MOSFET) is improved compared to conventional silicon (Si) semiconductor switches. (See Fairchild "Renewable energy solutions: energy efficient components for PV solar systems." *Fair-Child Application Note* (2012), incorporated herein by reference in its entirety).

A single-phase SiC based T-type circuit using discrete MOSFET was implemented and compared to a single-phase Si IGBT based T-type circuit. (See G. Mingchen, P. Xu, L. Zhang, and K. Sun. "A SiC-based T-type three-phase three-level grid tied inverter." *Industrial Electronics and Applications (ICIEA),* 2015 *IEEE* 10th *Conference on,* pp. 1116-1121. IEEE, 2015; G. Emre, and A. Castellazzi, "Single-phase T-type inverter performance benchmark using Si IGBTs, SiC MOSFETs and GaN HEMTs." *IEEE Transactions on Power Electronics* 31, no. 10 (2016): 7148-7160; and A. Anthon, Z. Zhe, A. Michael A E, H. Grahame, M. Brendan, and A. Carlos, "The Benefits of SiC MOSFETs in a T-Type Inverter for Grid-Tie Applications." *IEEE Transactions on Power Electronics* 32, no. 4 (2017): 2808-2821, each incorporated herein by reference in their entirety). The SiC-based converter was shown to have higher performance and be more efficient. However, the use of SiC switches in a three-phase converter using discrete MOSFETs was not studied due to electromagnetic interference (EMI) problems in the printed circuit board (PCB), in particular for a high number of voltage levels.

A three-phase converter prototype using SiC power modules was designed using external hardware for capacitor balancing. (See Y. Shi, S. Yuxiang, W. Lu, X. Ren, and L. Hui, "A 50 kW high power density paralleled-five-level PV converter based on SiC T-type MOSFET modules." In *Energy Conversion Congress and Exposition (ECCE),* 2016 *IEEE,* pp. 1-8. IEEE, 2016, incorporated herein by reference in its entirety). However, the use of external hardware for capacitor balancing increased the converter size and complexity.

Model predictive control (MPC) has been used to drive power converters. (See F. Wang, X. Mei, J. Rodriguez, and R. Kennel, "Model Predictive Control for Electrical Drive Systems—An Overview," Ces Trans. Electr. Mach. Syst., vol. 1, no. 3, pp. 219-230, 2017; S. Vazquez, J. Rodriguez, M. Rivera, L. G. Franquelo, and M. Norambuena, "Model Predictive Control for Power Converters and Drives: Advances and Trends," IEEE Trans. Ind. Electron., vol. 64, no. 2, pp. 935-947, 2017; and S. Vazquez, J. I. Leon, L. G. Franquelo, J. Rodriguez, H. a. Young, A. Marquez, and P. Zanchetta, "Model predictive control: A review of its applications in power electronics," IEEE Ind. Electron. Mag., vol. 8, no. 1, pp. 16-31, 2014, each incorporated herein by reference in their entirety). In particular, a finite control set MPC (FCS-MPC) has been shown to accommodate the discrete nature of a power converter and represents a potential alternative to avoid sophisticated pulse width modulation (PWM) techniques required for complex power converters. (See P. Q. Dzung, D. Nguyen, T. Nguyen, and C. Nguyen, "Model predictive current control for T-type NPC inverter using new on-line inductance estimation method." In Region 10 Conference (TENCON), 2016 IEEE, pp. 316-321. IEEE, 2016; J. Barros, Dionísio, J. Fernando A. Silva, and J. Élvio, "Fast-predictive optimal control of NPC multilevel converters." IEEE Transactions on Industrial Electronics 60, no. 2 (2013): 619-627; and K. Shen, J. Feng, and J. Zhang, "Finite control set model predictive control with feedback correction for power converters", CES Transactions On Electrical Machines And Systems, Vol. 2, No. 3, September 2018, each incorporated herein by reference in their entirety).

MPC is an advanced method of process control that is used to control a process while satisfying a set of constraints. This method is based on iterative, finite-horizon optimization of a plant model, such as power system balancing models. At time t the current plant state is sampled and a cost minimizing control strategy is computed (via a numerical minimization algorithm) for a relatively short time horizon in the future: [t, t+T]. Specifically, an online or on-the-fly calculation is used to explore state trajectories that emanate from the current state and find (via the solution of Euler-Lagrange equations) a cost-minimizing control strategy until time t+T. Only the first step of the control strategy is implemented, then the plant state is sampled again and the calculations are repeated starting from the new current state, yielding a new control and new predicted state path. The prediction horizon keeps being shifted forward. The advantage of MPC is that it allows a current timeslot to be optimized, while taking into account future timeslots. This is achieved by optimizing a finite time-horizon, but only implementing the current timeslot and then optimizing again repeatedly. Additionally, MPC can anticipate future events and take control actions accordingly. Proportional integral derivative (PID) controllers do not have this predictive ability.

In finite control set model predictive control (FCS-MPC), the converter voltage vectors (VVs) were tested individually in a predefined cost function. The voltage vector that minimized the cost function was selected as the optimal one and applied to the next control sample. The cost function aggregated the deviations in the predicted values of controlled variables compared to their reference values.

Reduction of the computational cost has been investigated for different converter topologies including a Quasi Z-source inverter, a four-level flying capacitor converter, and a three-level modular multilevel converter. (See A. Bakeer, I. Mohamed, and O. Mohamed. "Simple cost function and low calculations MPC algorithm for qZSI." In 2015 IEEE International Telecommunications Energy Conference (INTELEC), pp. 1-6. IEEE, 2015; N. Margarita, C. Garcia, J. Rodriguez, and P. Lezana. "Finite control set model predictive control reduced computational cost applied to a flying capacitor converter." In IECON 2017-43rd Annual Conference of the IEEE Industrial Electronics Society, pp. 4903-4907. IEEE, 2017; and G., Bryan, and S. Kwak. "Model predictive control method with preselected control options for reduced computational complexity in modular multilevel converters (MMCs)." In 2018 20th European Conference on Power Electronics and Applications (EPE'18 ECCE Europe), pp. P-1. IEEE, 2018, each incorporated herein by reference in their entirety). However, the simplification method in Margarita et al. reduced the degree of freedom for one of the control terms that can negatively affect the control response with the other redundant switching states. In the technique used by Bryan et al., the number of control options became very complex for higher voltage levels or for converter submodules.

Capacitor balancing of T-type topologies has been achieved using model predictive control and switching states redundancy. The inclusion of capacitor balancing in the MPC cost function imposes computation difficulties due to weighting factor tuning. In addition, the higher number of admissible MLC switching states results in a longer execution time of the control algorithm, which negatively affects the performance of the controlled system. The prediction has been performed using the overall number of 27 switching states of the T-type converter. This technique reduced the computation for a three level (3L) DCC converter within one switching state evaluation, but still used the whole 27 switching states in the prediction technique. However, implementing the prediction techniques with dual 3L T-type converter is much more computationally expensive as the number of states is 729. (See Barros et al.; M. Saeedifard, I. Reza, and P. Josep, "Analysis and control of DC-capacitor-voltage-drift phenomenon of a passive front-end five-level converter." IEEE Transactions on Industrial Electronics 54, no. 6 (2007): 3255-3266; and V. Yaramasu, W. Bin, R. Marco, N. Mehdi, S. Kouro, and J. Rodriguez, "Generalised approach for predictive control with common-mode voltage mitigation in multilevel diode-clamped converters." IET Power Electronics8, no. 8 (2015): 1440-1450; Dzung et al.; Barros et al.; and A. Salem, T. Youssef, F. De Belie, J. Melkebeek, O. Mohammed, and M. Abido. "DC link capacitor voltage balancing of a dual three-level T-Type AC drive using switching state redundancy." In 10th Biennial International Electric Machines and Drives Conference. 2017; a. Salem, M. Mamdouh, M. Abido, "Capacitor Balancing and Common-Mode Voltage Reduction of a SiC Based Dual T-type Drive System Using Model Predictive Control", IEEE Access, Vol. 7, Mar. 25, 2019; each incorporated herein by reference in their entirety).

Accordingly, it is one object of the present disclosure to provide methods and systems for reducing the number of evaluations used to predict the optimal solution for multilevel converters. Since the torque and flux are voltage vector dependent while the capacitor voltage balancing is switching state-dependent, the evaluation of the cost function is divided into two cascaded steps. In the first step, the torque and flux cost function is considered while the capacitor voltage balancing is performed in the second step. Therefore, the conventional weighting factor step of the capacitor voltage balancing is eliminated and the total number of evaluations as well as the computational time is substantially reduced. In addition, the present disclosure describes a SiC based dual 3L T-type converter topology based on discrete MOSFETs. A SiC based dual 3L T-type converter was connected to an open-ends induction motor (OEIM) and tested under different capacitor voltage balancing cases. Torque and flux deviations were controlled and capacitor voltage balancing of the multilevel converter was performed. Simulation and experimental results are in agreement.

SUMMARY

In an exemplary embodiment, a method for torque control and capacitor balancing of a dual three-level T-type multilevel converter connected to an open ends three-phase induction motor (OEIM) having a stator and a rotor is described, each multilevel converter including two capacitors and a plurality of silicon carbide (SiC) semiconductor switches, comprising selecting a first set of voltage vectors; evaluating a first cost function ($J_1$) for each voltage vector of the first set of voltages vectors to generate a set of first cost functions, minimizing the set of first cost functions, identifying the voltage vector which minimizes the first cost function, identifying four redundant switching states of the voltage vector which minimizes the first cost function, evaluating a second cost function ($J_2$) using the four redundant switching states and generating a set of second cost functions, minimizing the set of second cost functions, identifying the switching state which minimizes the second cost function, updating the switching states with the switching state which minimizes the second cost function, generating gating signals for the SiC semiconductor switches using the switching state which minimizes the second cost function, applying the gating signals to the SiC semiconductor switches to actuate the OEIM and balance the capacitors.

In another exemplary embodiment, a system for torque control and capacitor balancing of a dual three-level T-type multilevel converter connected to an open ends three-phase induction motor (OEIM) having a stator and a rotor and first, second and third parallel phase paths connected between a first end and a second end is described, comprising a first three-level T-type converter connected to the first end of the OEIM and a second three-level T-type converter connected to the second end of the OEIM, a first voltage source block connected to the first converter and a second voltage source block connected to the second converter, each voltage source block including a first capacitor in series with a second capacitor, wherein each voltage source block has a positive connector, a negative connector and a common connector, wherein each three-level T-type converter includes first, second and third phase legs, each phase leg including first and second series connected switches, wherein the first switch is connected to the common connector and the second switch is connected to a terminal of one of the phase paths, a third switch connected between the positive connector and the terminal of the one of the phase paths and a fourth switch connected to the negative connector and the terminal of the one of the phase paths, a plurality of sensors to measure system parameters, a control system having circuitry connected to the switches of each three-level T-type converter and the plurality of sensors, the control system including program instructions stored within that, when executed by one or more processor, cause the one or more processors to generate gating signals to the switches which reduce torque and flux deviation in the OEIM and balance the capacitor voltages.

In another exemplary embodiment, a non-transitory computer readable medium is described having instructions stored therein that, when executed by one or more processors, cause the one or more processors to perform a method for torque control and capacitor balancing of a dual three-level (3L) T-type multilevel converter connected to an open ends three-phase induction motor (OEIM) having a stator and a rotor and first, second and third parallel phase paths connected between a first end and a second end, each multilevel converter including two capacitors and a plurality of silicon carbide (SiC) semiconductor switches, comprising selecting a first set of voltage vectors, evaluating a first cost function ($J_1$) for each voltage vector of the first set of voltages vectors and generating a set of first cost functions, minimizing the set of first cost functions, identifying the voltage vector which minimizes the first cost function, selecting four redundant switching states of the voltage vector which minimizes the first cost function, evaluating a set of second cost functions ($J_2$) for the four redundant switching states to generate a set of second cost functions, minimizing the set of second cost functions, identifying the switching state which minimizes the second cost function, updating the switching states with the switching state which minimizes the second cost function, generating gating signals for the SiC semiconductor switches using the switching state which minimizes the second cost function, and applying the gating signals to the SiC semiconductor switches to actuate the OEIM and balance the capacitors.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
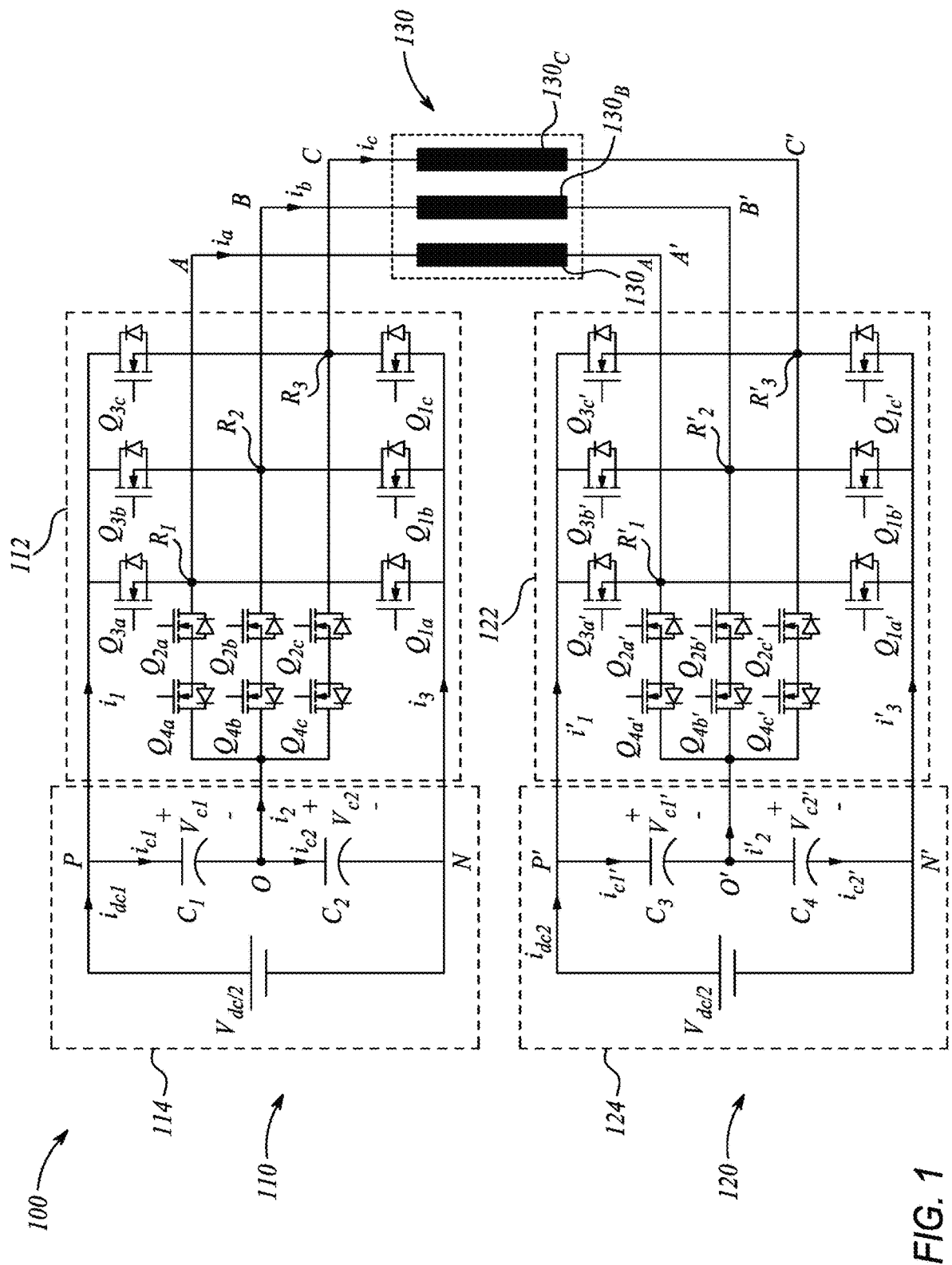
FIG. 1 illustrates a wiring diagram of a dual T-type 5L converter connected to a three-phase OEIM.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a method for torque control and capacitor balancing of a dual three-level (3L) T-type multilevel converter connected to an open ends three-phase induction motor (OEIM), a system for torque control and capacitor balancing of a dual three-level T-type multilevel converter connected to an open ends three-phase induction motor (OEIM), and a non-transitory computer readable medium having instructions stored therein that, when executed by one or more processors, cause the one or more processors to perform a method for torque control and capacitor balancing of a dual three-level T-type multilevel converter connected to an open ends three-phase induction motor (OEIM).

Applications of the methods and system of the present disclosure may be applied to drive an OEIM connected to a motor shaft using battery power, DC power, AC power with a transformer, etc., such as an electric vehicle, or industrial machinery such as punch presses, bulldozers, fans, blowers, pumps and die stamping machines or the like. Induction motors are widely employed in the electrical field and about 90% of industry machines use induction motors.

Figure 10:
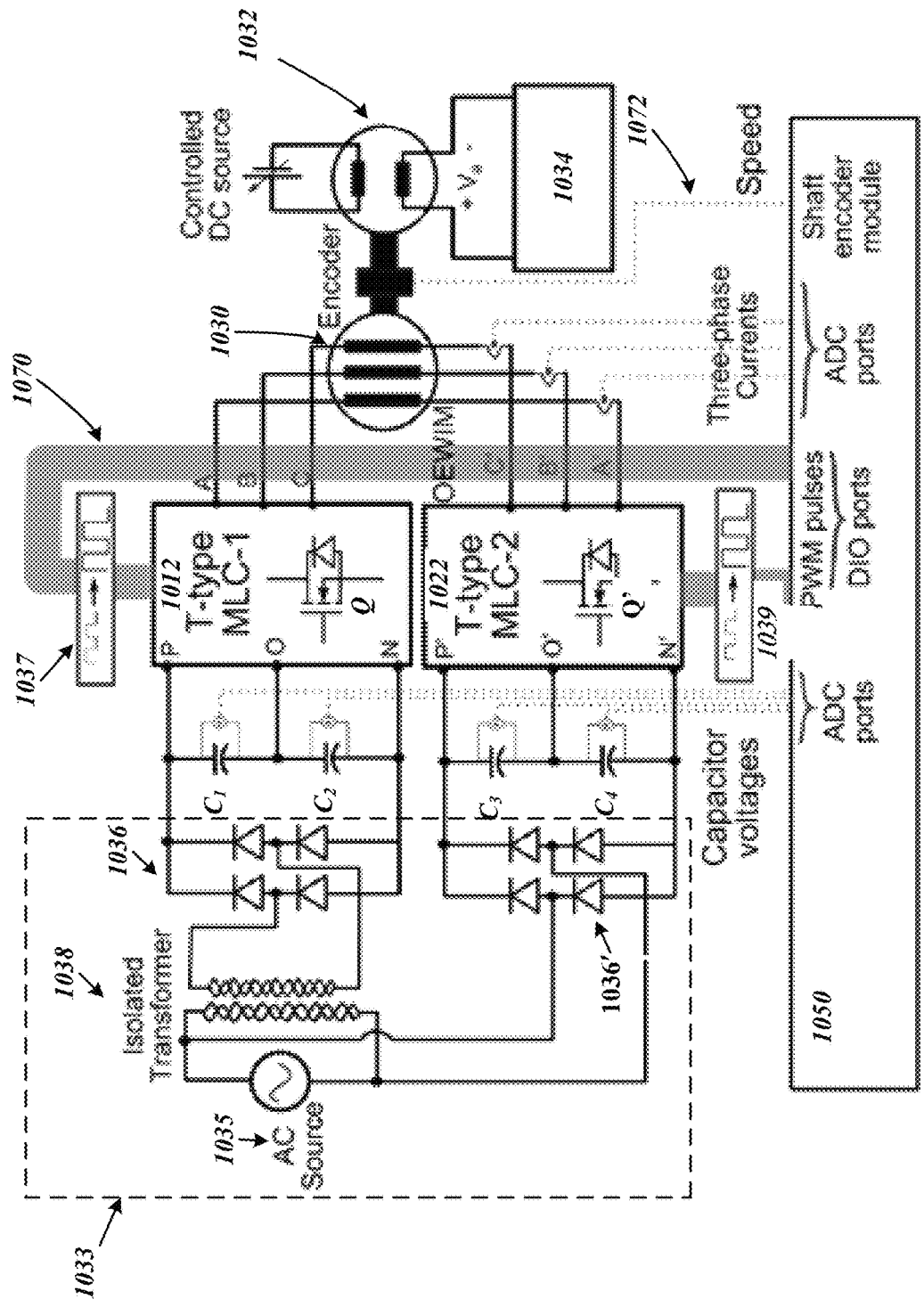
FIG. 10 illustrates a block diagram for the experimental dual T-type 3L converter.

FIG. 1 shows the power circuit of a dual T-type three-level (3L) converter 100 connected to a three-phase open-ends induction motor (OEIM) 130. The OEIM has three phase paths ($130_A$, $130_B$, $130_C$), each phase path having a first end connected to converter 112 and a second end connected to converter 122. Each phase path $130_A$, $130_B$, $130_C$ carries a different phase of the current provided by the converters. Each three-level (3L) T-type converter (112, 122) consists of twelve semiconductor switches that can be classified as horizontal controllable switches ($Q_{2x}$ and $Q_{4x}$; x is a, b and c) and vertical controllable switches ($Q_{1x}$ and $Q_{3x}$). Each converter (112, 122) is connected to two capacitors in a T-type configuration. Converter 112 is connected across points P-N, and converter 122 is connected across points P'-N'. Capacitors $C_1$ and $C_2$ provide voltages $V_{c1}$ and $V_{c2}$ and are in parallel with voltage supply $V_{dc/2}$. The voltages $V_{c1}$ and $V_{c2}$ may be provided by a source block 1033 as shown in FIG. 10. The common point "O" between capacitors $C_1$ and $C_2$ connects to a three-phase circuit (thus a T-type), each leg consisting of switches $Q_{4x}$ and $Q_{2x}$, (x=a, b, c), in series. The bypass diode of $Q_{4x}$ is arranged in opposite polarity (antiparallel) to the bypass diode of $Q_{2x}$. Each switch $Q_{4x}$ and $Q_{2x}$ may be activated so as to control conduction through each leg. Controllable switches $Q_{3x}$ and $Q_{1x}$ may be activated to control the polarity of the output voltage to each phase (A, B, C) of the motor 130. For example, if $Q_{3a}$ is ON and $Q_{1a}$ is OFF, the voltage at point $R_1$ is $V_{dc}/2$. Similarly, converter 122 is operated to provide either positive or negative current to phases A', B' and C' at voltage levels $V_{dc}/2$. The voltage across each leg of the OEIM may be 0, $V_{dc}/2$ or $V_{dc}$ depending on the state of the switches Q. Some of the switching control patterns are shown in Tables I to III below.

Aspects of the present disclosure describe mathematical modeling of the dual T-type converter. The switching function model is a mathematical representation for the voltage source converters that aims to obtain a clear view of the converter output voltage based on all possible switching states. (See D. G. Holmes, T. Lipo, "Pulse Width Modulation for Power Converters: Principles and Practice," Book, USA: Wiley-IEEE Press, John Willy and Sons, Inc., October 2003, incorporated herein by reference in its entirety). The modes of operation of the dual T-type converter are summarized in Table I.

TABLE I

MODES OF OPERATION OF A
DUAL T-TYPE: PHASE AA'

| Converter-1 | $m_A$ | point | Converter-2 | $m_A'$ | point |
|---|---|---|---|---|---|
| $Q_{3a}$, $Q_{4a}$ | 1 | P | $Q_{3a'}$, $Q_{4a'}$ | 1 | P' |
| $Q_{2a}$, $Q_{4a}$ | 0 | O | $Q_{2a'}$, $Q_{4a'}$ | 0 | O' |
| $Q_{1a}$, $Q_{2a}$ | −1 | N | $Q_{1a'}$, $Q_{2a'}$ | −1 | N' |

Figure 2:
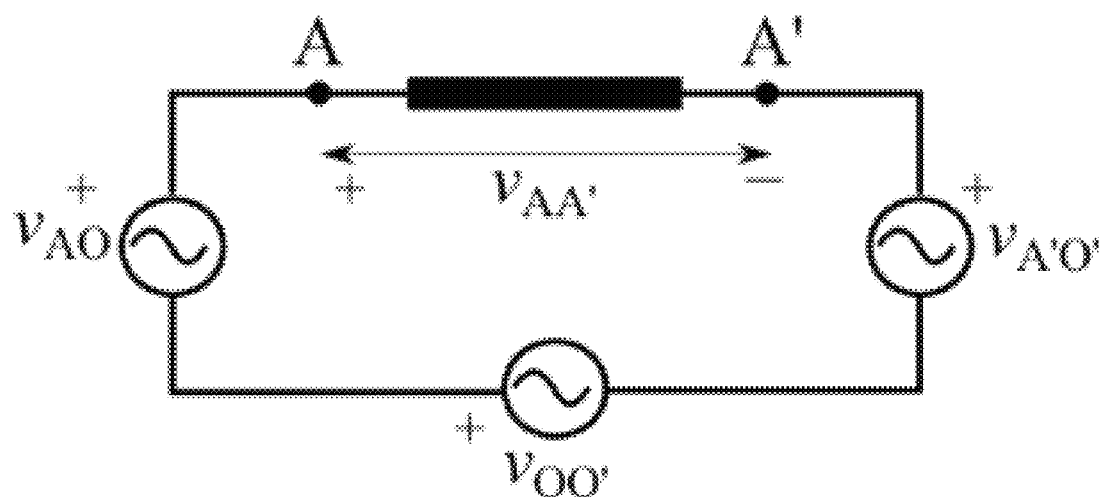
FIG. 2 illustrates the KVL loop for phase AA' of FIG. 1.

Assuming $m_X$ is the switching function that connects phase X to P, N, or O, where X is A, B, or C for converter 110 and converter 120 has the same symbols with a prime. P stands for the positive voltage point, N stands for negative voltage point and O stands for the neutral voltage point. This switching function ($m_x$) can be 1, −1, or 0 as shown in Table I for phase AA' (see FIG. 1, 2). The terminal voltages for each T-type converter can be described as:

$$v_{XO} = m_X \frac{V_{dc}}{4}, v_{X'O'} = m_{X'} \frac{V_{dc}}{4} \qquad (1)$$

where $V_{dc}$ is the DC link voltage. A single circuit for phase AA', which is extracted from the three-phase circuit in FIG. 1, is shown in FIG. 2. Applying Kirchhoff Voltage Law, the voltage across AA' can be described by:

$$v_{AA'} = v_{AO} + v_{OO'} - v_{A'O'} \qquad (2)$$

For a balanced load, the summation of the three-phase voltages equals zero. Hence, by summing the three-phase voltages $v_{AA'}$, $v_{BB'}$ and $v_{CC'}$, the voltage $v_{OO'}$ (see FIG. 1) can be expressed as:

$$-v_{OO'} = \frac{1}{3}(v_{AO} + v_{BO} + v_{CO} - v_{A'O'} - v_{B'O'} - v_{C'O'}) \qquad (3)$$

By substituting (1) and (3) into (2), the phase voltage $v_{AA'}$ can be expressed as:

$$v_{AA'} = \frac{V_{dc}}{6}\left(m_A - m_{A'} - \frac{1}{2}(m_B - m_{B'} + m_C - m_{C'})\right) \qquad (4)$$

By applying the switching function possibilities given in Table I, 17 different phase-voltage levels can be obtained similar to those of the conventional 5L diode-clamped converter (DCC). Similarly, the voltages $v_{BB'}$ and $v_{CC'}$ can be derived by substitution of subscripts.

The possible connections for phase A of a single T-type converter can be described in Table II. To attain the voltage of point P or N, switches $Q_{3a}$ or $Q_{1a}$ need to be turned on, respectively. Similarly, to attain the voltage of point O, the switches $Q_{2a}$ and $Q_{4a}$ have to be turned on together. However, as listed in Table III, two switches are required to be turned on to connect P or N points to phase A. Basically, the sequence listed in Table III reduces the switching stresses on the converter. (See A. Salem, "Design and analysis of five-level T-type power converters for rotating field drives." PhD diss., Electrical Energy System and Automation Dept. Ghent University, 2015, incorporated herein by reference in its entirety). Likewise, the possible connections for phase $v_{AA'}$ for a dual T-type converter topology are described in Table III. The possible switching states for a 3L T-type converter are given by $m^3$, where m is the number of voltage levels in the connected DC link (P, N, O), which gives 27 states (as $3^3=27$). However, this relation is not applicable to the dual converter configuration as the DC links are isolated. The total number of switching states for the dual 3L T-type converter is $27^2=729$ switching states. The number of $m^3$ switching states for the dual 3L T-type topology is 729.

TABLE II

POSSIBLE CONNECTIONS FOR PHASE A OF THE 3-LEVEL T-TYPE

| Level | $Q_{1a}$ | $Q_{2a}$ | $Q_{3a}$ | $Q_{4a}$ | $V_A$ |
|---|---|---|---|---|---|
| P | 0 | 0 | 1 | 1 | $+V_{dc}/2$ |
| O | 0 | 1 | 0 | 1 | 0 |
| N | 1 | 1 | 0 | 0 | $-V_{dc}/2$ |

TABLE III

POSSIBLE CONNECTIONS FOR PHASE A OF THE DUAL T-TYPE

| Converter I | Converter II | Points | VAA' |
|---|---|---|---|
| $Q_{3a}, Q_{4a}$ | $Q_{1a'}, Q_{2a'}$ | P-N' | $+V_{dc}$ |
| $Q_{3a}, Q_{4a}$ | $Q_{2a'}, Q_{4a'}$ | P-O' | $+V_{dc}/2$ |
| $Q_{2a}, Q_{4a}$ | $Q_{1a'}, Q_{2a'}$ | O-N' | |
| $Q_{3a}, Q_{4a}$ | $Q_{3a'}, Q_{4a'}$ | P-P' | 0 |
| $Q_{2a}, Q_{4a}$ | $Q_{2a'}, Q_{4a'}$ | O-O' | |
| $Q_{1a}, Q_{2a}$ | $Q_{1a'}, Q_{2a'}$ | N-N' | |
| $Q_{2a}, Q_{4a}$ | $Q_{3a'}, Q_{4a'}$ | O-P' | $-V_{dc}/2$ |
| $Q_{1a}, Q_{2a}$ | $Q_{2a'}, Q_{4a'}$ | N-O' | |
| $Q_{1a}, Q_{2a}$ | $Q_{3a'}, Q_{4a'}$ | N-P' | $-V_{dc}$ |

Figure 3:
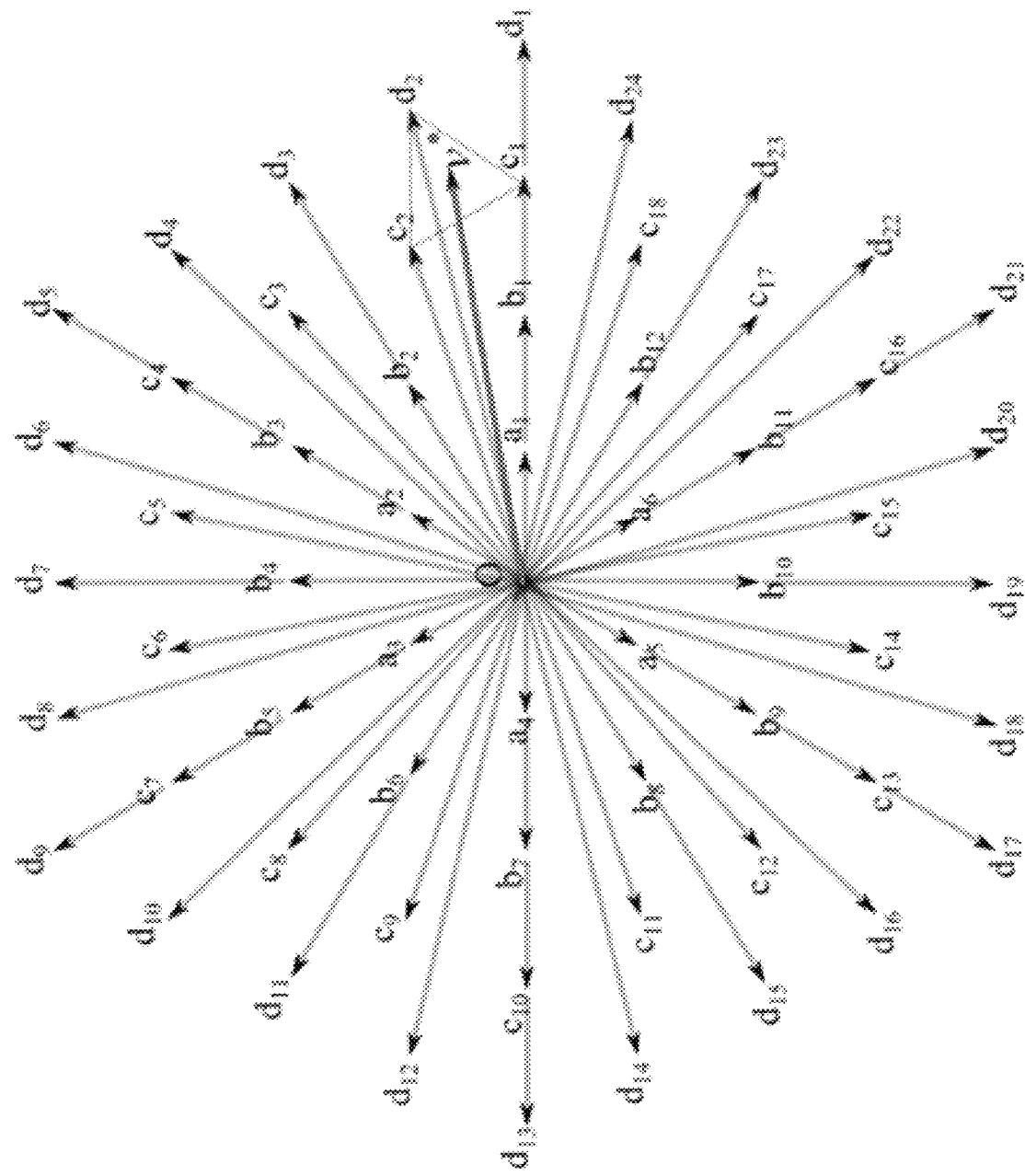
FIG. 3 is a vector diagram illustrating the voltage vectors of the dual T-type MLC.

By applying these 729 states, the vector diagram of this converter can be described by the hexagon shown in FIG. 3 (5L vector diagram). It consists of 61 vectors, i.e. O, $a_1$-$a_6$, $b_1$-$b_{12}$, $c_1$-$c_{18}$, and $d_1$-$d_{24}$. The 729 switching states and their corresponding voltage vectors are summarized by A. Salem, (See: A. Salem, "Design and analysis of five-level T-type power converters for rotating field drives." PhD diss., Electrical Energy System and Automation Dept. Ghent University, 2015).

The problem of capacitor imbalance comes from the fluctuation of the DC link midpoints (O and O' in FIG. 1). This fluctuation results from the non-uniform switching across the series connected capacitors. This fluctuation causes one capacitor carry a load current for longer intervals than the other series connected capacitor. Therefore, the switching state affects the capacitor charging.

The following is an example illustrating how the switching state affects the capacitor balancing.

Figure 4B:
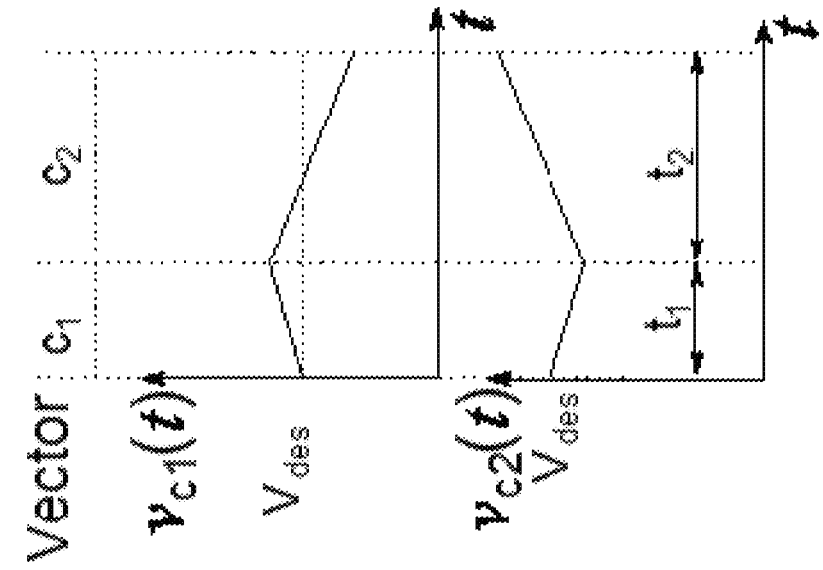
FIGS. 4A-4B illustrate the switching state effect on charging the capacitors of FIG. 1.
Figure 4A:
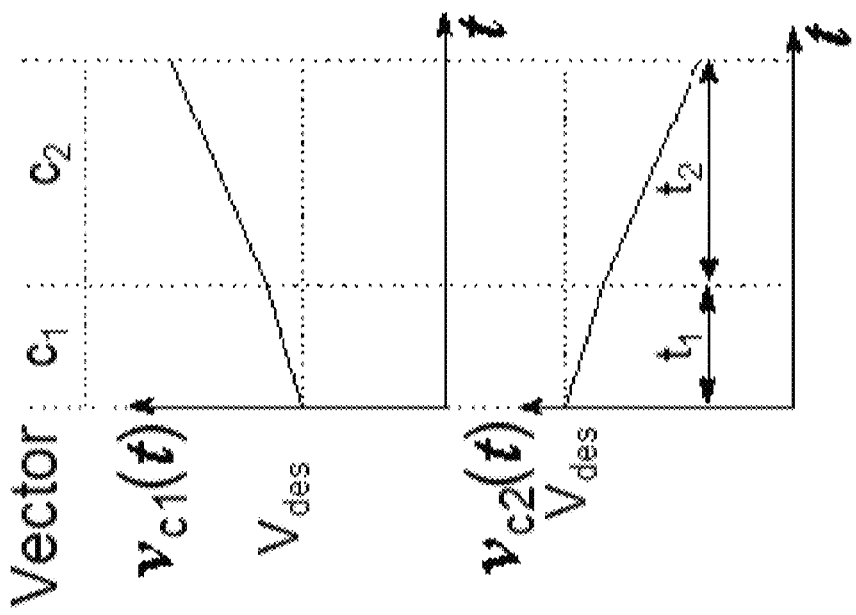
Figure 5A:
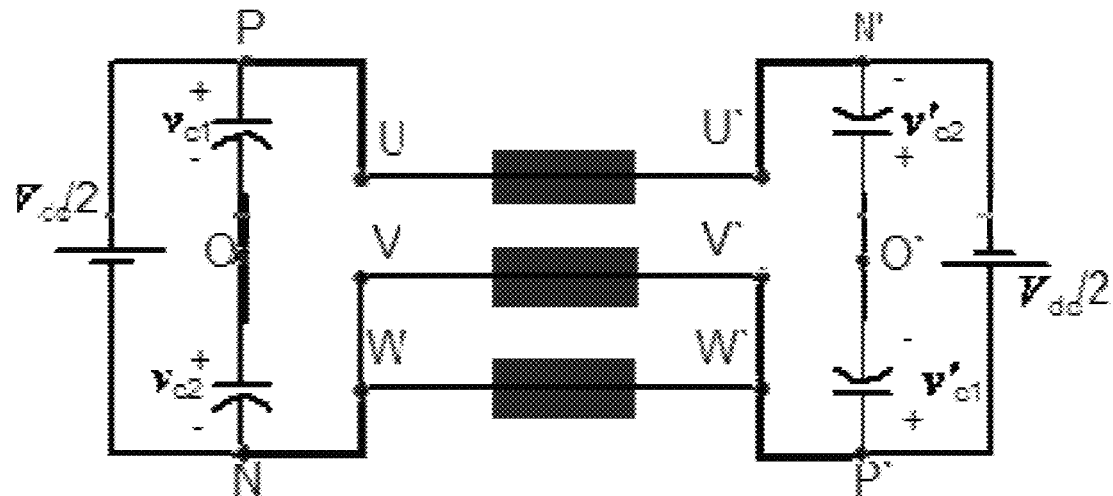
FIGS. 5A-5H illustrate the converter power circuit for different group effects. No effect group cases [A-D], effective group cases [E-H].
Figure 5B:
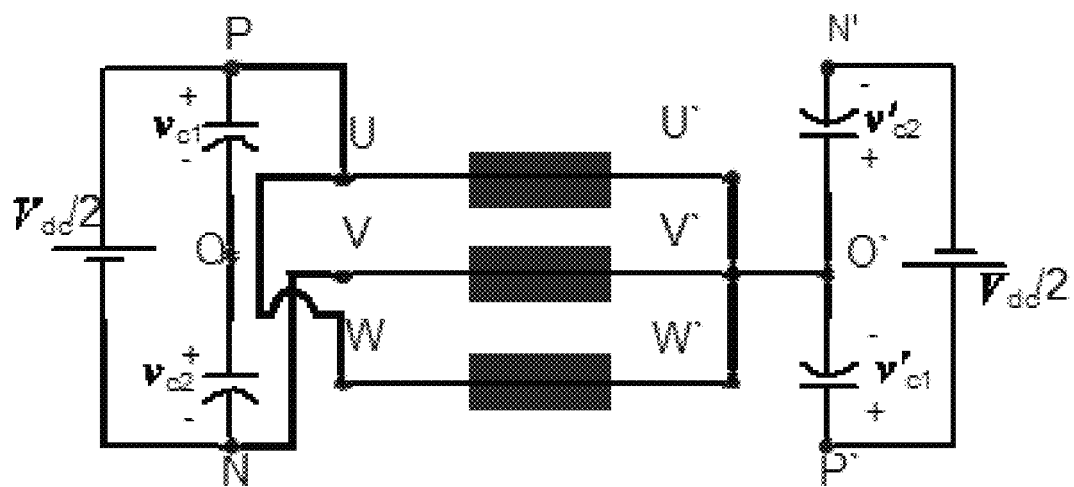
Figure 5C:
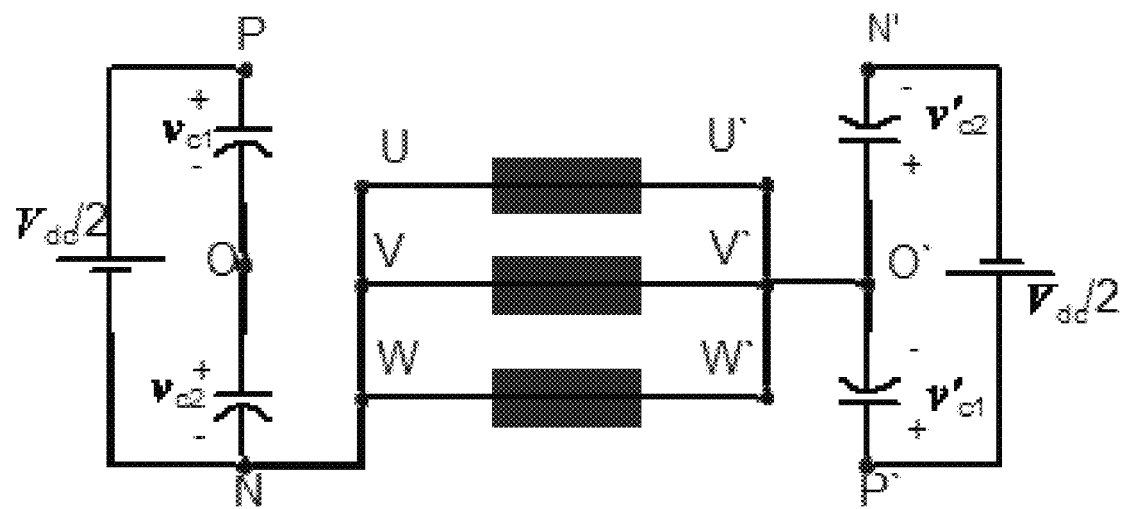
Figure 5D:
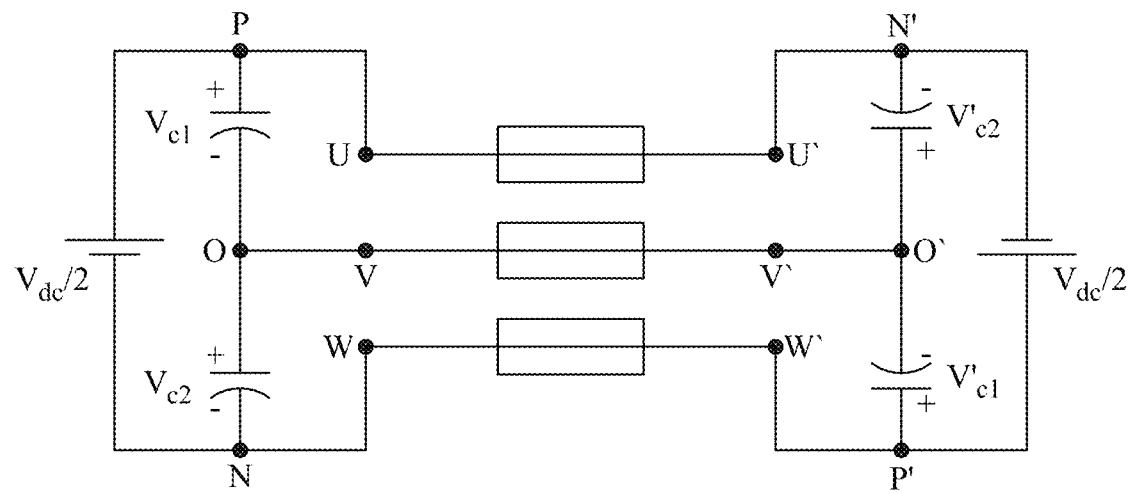
Figure 5E:
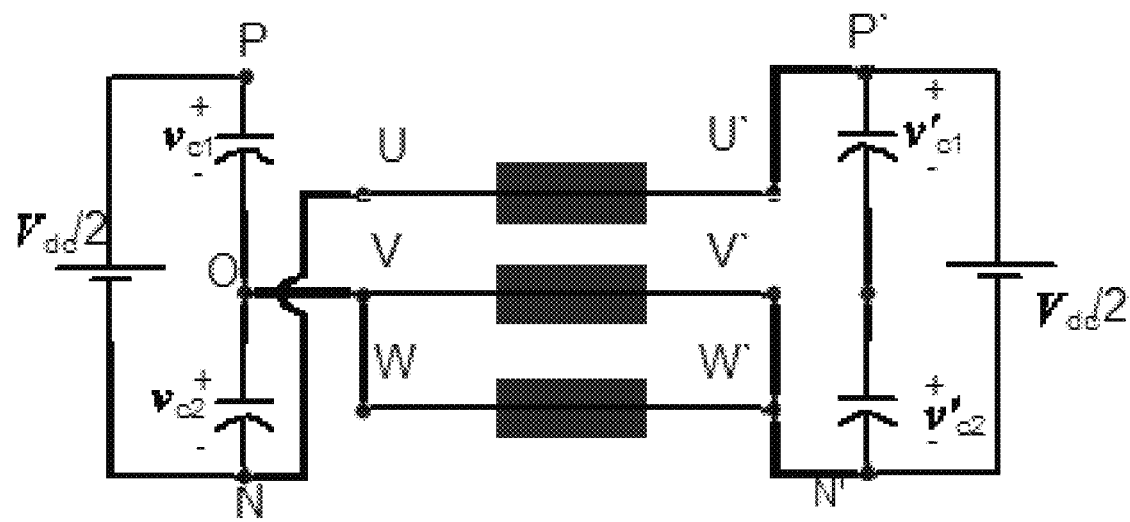
Figure 5F:
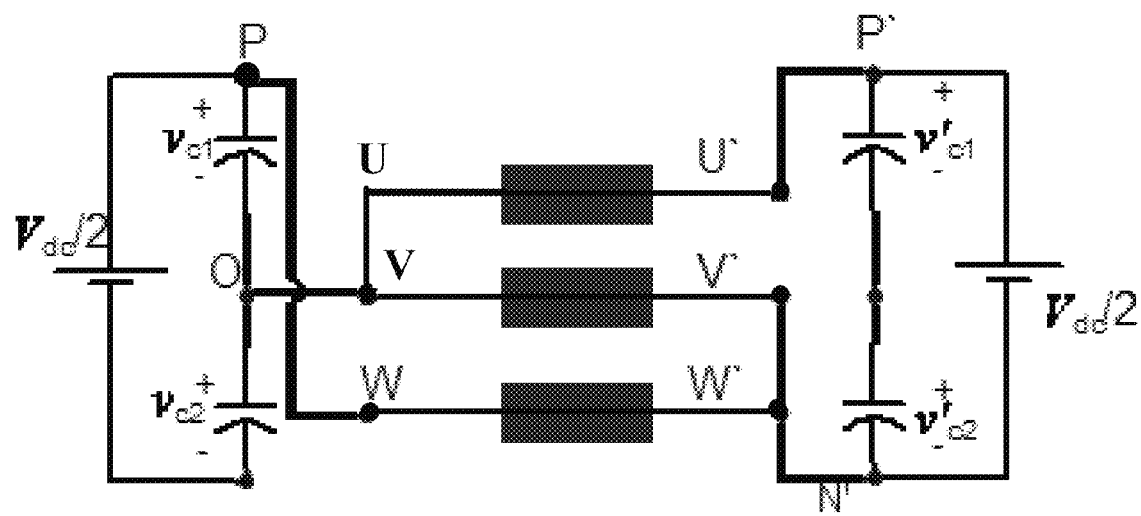
Figure 5G:
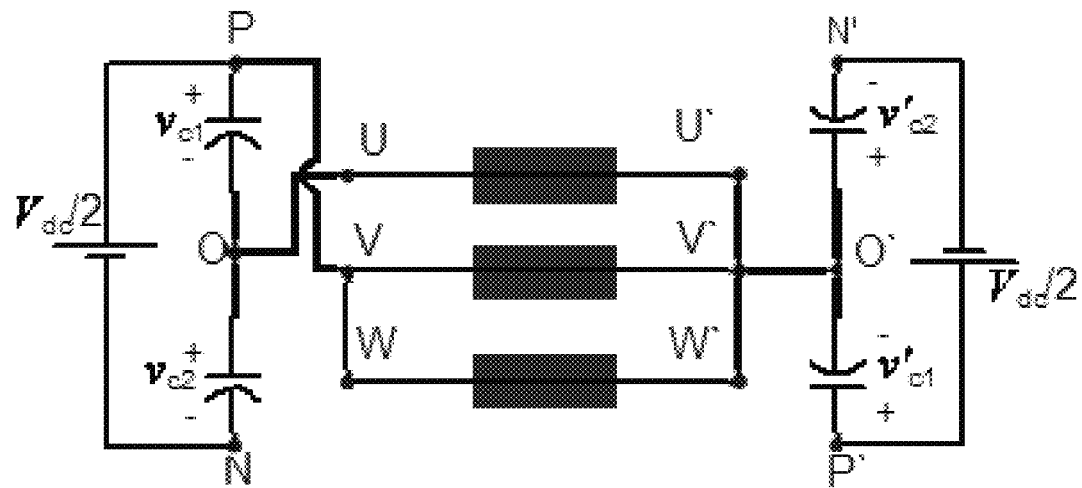
Figure 5H:
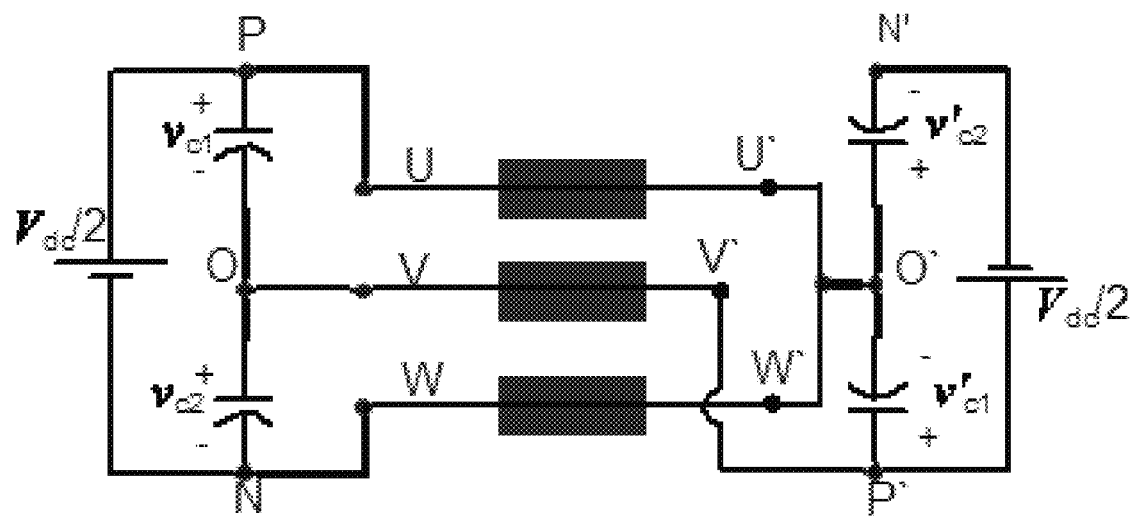

Assuming a voltage vector V* is located in the triangular region surrounded by vectors $c_1$, $c_2$ and $d_2$ (see FIG. 3). For instance, if the switching state [ONN, N'P'P'] is selected to attain vector $c_1$ (see FIG. 4A) and [ONN, N'O'P'] is selected to attain vector $c_2$, the upper capacitor $C_1$ of the converter DC link 114 will charge in both of successive states (during $t_1$ and $t_2$ in FIG. 4A). However, if the switching state [ONN, N'O'P'] is selected to represent vector $c_2$, the upper capacitor $C_1$ will discharge in $t_2$ interval as shown in FIG. 4B. Hence, the switching state selection affects the capacitor charging and can be optimized to keep the capacitor voltage balanced. The effect of all of the 729 states on the DC link capacitors is summarized in Table IV. The voltage imbalances for the two DC links are $V_c = V_{c1} - V_{c2}$ for converter 112 and $V'_c = V_{c3} - V_{c4}$ for converter 122. According to $V_c$ and $V'_c$ values, the effects of the switching states can be classified as follows:

A. High effect group, in which $V_c$ or $V'_c$ tends to $V_{dc}/2$.
B. Medium effect group, in which $V_c$ or $V'_c$ tends to $V_{dc}/4$.
C. No effect group, in which $V_c$ or $V'_c$ tends to zero.

TABLE IV

CLASSIFICATION OF THE 729 SS ACCORDING TO GROUP EFFECT

| Vectors | O | $a_1$-$a_6$ | $b_1$-$b_{12}$ | $c_1$-$c_{18}$ | $d_1$-$d_{24}$ | Total |
|---|---|---|---|---|---|---|
| No effect | 45 | — | 132 | — | 24 | 201 |
| High effect | — | 216 | 84 | 156 | 24 | 480 |
| Medium effect | — | — | 48 | — | — | 48 |
| States/vector | 45 | 216 | 264 | 156 | 48 | 729 |

The symmetrical connection of the midpoints of the two DC links (O and O') to the three-phase load keeps the capacitors in a balanced state. FIG. 5A-5D show balanced states where the current path from the midpoints of the two DC links to the connected load is absent. Hence, the capacitor currents for both cascaded capacitors are equal. In FIG. 5E-5H, the unsymmetrical connection of the two DC links to the three-phase load causes capacitor voltage imbalance.

The use of the high and medium effect groups of Table IV can change the capacitor balancing state. Hence, the higher number of these two groups switching states (528 (480+48) out of 729 states) gives high flexibility in the selection decision to balance the four capacitor voltages. Only two different switching states, one for charging and the other for discharging, are needed to balance the capacitors of one DC link. Therefore, four redundant switching states can be used to achieve the capacitor balancing for the two isolated DC links of the 5L dual T-type circuit.

Figure 6:
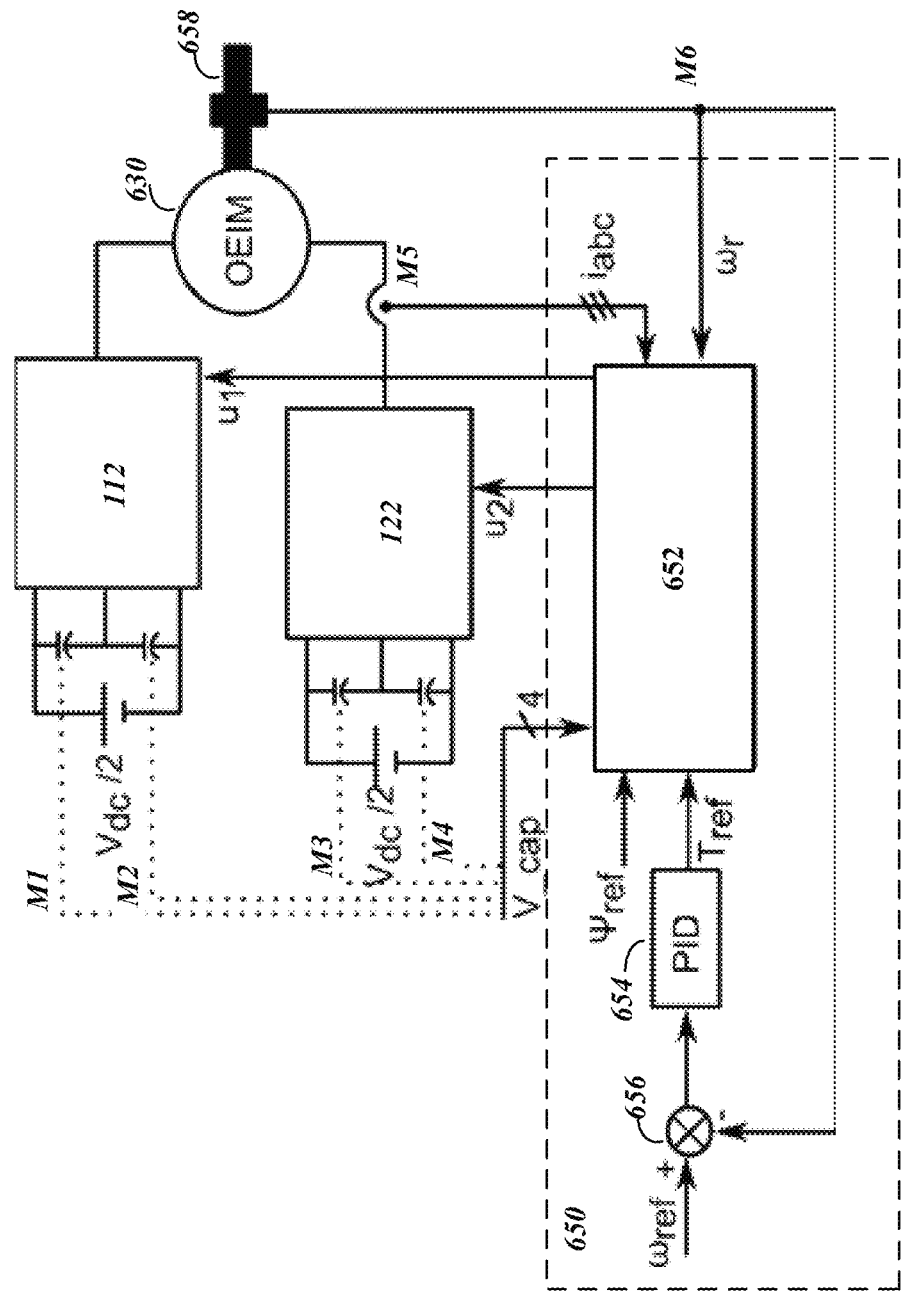
FIG. 6 is a circuit diagram illustrating predictive torque control.

FIG. 6 illustrates a schematic diagram of a control system having a CPU 652 configured with program instructions for performing predictive torque control (PTC) for an induction motor drive (OEIM 630). The torque reference ($T_{ref}$) is generated from the outer speed control loop from shaft encoder 658 via a proportional integral derivative (PID) controller 654. The flux reference ($\Psi_{ref}$) is assumed constant. Transducers M1-M4 provide continuous measurements of the capacitor voltages, transducer M5 measures the phase currents, $i_a$, $i_b$, $i_c$, shaft encoder M6 measures the rotor angular speed, $\omega_r$, of the machine shaft 658. The CPU includes a processor module having the dual T-type converter and the machine models which are used for predicting the future capacitor voltages, torque and flux based on the measured and estimated states. Finally, the two-step optimization step of the present disclosure utilizes the reference and predicted quantities to generate the optimal gating signals for the next control sample. The mathematical models required for the estimation and prediction steps are explained below.

The dynamic model of an induction motor can be expressed using different representations depending on the reference frame used. (See G. Ubaldo, W. Pereira, C. Oliveira, A. Castro, and M. Aguiar. "Weighting Factors Optimization of Predictive Torque Control of Induction Motor by Multi-objective Genetic Algorithm." *IEEE Transactions on Power Electronics* (2018), incorporated herein by reference in its entirety). Considering the stator reference frame, the stator current ($i_s$) and rotor flux ($\psi_r$) as the state variables, the dynamic equation can be expressed using complex vector notation as follows:

$$\dot{x}=Ax+Bu \quad (5)$$

where $x=[i_s \; \psi_r]^T$ are the state variables, $u=u_s$ is the stator voltage vector, $i_s$ is the stator current, and $\psi_r$ is the rotor flux as the state variables. (See C. Rojas and J. Rodriguez, "Multiobjective Fuzzy Predictive Torque Control of an Induction Motor Drive," *Int. Power Electron. Drive Syst. Technol. Conf.*, no. February, pp. 3-4, 2015, incorporated herein by reference in its entirety).

The coefficients A and B are given by equation (6):

$$A = \begin{bmatrix} \frac{-1}{\tau_\sigma} & 0 & \frac{k_r}{R_\sigma \tau_\sigma \tau_r} & \frac{k_r}{R_\sigma \tau_\sigma}\omega_r \\ 0 & \frac{-1}{\tau_\sigma} & -\frac{k_r}{R_\sigma \tau_\sigma}\omega_r & \frac{k_r}{R_\sigma \tau_\sigma \tau_r} \\ \frac{L_m}{\tau_r} & 0 & \frac{-1}{\tau_\sigma} & -\omega_r \\ 0 & \frac{L_m}{\tau_r} & \omega_r & \frac{-1}{\tau_\sigma} \end{bmatrix}, \quad (6)$$

$$B = \begin{bmatrix} \frac{1}{R_\sigma \tau_\sigma} & 0 \\ 0 & \frac{1}{R_\sigma \tau_\sigma} \\ 0 & 0 \\ 0 & 0 \end{bmatrix}$$

where $R_s$ and $R_r$ are stator and rotor resistances, $L_s$, $L_r$ and $L_m$ are stator, rotor, and mutual inductances respectively, $\omega_r$, is the electrical rotor angular speed. $k_r=L_m/L_r$ is the rotor coupling factor, $R_\sigma=R_s+k_r^2 R_r$ represents the equivalent resistance, $L_\sigma=L_s(1-L_m^2/L_r)$ is the transient inductance of the machine, $\tau_r=L_r/R_r$ is the rotor time-constant and $\tau_\sigma=L_\sigma/R_\sigma$ is the stator transient time constant.

The electromagnetic torque can be calculated as:

$$T=3/2 \; n_p(\psi_s \times i_s) \quad (7)$$

where $n_p$ is the number of pole pairs and $\psi_s$ is the stator flux.

The prediction step in model predictive control (MPC) requires the knowledge of the discrete model of the induction motor. Several discretization methods are available. For the sake of simplicity, the Euler discretization method is used. In mathematics and computational science, the Euler method is a first-order numerical procedure for solving ordinary differential equations (ODEs) with a given initial value.

Referring to FIG. 6, the discrete state space model can be expressed using $$x^{k+1}=A_d x^k+B_d u^k$$

$$A_d=I+T_s A$$

$$B_d=T_s B \quad (8)$$

where I is the identity matrix and $T_s$ is the stator sampling time.

The applied stator voltage generated by the drive signals $u_1$ and $u_2$ can be calculated as $$u=u_{s\alpha\beta}=V_{dc}/2 \; (T_{Cl} S_{con1}-T_{Cl} S_{con2}) \quad (9)$$

where $V_{dc}$ is the summation of the capacitor voltages and $u_{s\alpha\beta}$ are the terminal voltages represented by the stationary reference frame ($\alpha-\beta$) using Clarke transformation. $S_{con1}$ and $S_{con2}$ are the mathematical representation of the three-phase voltage source inverter based on the switching functions $m_X$ and $m_{X'}$, which can be defined as:

$$S_{con1} = \begin{bmatrix} 2/3 & -1/3 & -1/3 \\ -1/3 & 2/3 & -1/3 \\ -1/3 & -1/3 & 2/3 \end{bmatrix} \begin{bmatrix} m_A \\ m_B \\ m_C \end{bmatrix} \quad (10)$$

$$S_{con2} = \begin{bmatrix} 2/3 & -1/3 & -1/3 \\ -1/3 & 2/3 & -1/3 \\ -1/3 & -1/3 & 2/3 \end{bmatrix} \begin{bmatrix} m_{A'} \\ m_{B'} \\ m_{C'} \end{bmatrix}$$

$T_{Cl}$ represents the Clarke transformation, which can be described as:

$$T_{Cl} = \frac{2}{3}\begin{bmatrix} 0 & -\frac{\sqrt{3}}{2} & \frac{\sqrt{3}}{2} \\ 1 & -\frac{1}{2} & -\frac{1}{2} \end{bmatrix} \quad (11)$$

(See R. Krishnan. "Electric motor drives: modeling, analysis, and control." Book, New Jersey: Prentice Hall, February 2001, incorporated herein by reference in its entirety).

The rotor flux $\Psi_r$ can be estimated from the rotor dynamics of the induction motor expressed at the rotor reference frame as follows:

$$\psi_r + \tau_r d\psi_r/dt = L_m i_s \tag{12}$$

After applying Euler discretization, the rotor flux can be expressed as:

$$\psi_r^k = \frac{L_r}{L_r + T_s R_r}\psi_r^{k-1} + \frac{L_m T_s R_r}{L_r + T_s R_r} i_s^k \tag{13}$$

Knowing the rotor flux and using current measurements, equation (8) can be used to predict rotor flux for one-step ahead, then the stator flux can be calculated at the k+1 sample from:

$$\psi_s^{k+1} = 32 \, k_r \psi_r^{k+1} + L_\sigma i_s^{k+1} \tag{14}$$

The variables in equations (8) and (14) are expressed in the stator reference frame, thus a transformation is needed. In order to compensate the time delay caused by the calculation process, the variables at sample k+2 can be predicted using the variables at instant k+1 as follows:

$$x^{k+2} = A_d x^{k+1} + B_d u^{k+1} \tag{15}$$

$$\psi_s^{k+2} = k_r \psi_r^{k+2} + L_\sigma i_s^{k+2}$$

$$T^{k+2} = \frac{3}{2} n_p (\psi_s^{k+2} \times i_s^{k+2})$$

For a capacitor, x:

$$dv_{Cx}/dt = i_{cx}/C_x \tag{16}$$

By using Euler discretization, the predicted capacitor voltage can be expressed as $$v_{Cx}^{K+1} = v_{Cx}^K + i_{Cx}^{K+1} \cdot T_s/C_x \tag{17}$$

The capacitor current can be obtained as a function of the three-phase currents and the switching states. Firstly, the capacitor currents can be expressed as a function of the currents $i_1$, $i_2$, and $i_3$ (See FIG. 1) as follows:

$$i_{C1} = i_{dc1} - i_1$$

$$i_{C2} = i_{C1} - i_2 = i_{dc} - i_1 - i_2$$

$$i'_{C1} = i_{dc2} - i'_1$$

$$i'_{C2} = i'_{C1} - i'_2 = i_{dc2} - i'_1 - i'_2 \tag{18}$$

The objective of the controller is to maintain equal energy among the capacitors. Hence, the DC link currents are $i_{dc1} = i_{dc2} = 0$ when the capacitors are balanced. (See V. Yaramasu, W. Bin, and C. Jin, "Model-predictive control of grid-tied four-level diode-clamped inverters for high-power wind energy conversion systems." *IEEE transactions on power electronics* 29, no. 6 (2014): 2861-2873, incorporated herein by reference in its entirety). Referring to FIG. 1 and equation (18), the capacitor currents can be written as:

$$i_{C1} = -i_1$$

$$i_{C2} = -i_1 - i_2$$

$$i'_{C1} = -i'_1$$

$$i'_{C2} = -i'_1 - i'_2 \tag{19}$$

The currents $i_1$, $i_2$, $i'_1$ and $i'_2$ can be expressed as a function of the three-phase currents by means of switching functions as follows:

$$i_{1,2} = m_A i_a + m_B i_b + m_C i_c$$

$$i'_{1,2} = -m_A i_a - m_B i_b - m_C i_c \tag{20}$$

The second horizon prediction can be calculated similarly to the flux and torque calculation. The predicted currents can be obtained by the first relation ($x^{k+2} = A_d x^{k+1} + B_d u^{k+1}$) of equation (15).

Conventionally, the torque and flux ripples are minimized using the MPC method. In a multilevel converter, capacitor balancing is mandatory to attain the desired voltage level and reduce the harmonic contents. (See A. Salem, A. Abdallh, P. Rasilo, F. De Belie, M. Ibrahim, L. Dupré, and J. Melkebeek. "The effect of common-mode voltage elimination on the iron loss in machine core laminations of multilevel drives." *IEEE Transactions on Magnetics* 51, no. 11 (2015): 1-4; P. Rasilo, A. Salem, A. Abdallh, F. De Belie, L. Dupré, and J. Melkebeek. "Effect of multilevel inverter supply on core losses in magnetic materials and electrical machines." *IEEE transactions on Energy Conversion*, 30, no. 2 (2015): 736-744; and A. Salem, F. Belie, T. Yousef, J. Melkebeek, O. Mohamed, and M. Abido. "Advanced multilevel converter applied to an open-ends induction machine: Analysis, implementation and loss evaluation." In *Electric Machines and Drives Conference (IEMDC)*, 2017 IEEE International, pp. 1-8. IEEE, 2017, each incorporated herein by reference in their entirety). Therefore, the conventional cost function has three terms with two weighting factors. These three terms are the torque ripple, flux ripple, and capacitor voltage deviation. Generally, the torque and flux depend on the voltage vector while the capacitor balancing depends on the switching state.

Accordingly, the methods of the present disclosure split the evaluation of the cost function into two cascaded optimization steps. Firstly, the torque and flux ripples-based cost function is minimized using all 61 voltage vectors (VV). The voltage vector with the lowest cost function is the one which will operate the OEIM with the smallest torque ripples and flux ripples. This voltage vector includes four switching states which are used in the second optimization step. Capacitor balancing is achieved by evaluation of the four switching states associated with this optimal voltage vector. Therefore, the total number of evaluations is reduced to 65 instead of 729, i. e, 61 evaluations to determine the optimal voltage vector and four evaluations to determine the switching state which has the lowest cost function. The advantages of the procedure are:

i. Reduction of MPC technique computation time due to the substantial reduction of cost functions evaluations required.

ii. Removal of the difficulty of setting a weighting factor for the capacitor balancing cost function.

iii. Avoidance of the adverse effect of aggregating the capacitor balancing in one cost function while ensuring the minimum torque and flux ripples.

The procedure starts by evaluating the first cost function, which is defined as:

$$J_1 = \frac{|T^{ref} - T^{k+2}|}{T_{rated}} + K_\psi \frac{\left| \|\psi_s^{ref}\| - \|\psi_s^{k+2}\| \right|}{\|\psi_{s\_rated}\|} \tag{21}$$

where $T^{ref}$ and $\psi_s^{ref}$ are the reference torque and the reference stator flux respectively. $T_{rated}$ is the rated torque and $\|\psi_{s\_rated}\|$ is the rated stator flux magnitude. $K_\psi$ is the flux weighting factor, which determines the relative importance of flux error. During the design process, $K_\psi$ should be carefully tuned in order to obtain good performance.

Determination of the weighting factors is performed as described by Mamdouh et al. (See M. Mamdouh, M. A. Abido, and Z. Hamouz, "Weighting Factor Selection Techniques for Predictive Torque Control of Induction Motor Drives: A Comparison Study," Arab. J. Sci. Eng., vol. 43, no. 2, pp. 433-445, February 2018, incorporated herein by reference in its entirety).

In the present disclosure, the method of Mamdouh et al., following the guideline in Cortes et al. for a cost function with one weighting factor, has been adopted and the flux-weighting factor, $K_\psi$, has been selected based on an extensive offline simulation. Firstly, the capacitor weighting factor is neglected (set to zero). Then an offline simulation is implemented for different values of the flux weighting factor. The resultant torque and flux ripples at each weighting factor are plotted on the same figure versus the value of flux weighting factor. As expected, the relationship between flux and torque versus weighting factor is contradictory. The torque ripple is small at a low flux weighting factor while flux ripple is small at a large weighting factor and vice versa. A compromise value for flux weighting factor is then selected. The previous steps are repeated again at different operating points (speeds and load torque) and a reasonable value of flux weighting factor is selected to ensure fair optimization between torque and flux is achieved at different operating points. Again the last step is repeated at different operating points. (See P. Cortes, S. Kouro, B. La Rocca, R. Vargas, J. Rodriguez, J. I. Leon, S. Vazquez, and L. G. Franquelo, "Guidelines for weighting factors design in Model Predictive Control of power converters and drives," IEEE Int. Conf. Ind. Technol., pp. 1-7, 2009, incorporated herein by reference in its entirety).

The optimum vector is calculated by:

$$V_{opt-1} = \arg\min_{\{V_1\ldots V_{61}\}} J_1(V_s^{k+1}) \quad (22)$$

where $V_s$ is the stator terminal voltage.

A set of redundant switching states of the optimum voltage vector are selected to use in a second step for capacitor voltage balancing.

The capacitor voltage balancing is achieved by the following cost function.

$$J_2 = |v_{C1}^{k+1} - v_{C2}^{k+1}| + |v_{C3}^{k+1} - v_{C4}^{k+1}| \quad (23)$$

$$V_{opt-2} = \arg\min_{\{V_1\ldots V_4\}} J_2(V_s^{k+1}) \quad (24)$$

The procedure can be described as follows. Firstly, the flux and torque are predicted and $J_1$ (equation (21)) is evaluated using all possible voltage vectors (61 vectors which are O, a's, b's, c's, and d's as shown in FIG. 3). The vector that minimizes $J_1$ is selected for the evaluation. of $J_2$. The four possible high effect switching states, as given in Table IV, are examined and the one that leads to minimum $J_2$ will be selected for implementation.

The running time was found to be 23 μs using a dSPACE 1103 digital controller. A flowchart for the MPC procedure is shown in FIG. 7A.

Figure 7A:
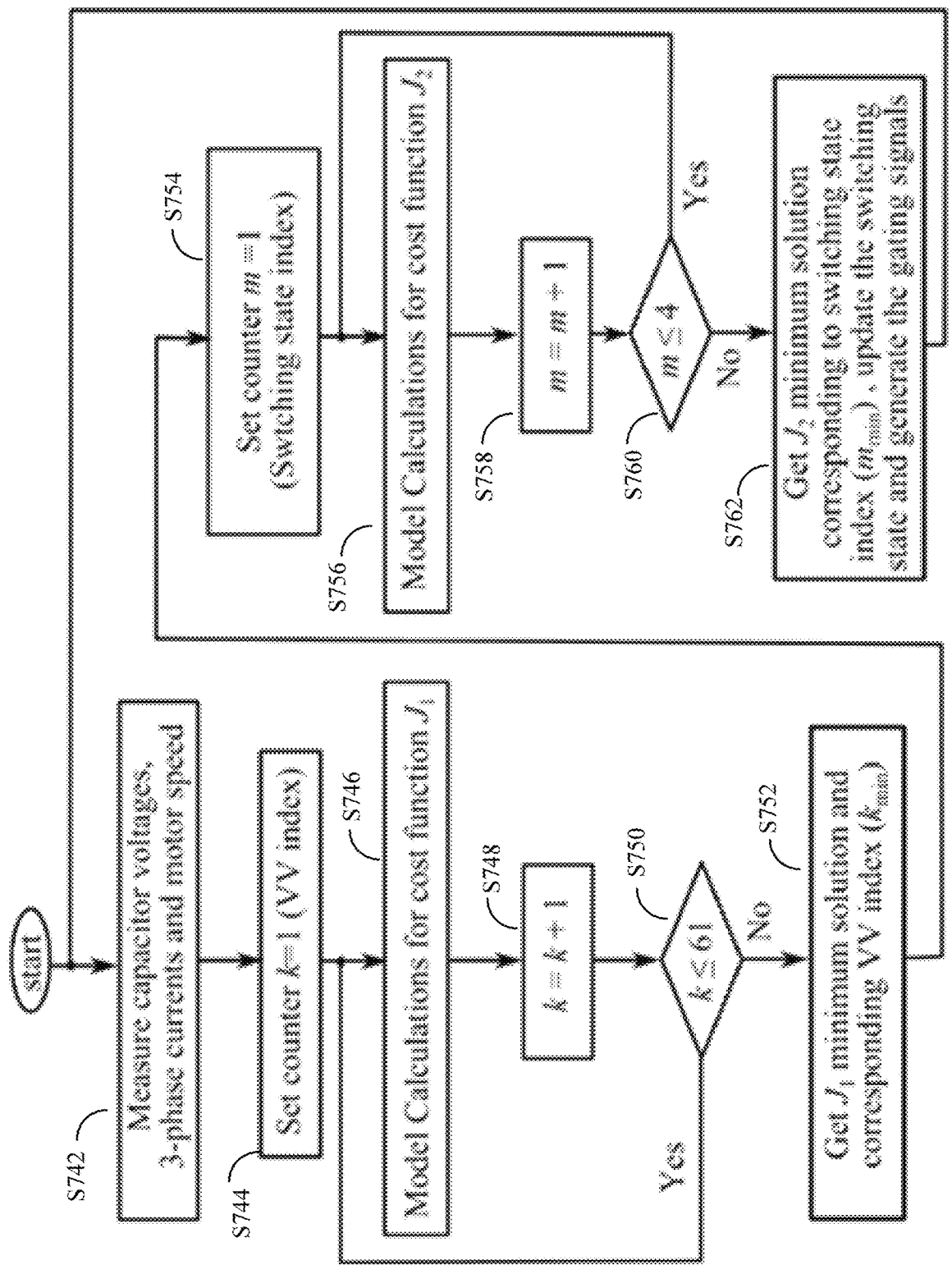
FIG. 7A is a flow-chart illustrating the MPC algorithm.

In FIG. 7A, at S742, the capacitor voltages, 3 phase currents and motor speed are measured in order to set up equation (21) for $J_1$. At S744, the counter for the voltage vector index is set at one. There are 61 voltage vectors for which $J_1$ must be calculated. The calculation for the first cost function $J_1$ is computed at S746. The counter is increased by 1 at S748. At S750, it is determined whether or not all the $J_1$s have been calculated. If not, the loop returns to S746 to calculate the next cost function $J_1$. When $J_1$ has been calculated for all 61 voltage vectors, the process moves to S752, where the minimum $J_1$ is determined and the voltage vector which gives the minimum $J_1$ is acquired by equation (22). At S754, the second of the two cascaded optimization steps is determined for capacitor balancing. The four switching states of the optimal voltage vector determined at S752 are used to determine $J_2$ from equation (23). At S754, a counter, m, representing a first switching state of the four switching states, is set to be 1. The cost function is modeled for $J_2$ at S756. At S758, the counter is incremented by 1. At S760, the determination is made as to whether all four switching states have been modelled. If not, the process returns to S756 to calculate $J_2$ for the next switching state. If all the switching states have been used to determine each $J_2$ (m=4), the procedure moves to S762. The minimum cost function $J_2$ is determined by equation (24), the switching states are updated and the gating signals (control signals for the SiC semiconductor switches) are generated. The process returns to S742 to continuously monitor and update the capacitor balancing.

As mentioned, for the 5L converter (dual 3L), the total number of evaluations is reduced from 729 to 65 (calculation of $J_1$ 61 times at S746 and calculation of $J_2$ four times at S756) by the process of FIG. 7A. If the process of FIG. 7A is applied to 3L converters, the number of evaluations is reduced from 27 to 21. That is 19 vectors will be evaluated in the first step of optimization (S746) while 2 states for capacitor balancing will be examined in the second step (S756).

Figure 7B:
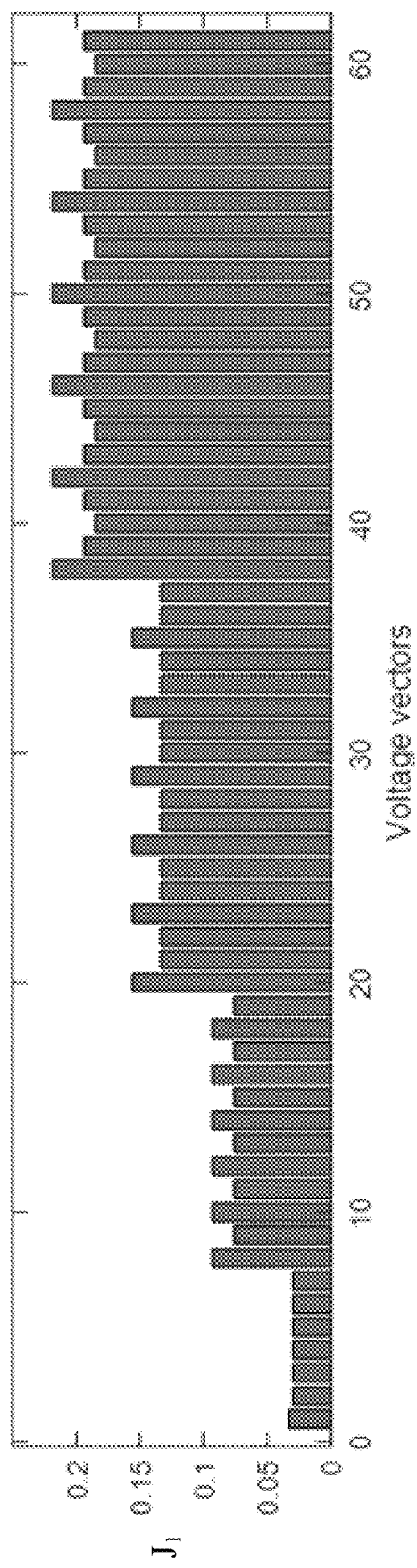
FIG. 7B is a graph of the 61 voltage vectors versus their $J_1$ value.

FIG. 7B is a non-limiting example of the results of a numerical example illustrating cost function evaluations of equation (21) for certain system parameters. Assuming a load torque of 1.8 N·m, a reference flux of 0.8157 Wb, and a speed of 1700 RPM, by substituting the 61 voltage vectors in $J_1$, the values of $J_1$ are shown in FIG. 7B. The first minimum value of $J_1$ is achieved at VV number 3 with a value of 0.03. Therefore, the VV number 3 will be selected for the evaluation of $J_2$.

One of the advantages of the dual T-type MLC topology is the high number of redundant switching states for each VV. Therefore, four redundant switching states, from the high effect group discussed in Table IV, are selected for $J_2$ evaluations. Similarly, substituting in $J_2$ by the redundant states, the values of $J_2$ are [0.7683 0.0892 0.7683 0.6775]. Therefore, switching state number 2 fulfills the minimum $J_2$ deviation and will be used for the next step steering pulses.

The SiC semiconductor technology is preferred in power electronic converters due to its faster response compared to conventional Si IGBT. A comparison between SiC MOSFET and Si IGBT for power electronic converters has been described in Biela et al. and Zhao et al. (See J. Biela, S. Mario, W. Stefan and J. W. Kolar. "SiC versus Si—Evaluation of potentials for performance improvement of inverter and DC-DC converter systems by SiC power semiconductors." IEEE transactions on industrial electronics 58, no. 7

(2011): 2872-2882; and T. Zhao, W. Jun, A. Q. Huang and A. Anant. "Comparisons of SiC MOSFET and Si IGBT based motor drive systems." In 2007 IEEE Industry Applications Annual Meeting, pp. 331-335. IEEE, 2007, each incorporated herein by reference in their entirety). Future work by the inventors of the present disclosure will examine the efficiency and loss breakdown of the dual T-type MLC based on SiC MOSFET compared to that of Si IGBT.

However, MLCs based on SiC MOSFETs with a high number of switches (such as the dual T-type 5L converter of the present disclosure, face electromagnetic interference (EMI) problems in the power circuit design. This problem results from long current carrying traces in the converter printed circuit board (PCB), which increase the stray inductance and lead to the EMI problem. (See A. Corsaro, C. Parisi and C. Rotay. "EMC design guides for motor control applications" *STMicroelectronics*, 2015, June; C. Zhu. "EMC in Power Electronics and PCB Design" PhD diss., Electrical and Computer Engineering Dept., Clemson University, 2014; and I. Roasto, V. Dmitri and K. Marius. "EMC Considerations on PCB Design for a High-Power Converter Control System." *In Compatibility in Power Electronics*, pp. 1-4. IEEE, 2007, each incorporated herein by reference in their entirety). Until now, T-type modules were produced for only one-phase in order to avoid EMI problems.

Figure 8:
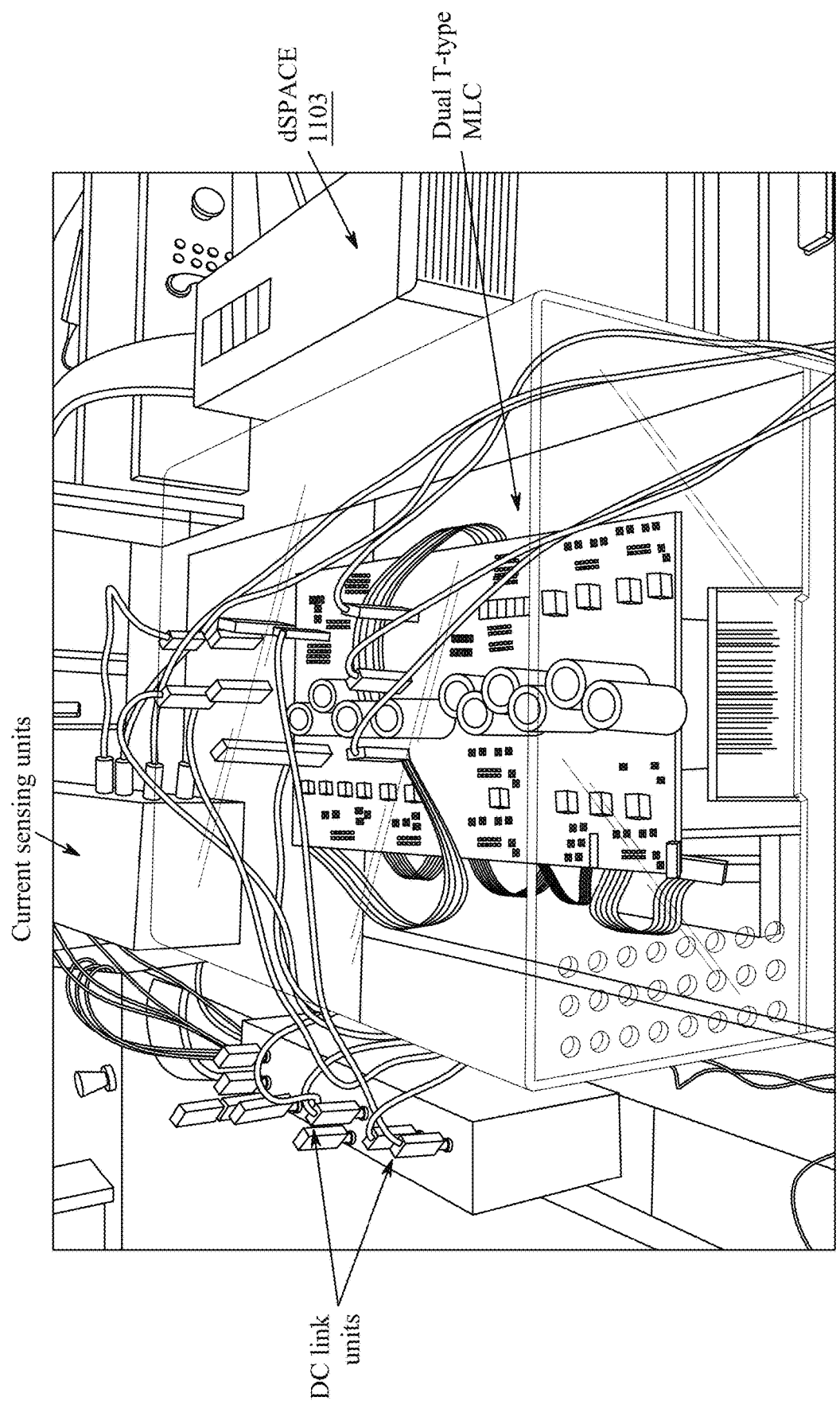
FIG. 8 illustrates a dual T-type converter prototype.

In the experimental test setup of the present disclosure, a three-phase T-type converter was designed and implemented on one PCB. The prototype for the dual 3L T-type MLC is shown in FIG. 8. The traces were kept as short as possible and electrolytic capacitors were installed on the PCB. Previous designs have used film capacitors, which are more expensive, in order to reduce EMI and prevent ringing (voltage spikes) during switching transitions. In the three-phase T-type converter of the present disclosure, the trace length between the driver and the discrete switches was kept small (around 4 centimeters for the gate current loop) to avoid the EMI problem.

Figure 9A:
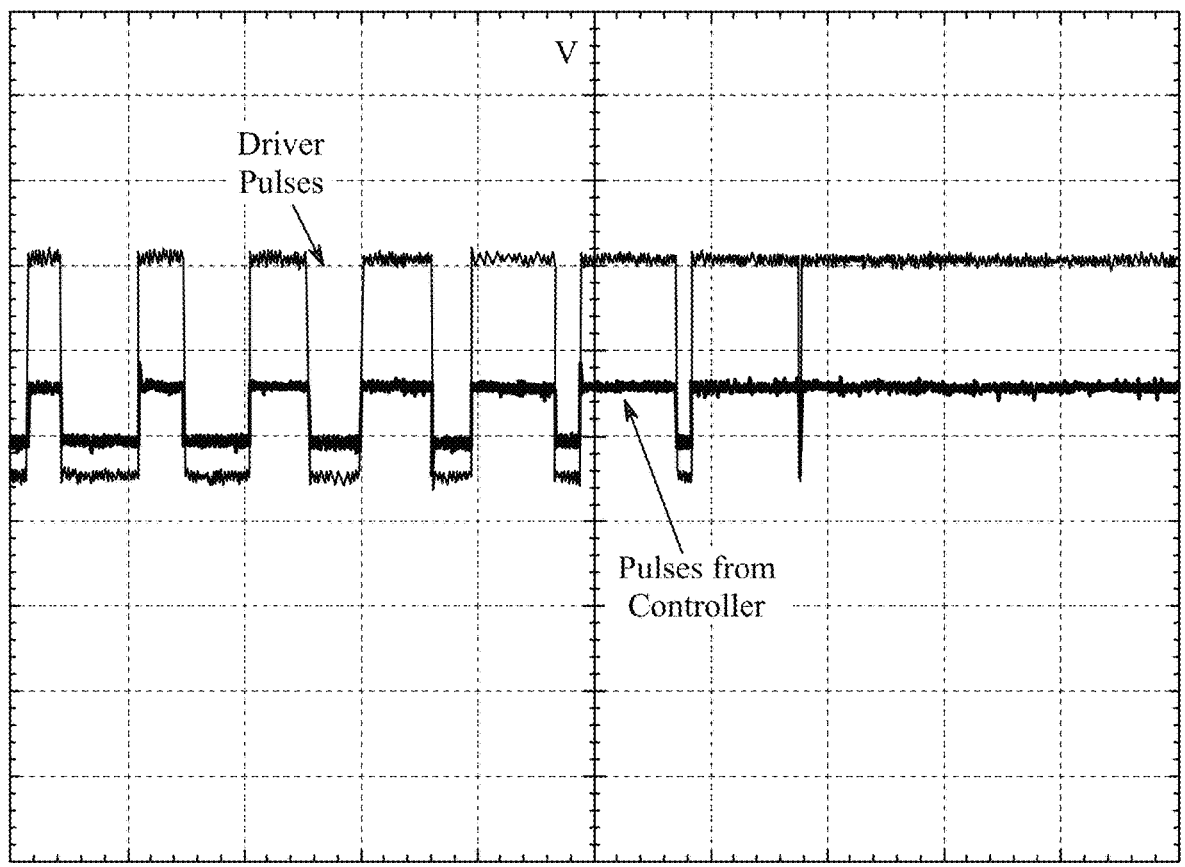
FIGS. 9A-9B illustrate A) digital controller pulses vs. output driver pulses, B) converter phase voltage and current for an OEIM.
Figure 9B:
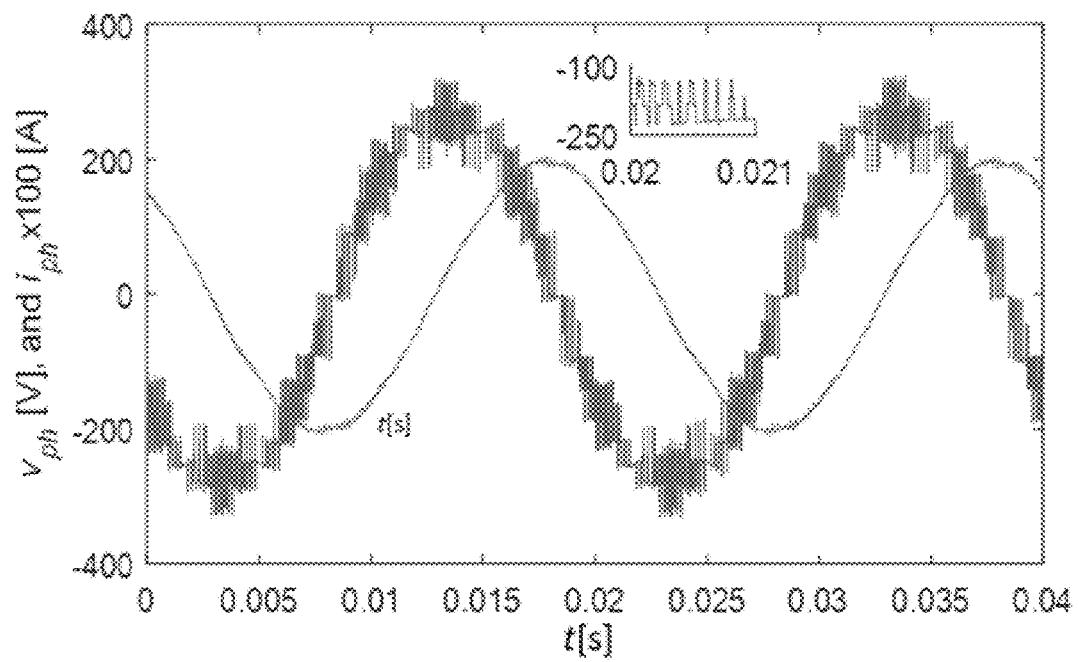

To reflect the performance of the designed PCB, the digital controller pulses and their corresponding driver gating pulses are shown in FIG. 9A. The absence of spikes in the pulses indicates that the driver circuits and their wiring connections are well designed. The corresponding phase voltage of the dual T-type converter and the load current for an induction motor are shown in FIG. 9B. The extended voltage waveform in the small window of FIG. 9B depicts the absence of ringing, which demonstrates that the experimental test set up was well designed.

A schematic diagram for the experimental test setup, shown in FIG. 10, consists of dual 3L T-type converters (1012, 1022, corresponding to 112, 122, FIG. 1) connected to an OEIM 1030, which is mechanically coupled to a DC machine 1032. This machine was loaded by a programmable load 1034 to adjust the required induction motor torque command. The dual converters were supplied from two single-phase rectifiers 1036, 1036'. Each rectifier was connected to two cascaded capacitors ($C_1$-$C_4$) in order to attain the DC link mid-points O and O'. An AC source 1035 was connected to one isolated transformer 1038 to prevent zero-sequence current in the drive system. The AC source 1035, transformer 1038 and rectifier 1036, 1036' generated the DC voltages $V_{dc}/2$ of FIG. 1 and FIG. 6.

The digital controller 1050 was a dSPACE 1103 PPC Controller Board (See: DS1103 PPC Controller Board, ASES, Unit 8, 5-7 Wiltshire Street, Minto, NSW2566, Australia). The gating pulses were connected to the converter using twisted ribbon cables 1070 in order to avoid the EMI effects in wiring. Voltage and current sensors (M1-M6 of FIG. 6) were used to feedback the voltage and current signals to the digital controller. In a non-limiting example, the voltage and current sensors may be LEM modules (See: LA 55-P current transducer, element14, D Block, 11th Floor, IBC Knowledge Park, 4/1, Bannerghatta Main Rd, Bhavani Nagar, Suddagunte Palya, Bangalore, Karnataka 560029, India and and LV 25-P, voltage transducer, Newark, 33190 Collection Center Drive, Chicago, Ill., U.S.A.). The three-phase currents, the capacitor voltages and the shaft speed were measured and transferred to the dSPACE ports using coaxial cables 1072. The gate driver circuits (1037, 1039) were used to drive the SiC discrete MOSFETs (Q, Q', FIG. 1). In a non-limiting example, the gate driver circuit is the CGD15HB62P1 which is used to drive the C2M0080120D SiC discrete MOSFET. (See: CGD15HB62P1, Gate Driver board and C2M0080120D, SiC MOSFET, Wolfspeed, a CREE company, 3028 East Cornwallis Road, Research Triangle Park, N.C., U.S.A.) In FIG. 10, the digital controller 1050 represents the computing system 650 shown in FIG. 6.

A simulation of the circuit of FIG. 10 was implemented using Matlab™ \Simulink® software. To test the drive system, the following test was performed. Firstly, the flux command was given at instant t=0. After 0.1 s, the speed command was applied. This pre-excitation process helped to reduce the starting current. The experimental tests were carried out using a programmable DC load 1034 which was connected to the armature terminals of the DC machine 1032. In a non-limiting example, the programmable load is a modular DC electronic load 63600 (See: "Modular DC Electronic Load—63600", Chroma Systems Solutions, 19772 Pauling, Foothill Ranch, Calif., U.S.A.). This load was applied after attaining the DC generator voltage. The simulation and the experimental tests were carried out for similar extended periods for the sake of comparison. Also, in order to assess the effectiveness of the optimization, two test cases were performed as follows:

A. Case 1, the test was implemented while ignoring the capacitor balancing technique.

B. Case 2, the test was implemented while considering the capacitor balancing technique.

Figure 11:
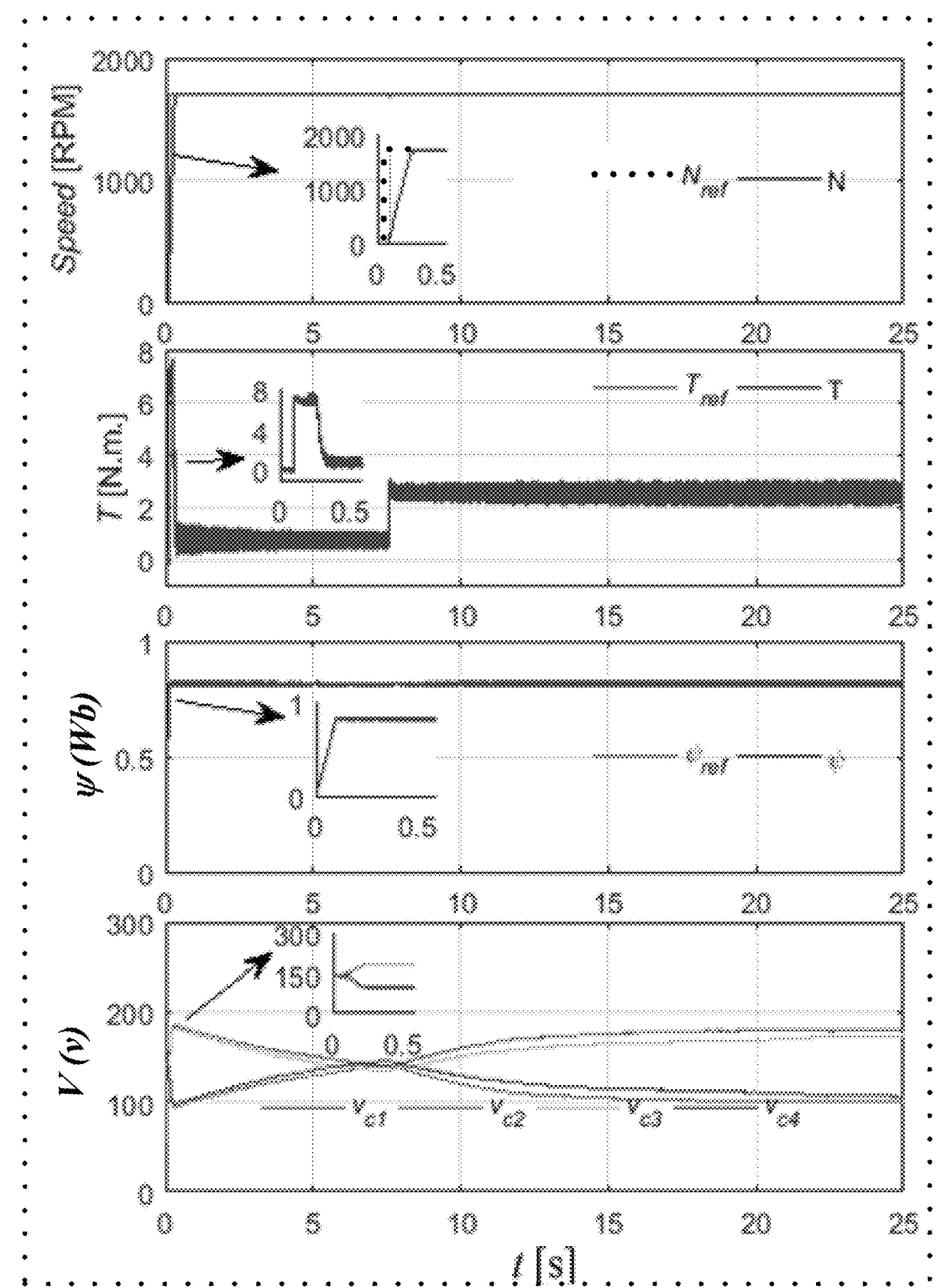
FIG. 11 illustrates a simulation of the motor speed, torque, and flux along with the capacitor voltages without considering capacitor balancing.
Figure 12A:
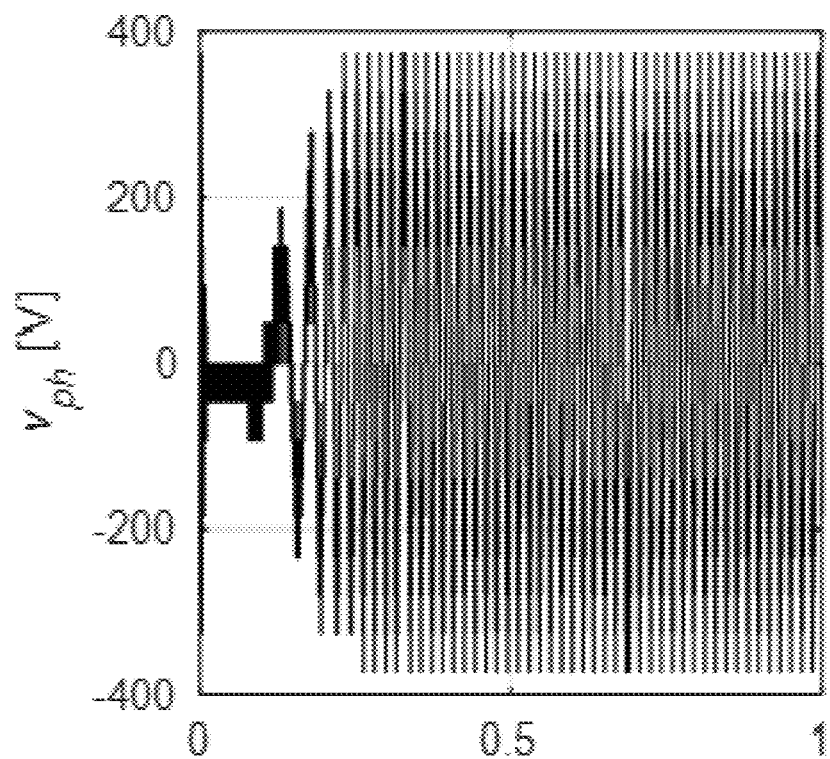
FIGS. 12A-12D illustrate a simulation of the motor phase voltage and current for phase AA' of FIG. 1 without considering capacitor balancing.
Figure 12B:
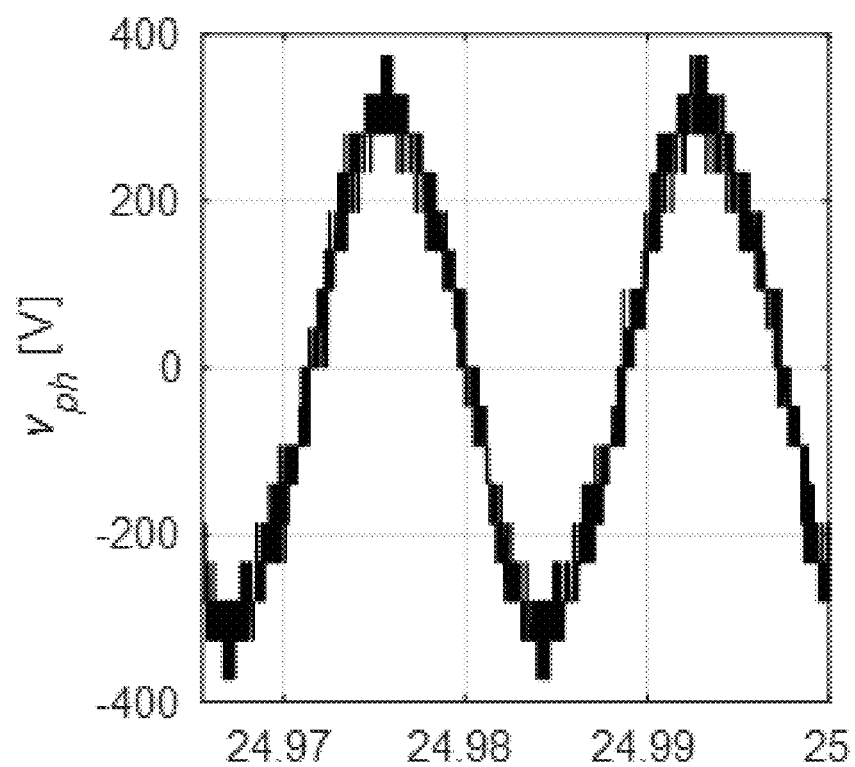
Figure 12C:
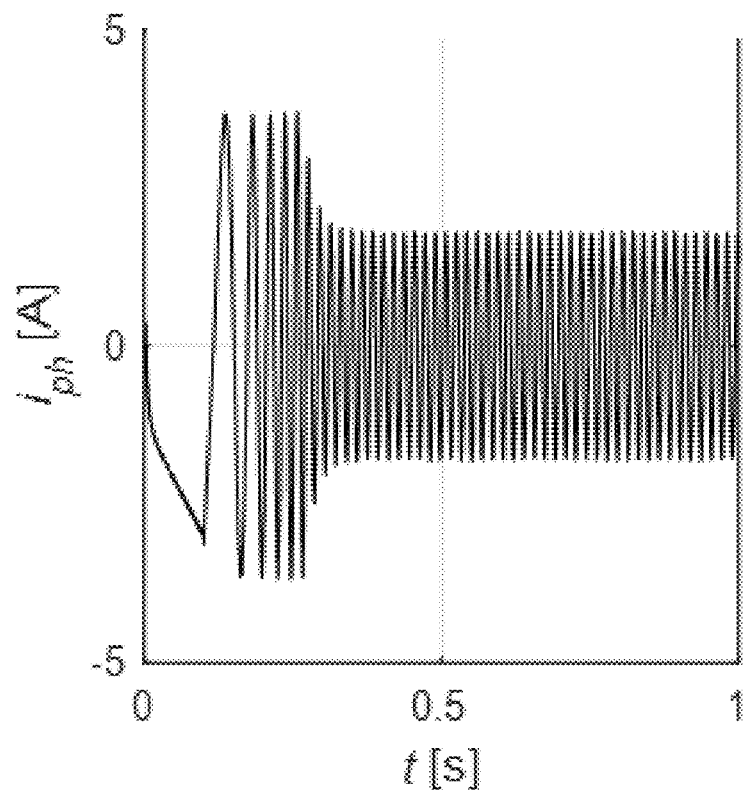
Figure 12D:
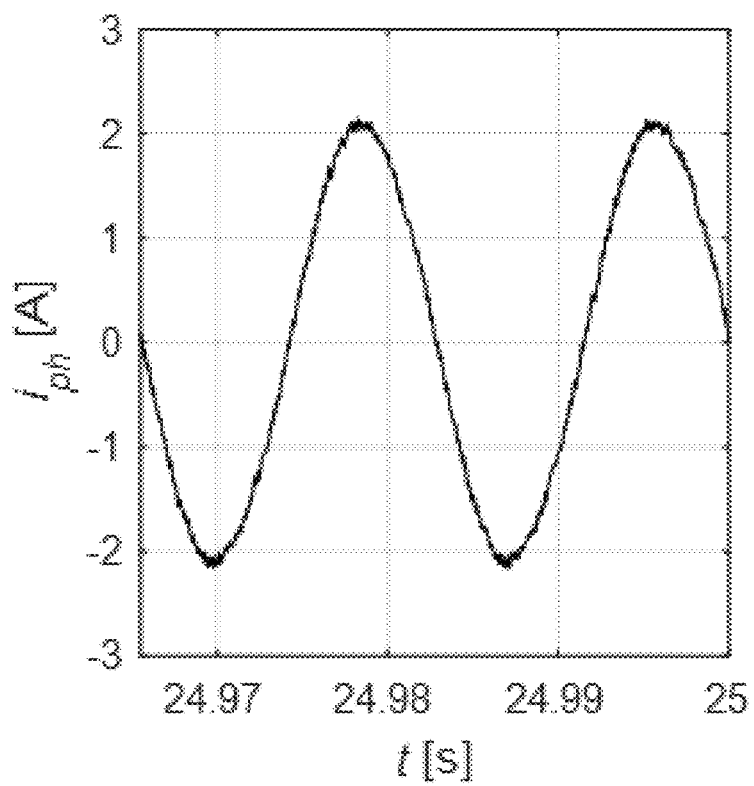

This test was implemented as follows: the motor was started while the capacitor balancing technique was ignored. In FIG. 11, the machine torque T followed the reference torque $T_{ref}$ with peak-peak ripples of 1.2 N·m. (48% of reference torque). In addition, the flux peak-peak ripples (shown in inset) were 0.021 Wb (2.6% of rated flux). The capacitor voltages, $V_{c_{1-4}}$, were completely unbalanced and the steady-state capacitor voltage deviation reached 47% of the reference voltage. In addition, the phase voltage steps were distorted as a result of the capacitor voltages unbalance, which affected the phase current and the machine torque and flux. The motor phase voltage for the overall period of the simulation is shown in FIG. 12A and the voltage at steady-state is shown in FIG. 12B. The motor current for the overall period of the simulation is shown in FIG. 12C and the current at steady-state is shown in FIG. 12D.

Figure 13:
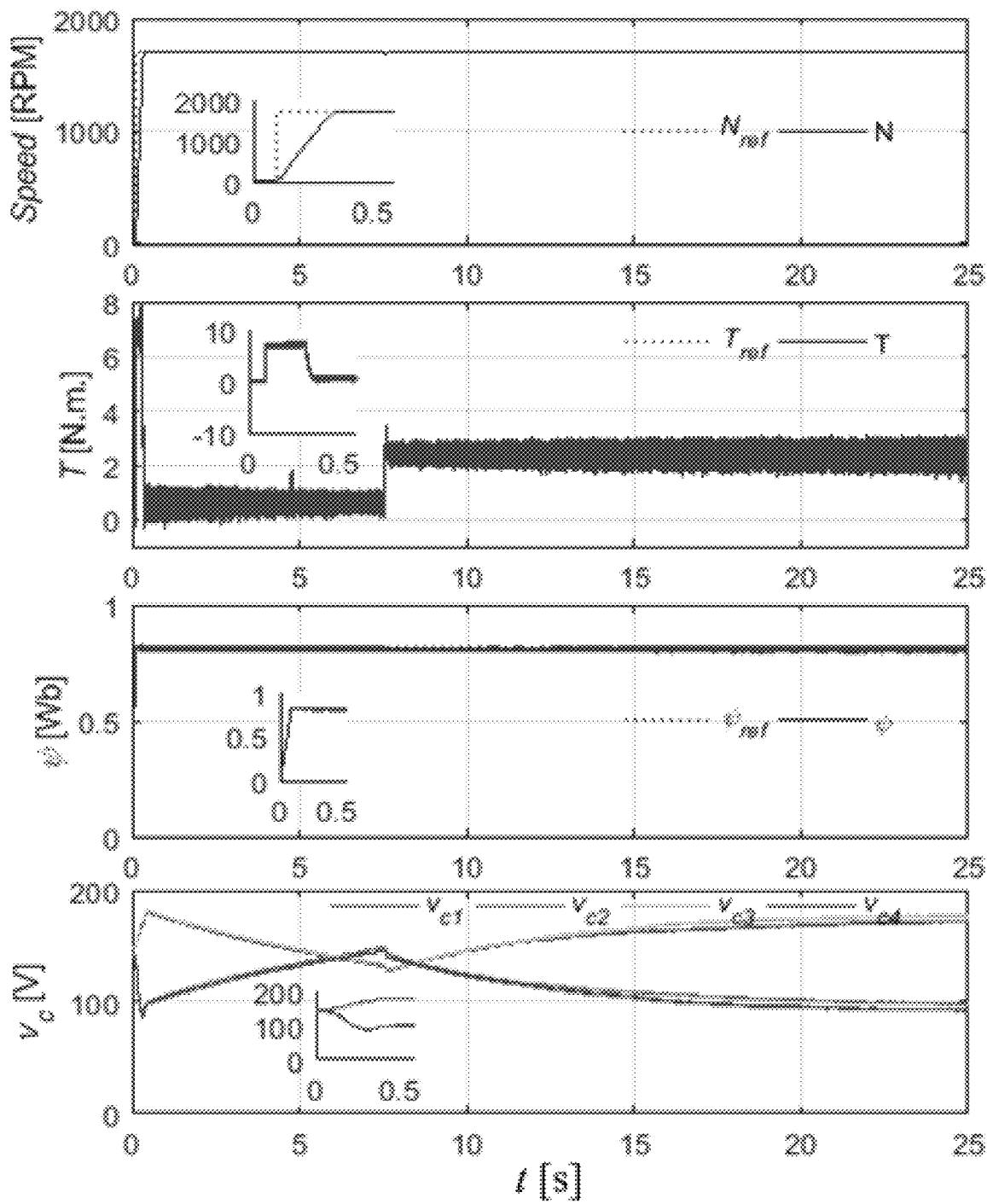
FIG. 13 illustrates the experimental results for the motor speed, torque and flux along with capacitor voltages without considering capacitor balancing.
Figure 14A:
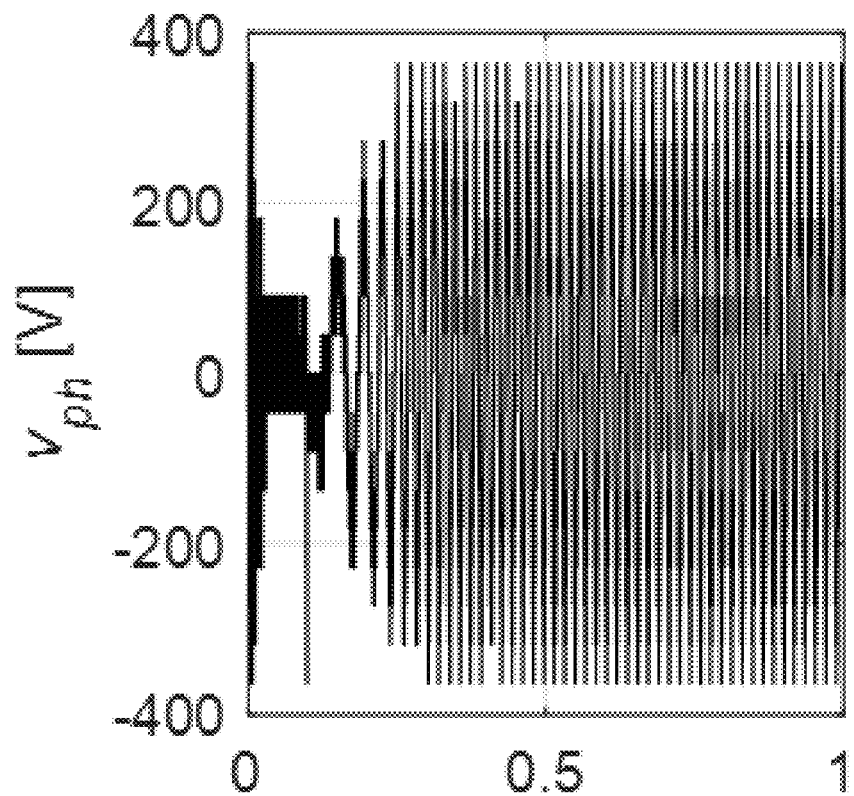
FIGS. 14A-14D illustrate the experimental results for the motor phase voltage and current for phase AA' of FIG. 1 without considering capacitor balancing.
Figure 14B:
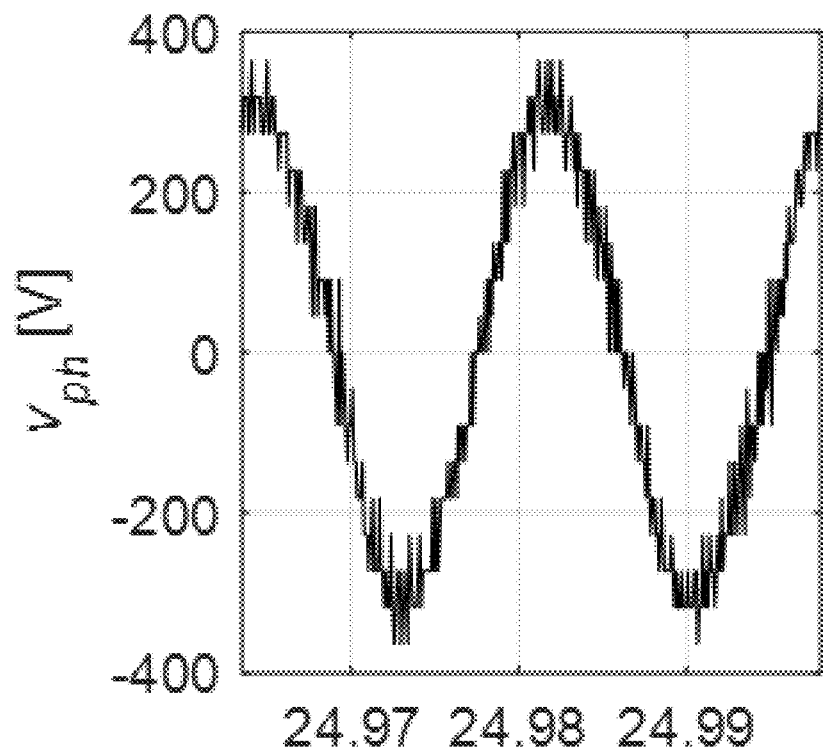
Figure 14C:
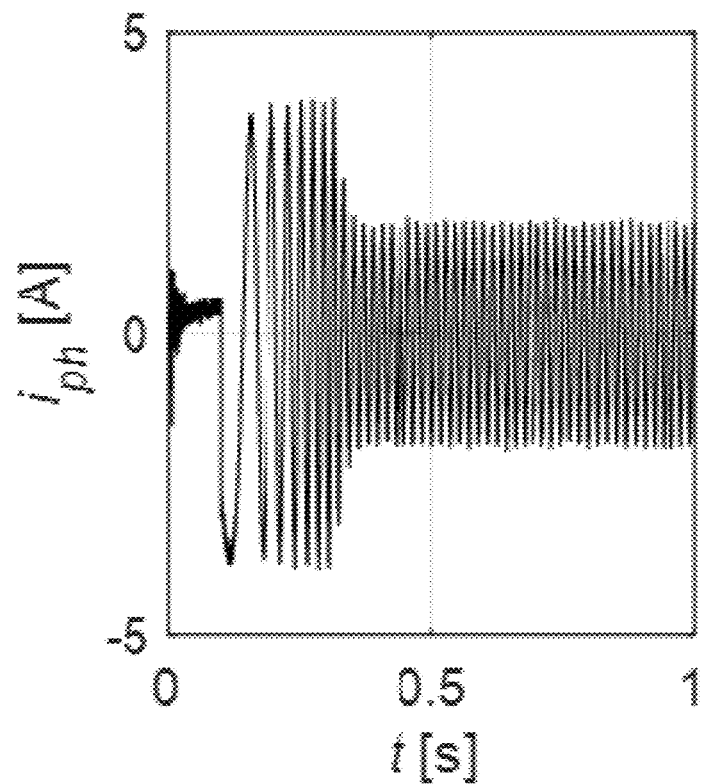
Figure 14D:
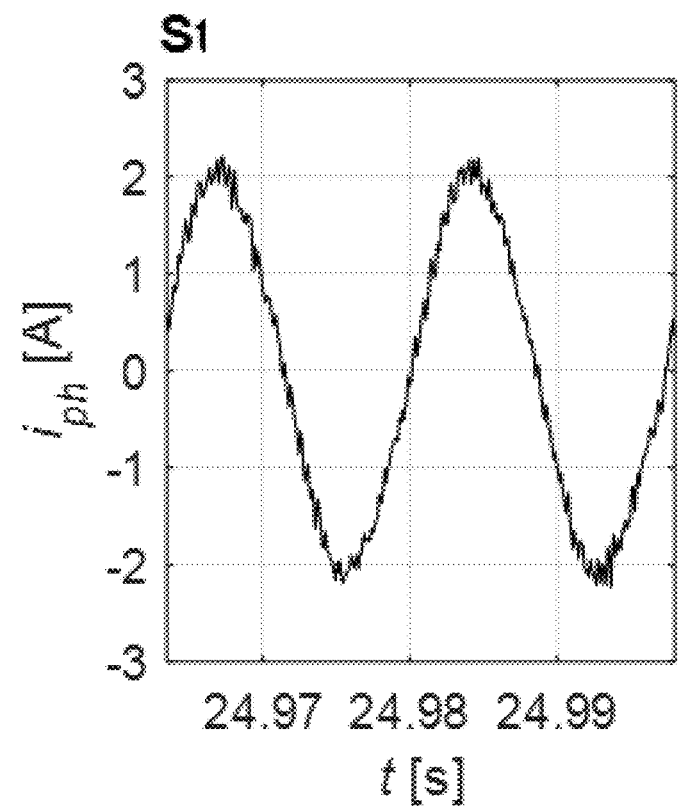

Similar trends for the torque and flux ripples can be observed in the experimental results of FIG. 13. The torque and flux ripples are 1.39 N·m. (55.6% of reference torque) and 0.024 Wb (2.94% of the reference flux) respectively. The voltage and current of the experimental results had distortions similar to that of simulation results. The motor phase voltage for the overall period of the experiment results is shown in FIG. 14A and the voltage at steady-state is shown in FIG. 14B. The motor current for the overall period of the experimental results is shown in FIG. 14C and the current at steady-state is shown in FIG. 14D.

Figure 15:
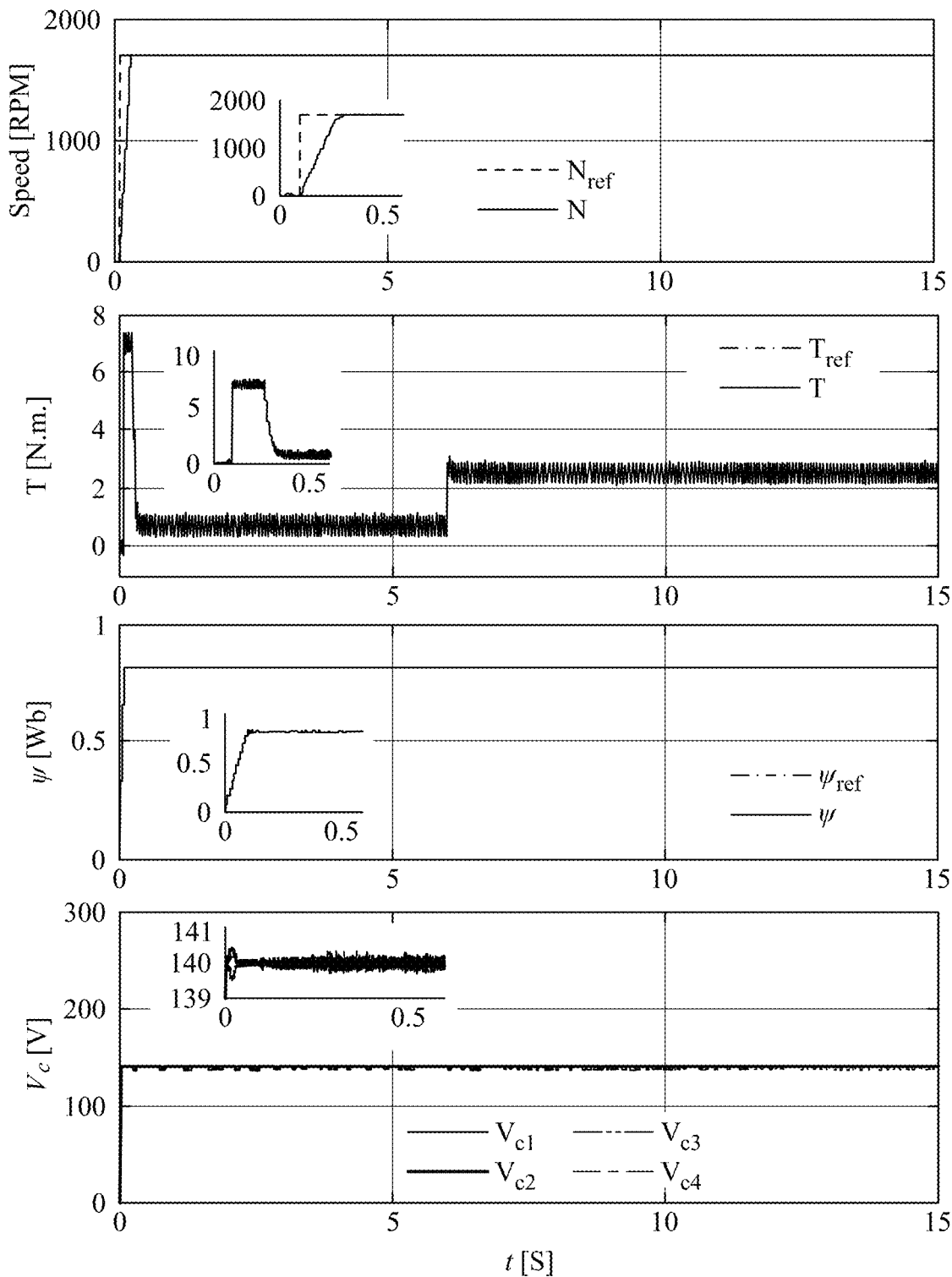
FIG. 15 illustrates a simulation of the motor speed, torque and flux along with capacitor voltages while considering capacitor balancing.
Figure 16A:
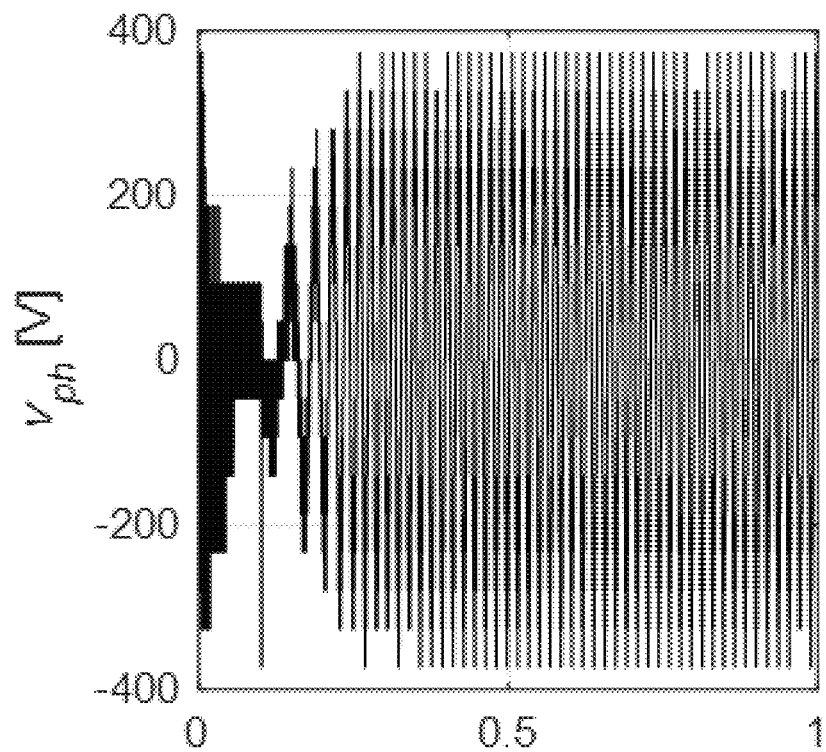
FIGS. 16A-16D illustrate a simulation of the motor phase voltage and current for phase AA' while considering capacitor balancing.
Figure 16B:
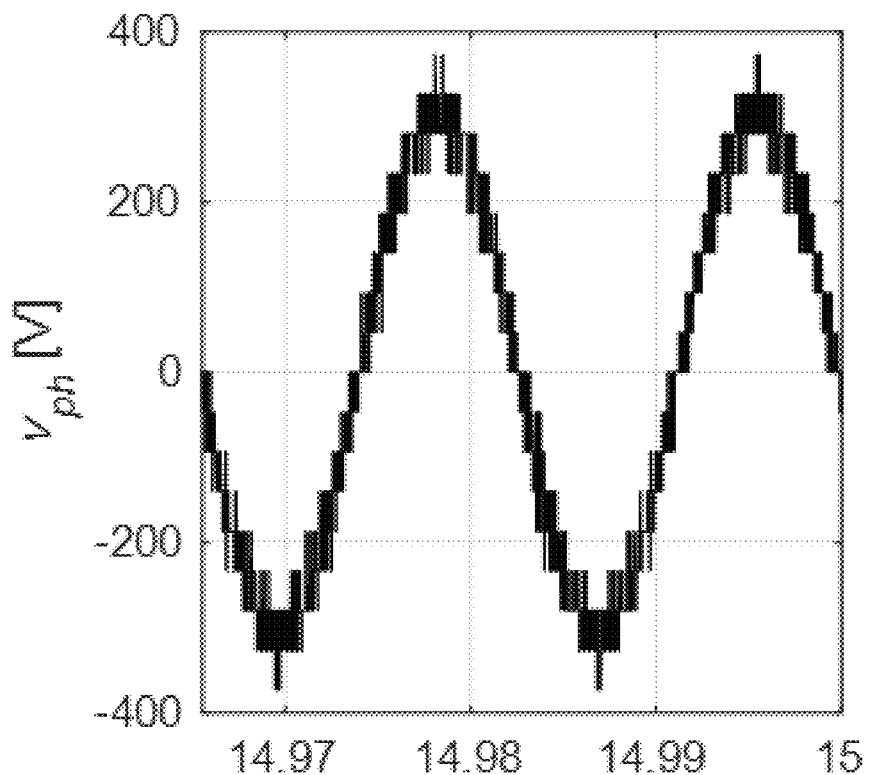
Figure 16C:
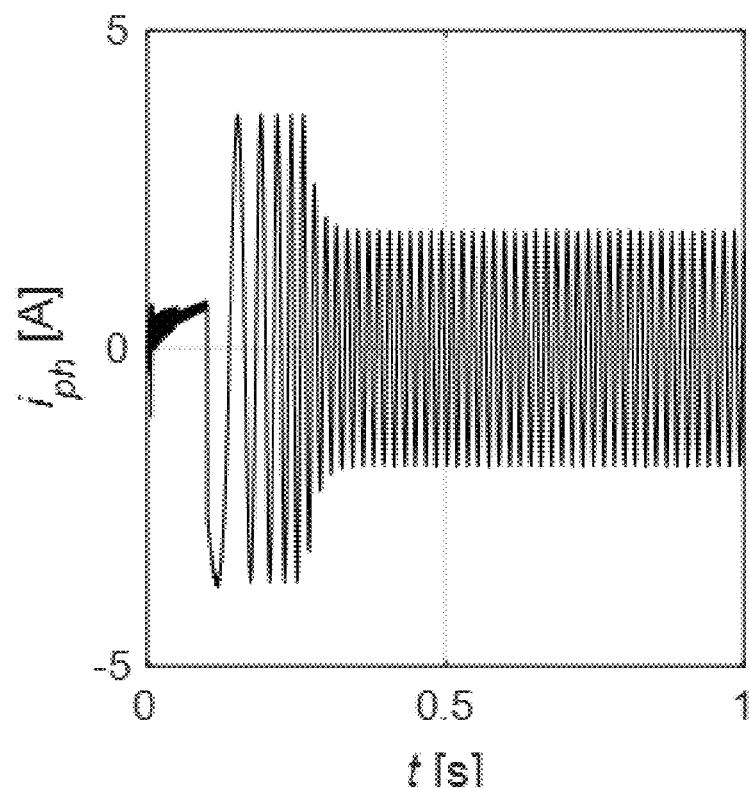
Figure 16D:
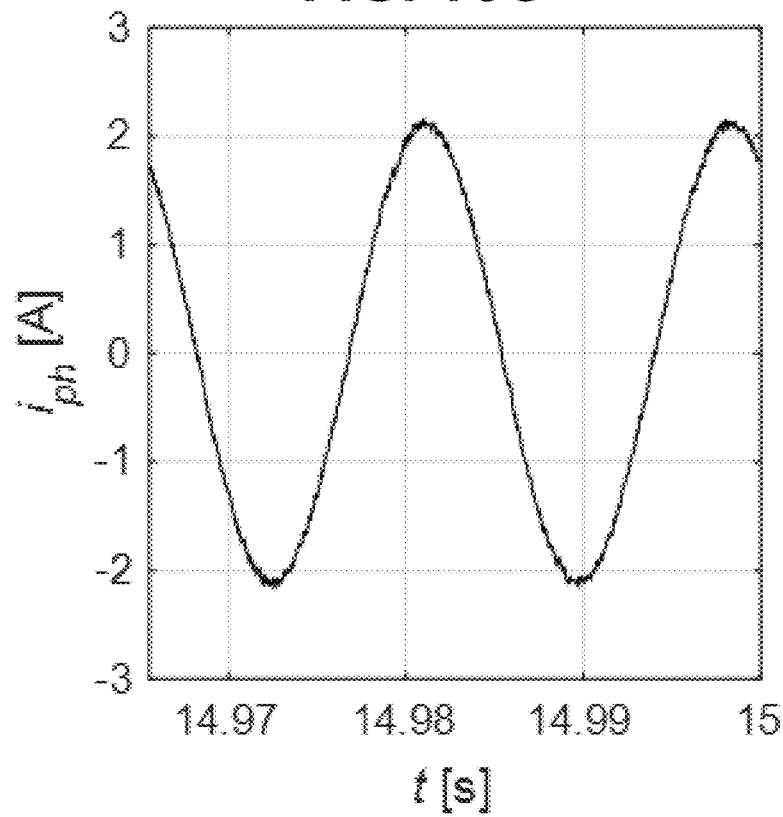

In Case 2, the capacitor balancing approach was first simulated and then experimentally tested. The torque and flux ripples were 20% and 1.2% of the torque and flux commands, respectively. These ripples have were decreased by 35.6% approximately compared to Case 1. Furthermore, it was observed that the capacitors voltage ripples were about 0.14% of the desired value. The simulated results are shown in FIG. 15. Therefore, the phase voltage steps were attained accurately as shown in FIG. 16A-16D. The motor phase voltage for the overall period of the simulation is shown in FIG. 16A and the voltage at steady-state is shown in FIG. 16B. The motor current for the overall period of the simulation is shown in FIG. 16C and the current at steady-state is shown in FIG. 16D.

Figure 17:
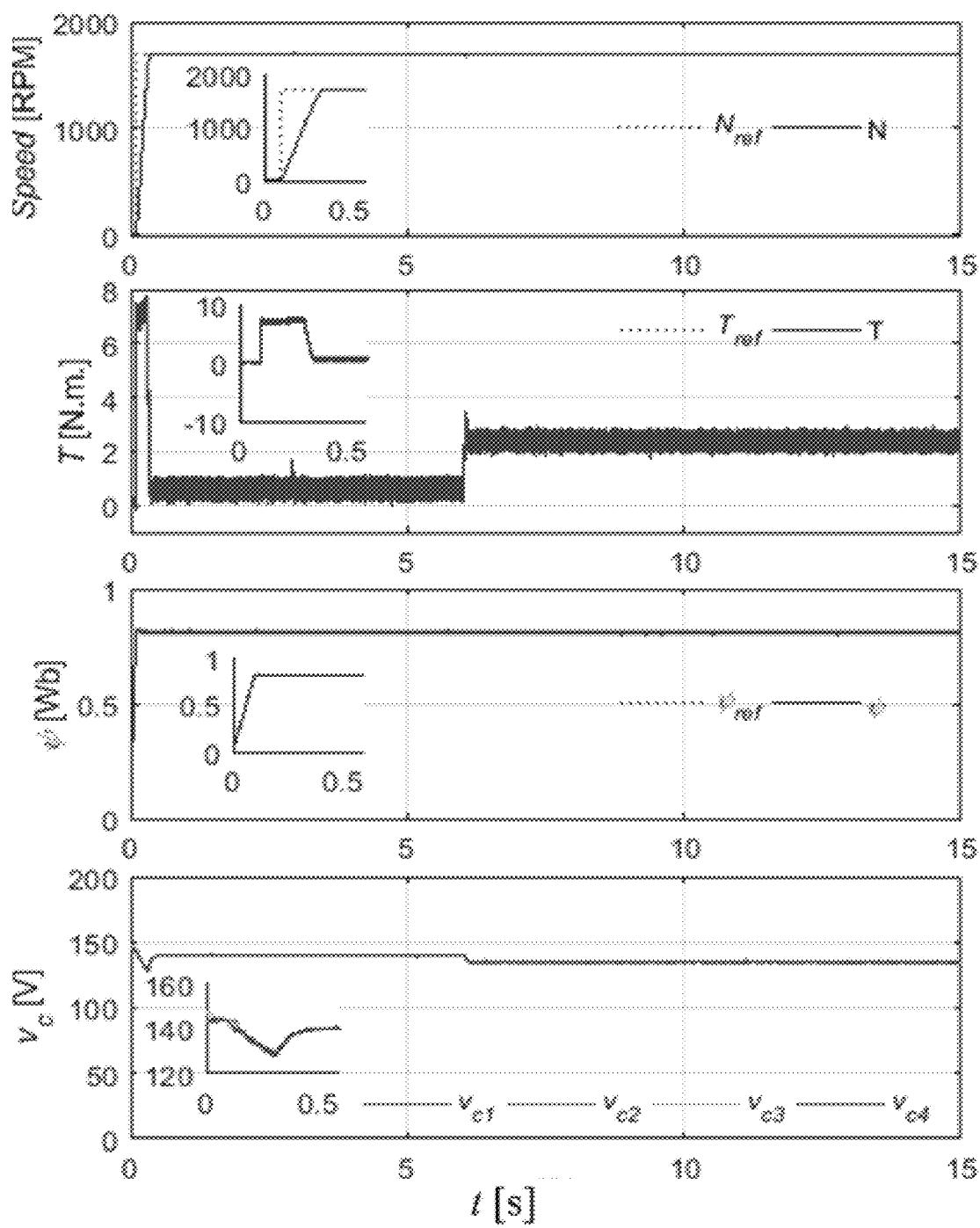
FIG. 17 illustrates the experimental results for the motor speed, torque, and flux along with capacitor voltages while considering capacitor balancing.

The corresponding experimental results for Case 2 are shown in FIG. 17 and FIG. 18A-18D. FIG. 17 shows that the motor speed, flux, and torque follow their reference values accurately. The torque and flux ripples are 0.64 N·m. (25.6% of the reference torque) and 0.011 Wb. (1.3% of the reference flux) respectively, thus the capacitor voltages were balanced. However, a small change in the capacitor voltage, compared to simulation results (FIG. 15), at the transient period is observed as seen in FIG. 17.

Figure 18A:
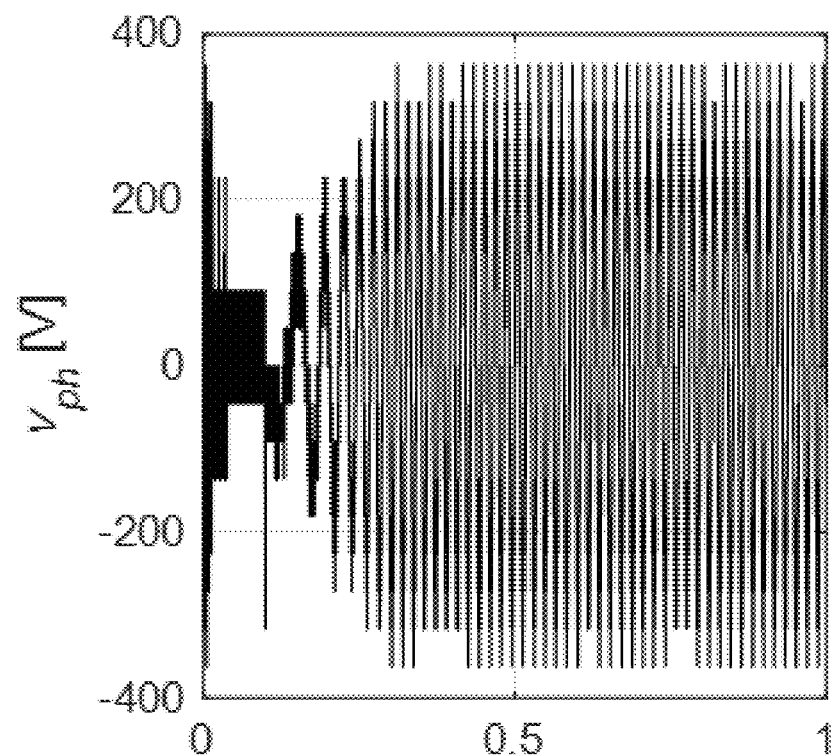
FIG. 18A-18D illustrate the experimental results for the motor phase voltage and current for phase AA' while considering capacitor balancing.
Figure 18B:
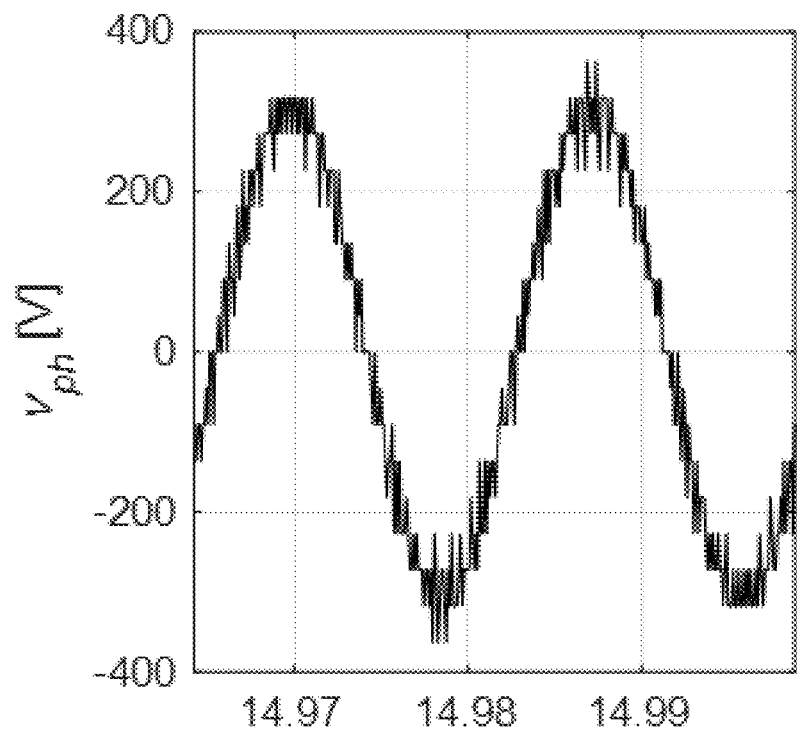
Figure 18C:
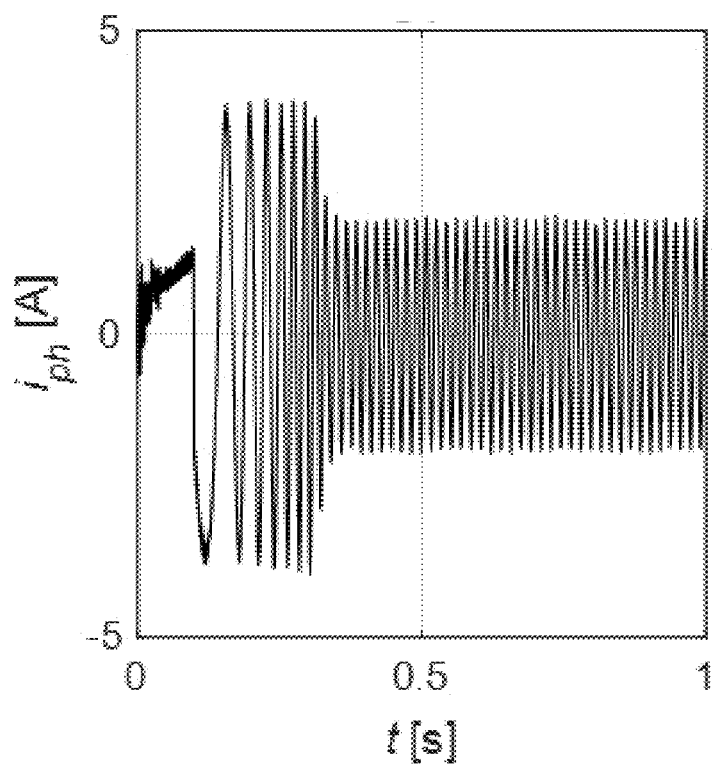
Figure 18D:
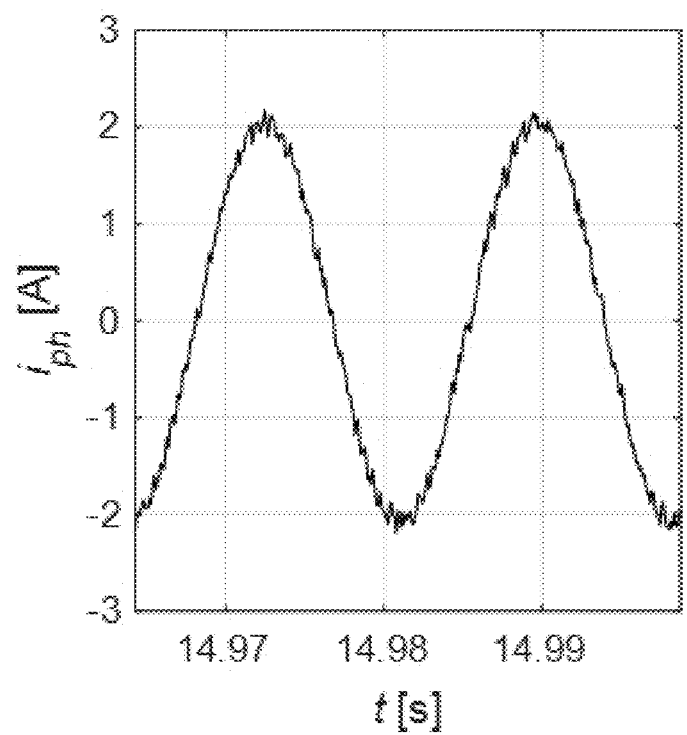

This small difference is attributed to the unregulated DC supply in experimental test where the voltage drops due to large starting current. In addition, it can be observed that the capacitor voltages have reduced during the loading period (from t=6 s) as the rectifier supply is unregulated. However, the controller was able to achieve the capacitor balancing for the new loading case. Similarly, the voltage and current have lower distortions compared to Case 1. The motor phase voltage and current during transient period and during steady-state are shown in FIG. 18A-18D. The motor phase voltage for the overall period of the experiment results is shown in FIG. 18A and the voltage at steady-state is shown in FIG. 18B. The motor current for the overall period of the experimental results is shown in FIG. 18C and the current at steady-state is shown in FIG. 18D.

Since the unbalanced capacitor voltages distort the motor phase voltage steps and increase the harmonic contents, the torque and flux ripples are expected to increase. To verify the impact of unbalanced capacitor voltages on the machine performance, the torque and flux ripples were observed and given in Table V for Case 1 and Case 2. It can be seen that the torque ripples in Case 2 have been substantially reduced by 58% and 52.4% as compared to Case 1 for simulation and experimental results, respectively. Likewise, the flux ripples have been reduced by 54% for both simulation and experimental results.

TABLE V

SUMMARY FOR THE MACHINE VARIABLES PERFORMANCE FOR THE DIFFERENT EXECUTED TESTS

| Test | | $T_{ripples}$ [%] | $\Psi_{ripples}$ [%] | $V_{rsp\text{-}ripples}$ [%] | THD i [%] | THD v [%] |
|---|---|---|---|---|---|---|
| Case-1 | Sim. | 48.0 | 2.57 | 35 | 5.71 | 20.52 |
|  | Exp. | 55.6 | 2.94 | 35 | 6.28 | 21.99 |
| Case-2 | Sim. | 20 | 1.23 | 0.6 | 2.83 | 18.52 |
|  | Exp. | 25.6 | 1.35 | 1.0 | 3.43 | 19.87 |

Figure 19A:
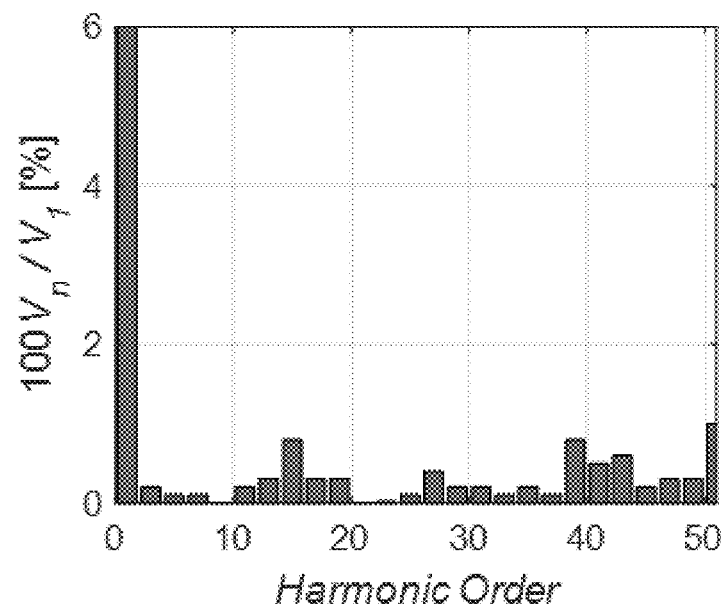
FIGS. 19A-19D are graphs illustrating the phase voltage spectra.
Figure 19B:
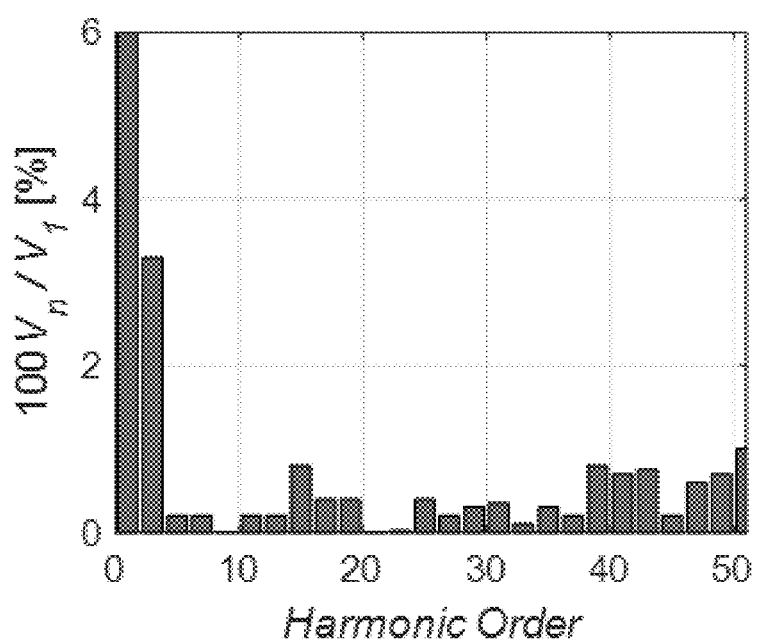
Figure 19C:
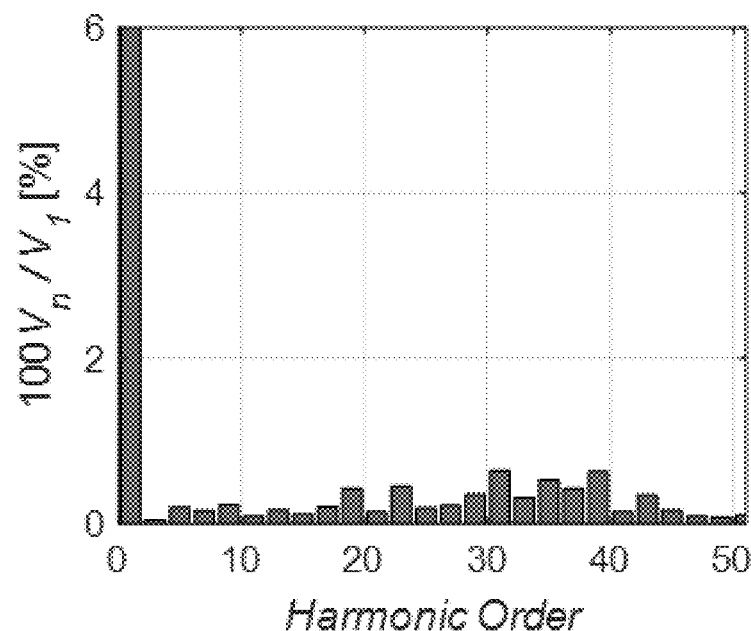
Figure 19D:
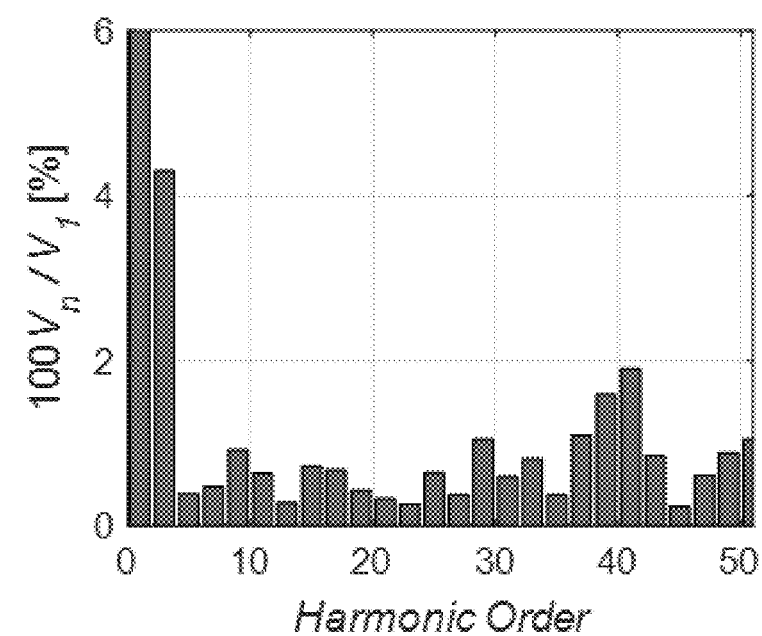
Figure 20A:
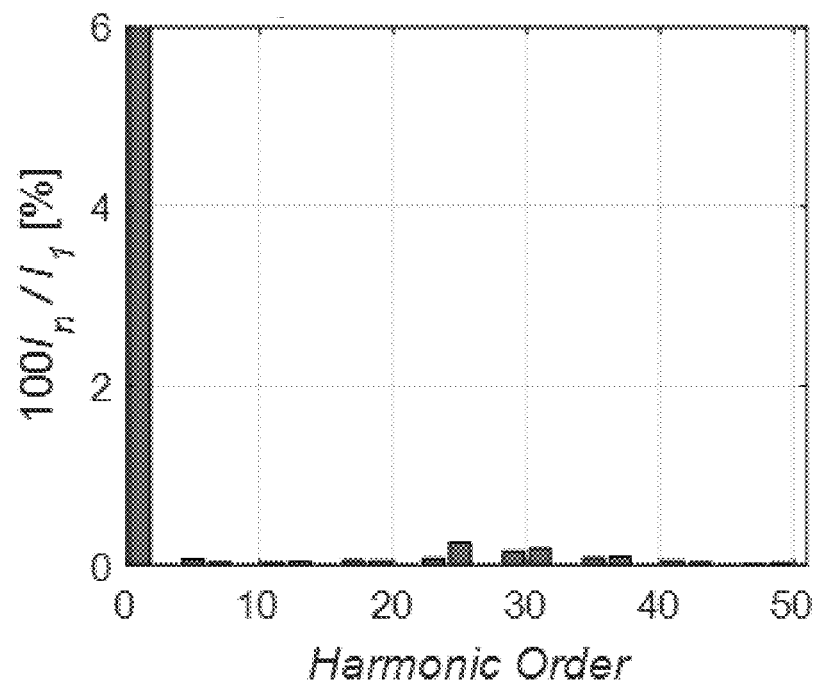
FIGS. 20A-20D are graphs illustrating the phase current spectra.
Figure 20B:
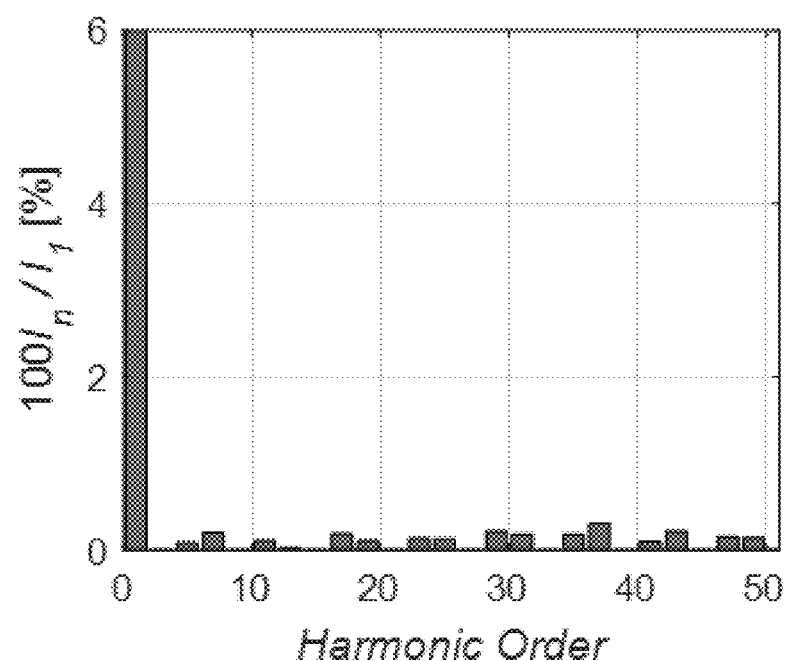
Figure 20C:
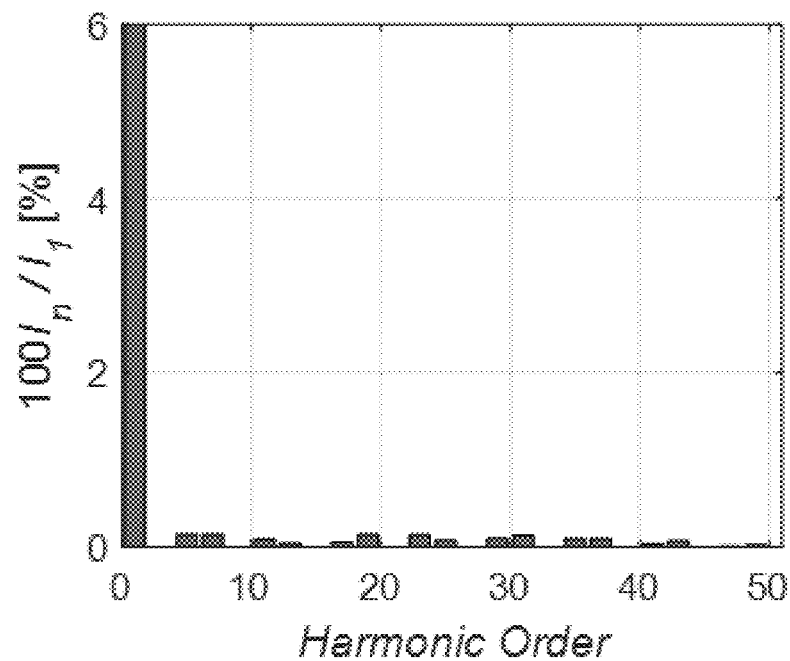
Figure 20D:
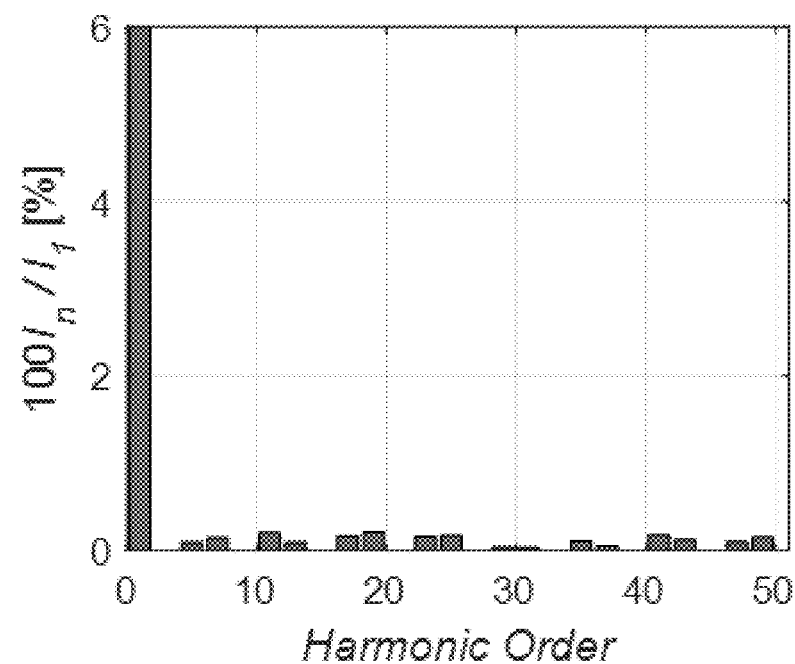

The harmonic analysis for AC drives is important as it may give a clear vision about the machine losses, shaft vibrations, and expected machine lifetime. Therefore, a study for the harmonic contents of the motor phase voltage and current was carried out. The harmonic evaluation is carried out as follows. Firstly, a Fourier series was applied to the simulation and experimental voltages and currents waveforms. Then, the distortion of each harmonic order was calculated as a percentage of the fundamental component. The voltage and current spectra obtained are shown in FIG. 19A-19D and FIG. 20A-20D, respectively. FIG. 19A shows the harmonics for the experimental voltage for balanced capacitors. FIG. 19B shows the harmonics for the experimental voltage for unbalanced capacitors. FIG. 19C shows the harmonics for the simulated voltage for balanced capacitors. FIG. 19D shows the harmonics for the simulated voltage for unbalanced capacitors. FIG. 20A shows the harmonics for the experimental current for balanced capacitors. FIG. 20B shows the harmonics for the experimental current for unbalanced capacitors. FIG. 20C shows the harmonics for the simulated current for balanced capacitors. FIG. 20D shows the harmonics for the simulated voltage for unbalanced capacitors. It can be seen from FIG. 19A-19D and FIG. 20A-20D that similar harmonic orders are observed in simulation and experimental results.

In addition, the total harmonic distortion (THD) was calculated for the simulated and experimental results from Case 1 and Case 2. The THD factor is expressed as follows:

$$THD = \sqrt{\left(\frac{V_{rms}}{V_1^{rms}}\right)^2 - 1} \qquad (24)$$

The values of the THD factor for the different case studies are listed in Table V. The harmonic analysis reflects the impact of capacitor unbalancing on the voltage and current harmonics. By comparing Case 1 and Case 2, it can be observed that the current THD values are reduced by 50.43% and 45.38% for simulation and experimental results respectively. Correspondingly, the voltage THD values are decreased by 9.74% and 9.64% for simulation and experimental results respectively.

Since the number of switching states in the proposed MPC technique was reduced from 729 to 65, the execution time of the developed MPC code was tremendously reduced. It was observed that the execution time of the procedure of the present disclosure is 23 µs compared to 5.5 ms in case of the conventional technique with all 729 switching states. It can be concluded that the procedure of the present disclosure reduces the computational time by 99.58%.

Additionally, the cascaded optimization approach for the cost function reduced the redundant switching states at the expense of the degree of freedom of the capacitor balancing cost function. However, the results given in Table V demonstrate that the maximum capacitor voltage ripple was approximately 1% using the selected four redundant switching states, which was in an acceptable range. On the other hand, the selected switching states that represent the high-effect group cover all charging and discharging possibilities of the two capacitors.

Model predictive control for a dual T-type drive system based SiC MOSFET was introduced and tested with an open-ends induction motor load. A mathematical model for the drive system operation was developed. The predictive torque control and capacitor balancing mechanism of the present disclosure have been applied to the drive system. An advanced and fast technique for capacitor balancing using a reduced number of switching states was developed and implemented. The major features of the procedures of the present disclosure lie in avoiding the difficulty of weighting factor tuning in the conventional model predictive control cost function, reducing the number of switching states used with the same number of voltage vectors, and hence reducing the computational time for MPC technique. Compared to the reported literature with the complete switching states, the proposed approach significantly reduced the switching states and number of evaluations by 66.94% and 91.08%, respectively. This reduced the computational time by 99.58% with the digital controller platform used. The full agreement of the simulation and experimental results demonstrated the effectiveness and validity of the approach of the present disclosure.

Table VI shows the rated motor parameters and component values used in equations (6) to (22).

| MOTOR PARAMETERS | | | |
| --- | --- | --- | --- |
| Parameter | Value | Parameter | Value |
| $P_r$ | 1 kW | $T_{rated}$ | 5.5 Nm |
| $V_{rated}$ (ph) | 220 V | $\|\psi_s\|_{rated}$ | 0.8157 Wb |
| $I_{rated}$ | 2.2 A | $R_r$ | 6.0373 Ω |
| $N_{rated}$ | 1710 rpm | $L_r$ | 0.4577 H |
| $R_s$ | 8.15 Ω | $n_p$ | 2 |
| $L_a$ | 0.4577 H | J | 0.007 kg · m$^2$ |
| $L_m$ | 0.4372 H | B | 0.004 N/(rad/s) |

The first embodiment is illustrated with respect to FIGS. 1, 3, 6, 7, 10 and 21. The first embodiment describes a method for torque control and capacitor balancing of a dual three-level (3L) T-type multilevel converter 100 connected to an open ends three-phase induction motor (OEIM) 130 having a stator and a rotor and first, second and third parallel phase paths connected between a first end and a second end, each multilevel converter including two capacitors ($C_1$, $C_2$ or $C_3$, $C_4$) and a plurality of silicon carbide (SiC) semiconductor switches ($Q_{1x}$, $Q_{2x}$, $Q_{3x}$, $Q_{4x}$, or $Q_{1x'}$, $Q_{2x'}$, $Q_{3x'}$, $Q_{4x'}$, x=a, b, c), comprising selecting a first set of voltage vectors, each voltage vector (see voltage vector map, FIG. 3) including a set of four possible switching states (for example, vector $c_1$ representing [ONN, N'P'P'] states, FIG. 1, 3) of the plurality of silicon carbide (SiC) semiconductor switches, evaluating a first cost function ($J_1$) for each voltage vector of the first set of voltages vectors to generate a set of first cost functions, minimizing the set of first cost functions, identifying the voltage vector which minimizes the first cost function, identifying four redundant switching states of the voltage vector which minimizes the first cost function, evaluating a second cost function ($J_2$) using the four redundant switching states and generating a set of second cost functions, minimizing the set of second cost functions; identifying the switching state which minimizes the second cost function, updating the switching states with the switching state which minimizes the second cost function, generating gating signals for the SiC semiconductor switches using the switching state which minimizes the second cost function, applying the gating signals (u1, u2, FIG. 6 generated by gate driver circuits 1037, 1039, FIG. 10) to the SiC semiconductor switches to actuate the OEIM and balance the capacitors.

The method further includes receiving a rated torque value, $T_{rated}$, a reference torque value, $T^{ref}$, a rated stator flux value, $\|\psi_{s\_rated}\|$, a reference stator flux value, $\psi_s^{ref}$ and a flux weighting factor $K_\psi$, estimating a first step torque value of the OEIM, estimating a first step flux value deviation of the OEIM, evaluating the first cost function ($J_1$) based on:

$$J_1 = \frac{|T^{ref} - T^{k+2}|}{T_{rated}} + K_\psi \frac{|\|\psi_s^{ref}\| - \|\psi_s^{k+2}\||}{\|\psi_{s\_rated}\|},$$

for each voltage vector, k, of the first set of voltage vectors, where k=1 to 61, wherein minimizing the set of first cost functions generates a voltage vector which minimizes the torque and flux deviations of the three-phase induction motor.

The method further includes measuring a voltage $V_s$ across the stator for each voltage vector and identifying the voltage vector ($V_{opt-1}$) which minimizes the first cost function ($J_1$) based on $$V_{opt-2} = \arg\min_{\{V_1...V_4\}} J_2(V_s^{k+1}),$$

determining a set of switching states of the optimum voltage vector ($V_{opt-1}$), measuring a first set of voltages of the capacitors ($C_1$, $C_2$, $C_3$ and $C_4$) of the multilevel converter, evaluating the second cost function ($J_2$) based on $J_2=|v_{C1}^{k+1}-v_{C2}^{k+1}|+|v_{C3}^{k+1}-v_{C4}^{k+1}|$ and minimizing the set of second cost functions based on $$V_{opt-1} = \arg\min_{\{V_1...V_{61}\}} J_1(V_s^{k+1}),$$

wherein minimizing the second cost function balances the capacitor voltages.

The method continuously estimates the torque and flux by measuring a second set of voltages of the capacitors, measuring the currents through the phase paths and the speed of the rotor of the OEIM, predicting a second step torque value and a second step flux value, subtracting the second step torque value and the second step flux value from the reference torque value $T_{ref}$ and the reference stator flux value $\psi_s^{ref}$ respectively to generate torque and flux deviations, identifying a deviation in the first cost function optimum vector and identifying the corresponding voltage vector used in the second cost function evaluation.

The method continuously monitors the capacitor voltage balance by measuring a set of voltages of the capacitors of the multilevel converter, predicting a first set of capacitor voltages based on current and voltage measurements, determining the capacitor voltage deviations between the first set of predicted voltages and the reference capacitor of voltages, comparing the capacitor voltage deviation to a capacitor voltage deviation threshold, recalculating the second cost function using the second set of voltages, identifying the switching state which minimizes the second cost function, updating the switching states with the switching state which minimizes the second cost function, generating gating signals for the SiC semiconductor switches using the switching state which minimizes the second cost function, applying the gating signals to the SiC semiconductor switches to actuate the OEIM and balance the capacitors.

The second embodiment is illustrated with respect to FIGS. 1, 3, 6, 7, 10 and 21. The second embodiment describes a system for torque control and capacitor balancing of a dual three-level (3L) T-type multilevel converter 100 connected to an open ends three-phase induction motor (OEIM) 130 having a stator and a rotor (not shown) and first, second and third parallel phase paths (130$_A$, 130$_B$, 130$_C$, FIG. 1) connected between a first end and a second end, comprising a first (3L) T-type converter 112 connected to the first end of the OEIM and a second 3L T-type converter 122 connected to the second end of the OEIM, a first voltage source block 114 connected to the first converter and a second voltage source block 124 connected to the second converter, each voltage source block including a first capacitor in series with a second capacitor ($C_1$, $C_2$ or $C_3$, $C_4$), wherein each voltage source block has a positive connector (P), a negative connector (N) and a common connector (O), wherein each 3L T-type converter includes first, second and third phase legs (A, B, C, FIG. 1), each phase leg including first ($Q_{4x}$) and second series connected switches ($Q_{2x}$), wherein the first switch is connected to the common connector and the second switch is connected to a terminal of one of the phase paths (A, for example), a third switch ($Q_{3x}$) connected between the positive connector and the terminal of the one of the phase paths and a fourth switch ($Q_{1x}$) connected to the negative connector and the terminal (A) of the one of the phase paths, a plurality of sensors (M1-M6, FIG. 6) to measure system parameters, a control system 650 having circuitry connected to the switches of each 3L T-type converter and the plurality of sensors, the control system having circuitry and program instructions stored within that, when executed by one or more processors, cause the one or more processors to generate gating signals to the switches which reduce torque and flux ripples in the phase paths and balance the capacitor voltages.

The plurality of sensors include a plurality of voltage transducers configured to measure voltages of the capacitors (M1-M4), an encoder M6 configured to measure an angular speed of a shaft of the OEIM and a plurality of current transducers (M5) to measure current in each of the phase paths.

Figure 21:
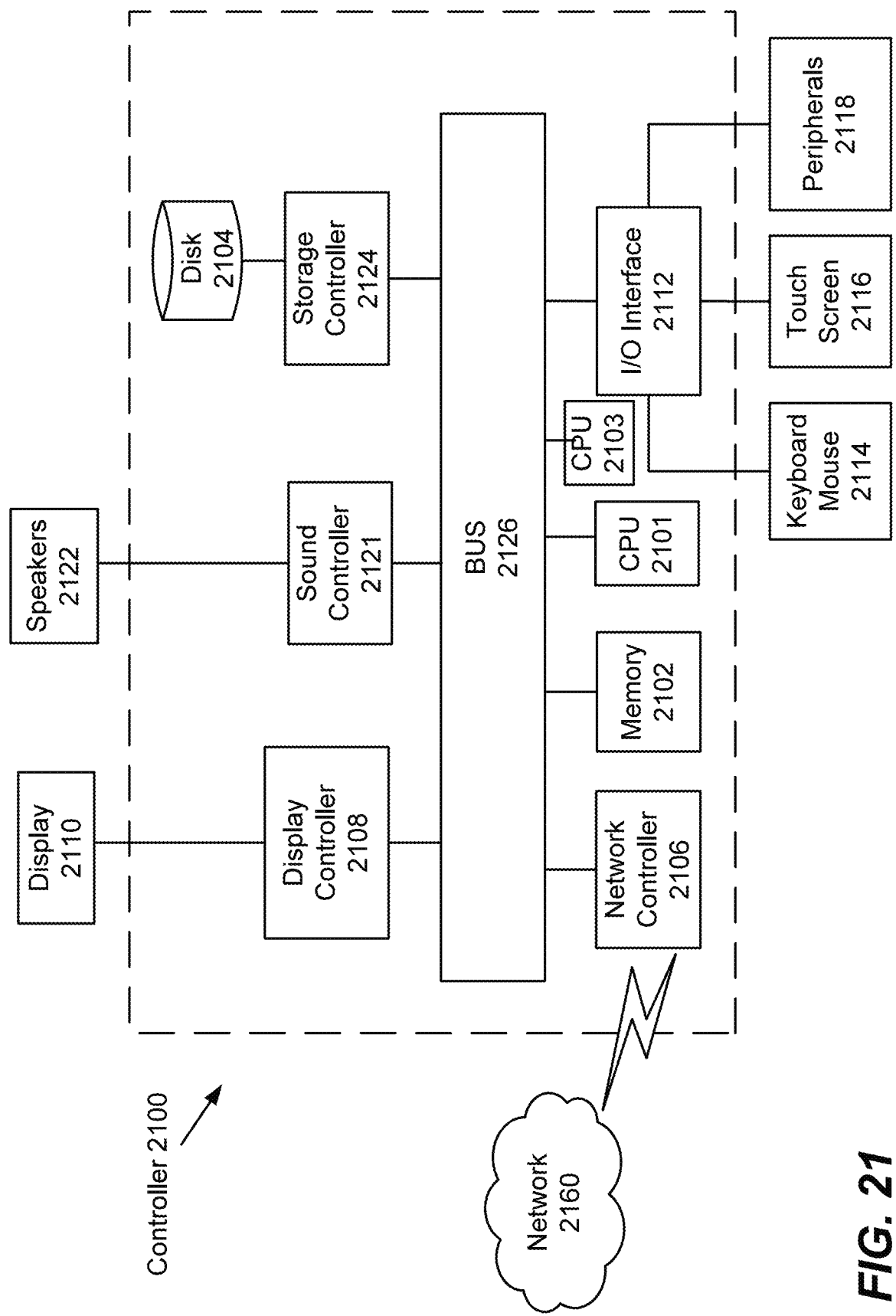
FIG. 21 is an illustration of a non-limiting example of details of computing hardware used in the computing system, according to certain embodiments.

The circuitry of the control system is illustrated in FIG. 6, 10 and FIG. 21) and further comprises an input/output port (2112, FIG. 21) configured for receiving a rotor angular speed reference value $\omega_{ref}$, a first flux weighting factor ($K_\psi$), a rated torque value, $T_{rated}$, a rated stator flux value, $\|\psi_{s\_rated}\|$, and a reference stator flux, value $\psi_s^{ref}$, an adder 656 operatively connected to the input/output port and the encoder 658, the adder configured to subtract the rotor angular speed from the rotor angular speed reference value $\psi_{ref}$ and generate a difference rotor flux value, a proportional integral derivative (PID) controller 654 connected to the adder and configured to receive the difference rotor flux value and generate a reference torque value $T^{ref}$, a computer processing unit (CPU) 652 configured to execute the program instructions to generate the gating signals.

The program instructions are configured to select a first set of voltage vectors, evaluate a first cost function ($J_1$) for each voltage vector of the first set of voltages vectors to generate a set of first cost functions, minimize the set of first cost functions, identify the voltage vector which minimizes the first cost function, select four redundant switching states of the voltage vector which minimizes the first cost function, evaluate a second cost function ($J_2$) for the four redundant switching states which to generate a set of second cost functions, minimize the set of second cost functions, identify the switching state which minimizes the second cost function, update the switching states with the switching state which minimizes the second cost function, and generate the gating signals based on the switching state which minimizes the second cost function.

The CPU further comprises program instructions to estimate a first torque value and a first flux value of the OEIM from the measured currents and angular speed, predict a first step torque value and a first step flux value, evaluate the set of first cost functions ($J_1$) based on $$J_1 = \frac{|T^{ref} - T^{k+2}|}{T_{rated}} + K_\psi \frac{|\|\psi_s^{ref}\| - \|\psi_s^{k+2}\||}{\|\psi_{s\_rated}\|},$$

for each voltage vector, k, of the first set of voltage vectors, where k=1 to 61, and generate a voltage vector which minimizes the torque and flux deviations of the three-phase induction motor.

The CPU further comprises program instructions to identify the voltage vector ($V_{opt-1}$) which minimizes the first cost function ($J_1$) based on $$V_{opt-1} = \arg\min_{\{V_1...V_{61}\}} J_1(V_s^{k+1}),$$

where $V_s^{k+1}$ is a stator terminal voltage for k=1 to 61 and to evaluate the second cost function ($J_2$) based on $J_2=|v_{C1}^{k+1}-v_{C2}^{k+1}|+|v_{C3}^{k+1}-v_{C4}^{k+1}|$, and to minimize the set of second cost functions based on $$V_{opt-2} = \arg\min_{\{V_1...V_4\}} J_2(V_s^{k+1}).$$

The CPU further comprises program instructions configured to receive a torque reference value and a flux reference value, estimate the torque and flux values from the measured currents and angular speed, predict a torque first horizon step value and a flux first horizon step value, subtract the predicted torque first horizon step value and the flux first horizon step value from the torque and flux reference values, respectively, predict a second horizon step torque value and a second horizon step flux value based on the first step predicted torque and flux values, respectively, subtract the predicted horizon step torque value and a second horizon step flux value from the torque and flux reference values, respectively, evaluate the first cost function for the first set of voltage vectors, and identify the voltage vector that minimizes the cost function deviation.

The CPU further comprises program instructions configured to monitor the capacitor voltages and predict a set of first step capacitor voltages, determine a capacitor voltage deviation between the monitored capacitor voltages and the first step capacitor voltages, predict a set of second step capacitor voltages based on the first step capacitor voltages and the capacitor voltage deviation, identify the switching state which minimizes the second cost function, update the switching states with the switching state which minimizes the second cost function, generate gating signals for the switches using the switching state which minimizes the second cost function, apply the gating signals to the switches to actuate the OEIM and balance the capacitors.

Each switch is a SiC MOSFET semiconductor switch in parallel with a diode, wherein the diodes of the first and second switches are antiparallel to each other, and wherein the diodes of the third and fourth switches are parallel to each other.

The third embodiment is illustrated with respect to FIGS. 1, 3, 6, 7, 10 and 21. The third embodiment describes a non-transitory computer readable medium having instructions stored therein that, when executed by one or more processors, cause the one or more processors to perform a method for torque control and capacitor balancing of a dual three-level (3L) T-type multilevel converter connected to an open ends three-phase induction motor (OEIM) having a stator and a rotor and first, second and third parallel phase paths connected between a first end and a second end, each multilevel converter including two capacitors and a plurality of silicon carbide (SiC) semiconductor switches, comprising selecting a first set of voltage vectors, evaluating a first cost function ($J_1$) for each voltage vector of the first set of voltages vectors and generating a set of first cost functions, minimizing the set of first cost functions, identifying the voltage vector which minimizes the first cost function, selecting four redundant switching states of the voltage vector which minimizes the first cost function, evaluating a second cost function ($J_2$) for for the four redundant switching states to generate a set of second cost functions, minimizing the set of second cost functions, identifying the switching state which minimizes the second cost function, updating the switching states with the switching state which minimizes the second cost function, generating gating signals for the SiC semiconductor switches using the switching state which minimizes the second cost function, and applying the gating signals to the SiC semiconductor switches to actuate the OEIM and balance the capacitors.

The non-transitory computer readable medium method further comprises performing two step model predictive control including performing a first step model predictive control process, including receiving a rated torque value, $T_{rated}$, a reference torque value, $T^{ref}$, a rated stator flux value, $\|\psi_{s\_rated}\|$, a reference stator flux value, $\psi_s^{ref}$, and a flux weighting factor $K_\psi$, estimating a first step torque value of the OEIM, estimating a first step flux value deviation of the OEIM, evaluating the first cost function ($J_1$) based on:

$$J_1 = \frac{|T^{ref} - T^{k+2}|}{T_{rated}} + K_\psi \frac{\|\psi_s^{ref}\| - \|\psi_s^{k+2}\|}{\|\psi_{s\_rated}\|},$$

for each voltage vector, k, of the first set of voltage vectors, where k=1 to 61, identifying a first optimum voltage vector ($V_{opt-1}$) which minimizes the first cost function ($J_1$) based on:

$$V_{opt-1} = \arg\min_{\{V_1...V_{61}\}} J_1(V_s^{k+1}),$$

performing a second step model predictive control process, including determining a set of switching states of first optimum voltage vector, measuring a first set of voltages of the capacitors ($C_1$, $C_2$, $C_3$ and $C_4$) of the multilevel converter, and evaluating the second cost function ($J_2$) based on $J_2 = |v_{C1}^{k+1} - v_{C2}^{k+1}| + |v_{C3}^{k+1} - v_{C4}^{k+1}|$ for each of the switching states of ($V_{opt-1}$), minimizing the set of second cost functions based on:

$$V_{opt-2} = \arg\min_{\{V_1...V_4\}} J_2(V_s^{k+1}).$$

The non-transitory computer readable medium method further comprises receiving a torque reference value and a flux reference value, estimating the torque and flux values from the measured currents and angular speed, predicting a torque first horizon step value and a flux first horizon step value, subtracting the predicted torque first horizon step value and the flux first horizon step value from the torque and flux reference values, respectively, predicting a second horizon step torque value and a second horizon step flux value based on the first step predicted torque and flux values, respectively, subtracting the predicted horizon step torque value and a second horizon step flux value from the torque and flux reference values, respectively, evaluating the first cost function for the first set of voltage vectors, and identifying the voltage vector that minimizes the cost function deviation, monitoring the capacitor voltages and predicting a set of first step capacitor voltages, determining a capacitor voltage deviation between the monitored capacitor voltages and the first step capacitor voltages, predicting a set of second step capacitor voltages based on the first step capacitor voltages and the capacitor voltage deviation, identifying the switching state which minimizes the second cost function, updating the switching states with the switching state which minimizes the second cost function, generating gating signals for the switches using the switching state which minimizes the second cost function, applying the gating signals to the switches to actuate the OEIM and balance the capacitors.

In FIG. 21, a controller 2100 is described which is representative of the controlling circuits shown in FIGS. 6, 8 and 10 used to implement the simulation and experimental testing of the present disclosure. The controller is a computing device which includes a CPU 2101 which performs the processes described above/below. The process data and instructions may be stored in memory 2102. These processes and instructions may also be stored on a storage medium disk 2104 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2101, 2103 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 2101 or CPU 2103 may be a Xenon or Core processor from Intel of America or an Opteron processor from AMD of America, or may be other processor types that would be recognized by one of ordinary skill in the art. Alternatively, the CPU 2101, 2103 may be implemented on an FPGA, ASIC, PLD or using discrete logic circuits, as one of ordinary skill in the art would recognize. Further, CPU 2101, 2103 may be implemented as multiple processors cooperatively working in parallel to perform the instructions of the inventive processes described above.

The computing device in FIG. 21 also includes a network controller 2106, such as an Intel Ethernet PRO network interface card from Intel Corporation of America, for interfacing with network 2160. As can be appreciated, the network 2160 can be a public network, such as the Internet, or a private network such as an LAN or WAN network, or any combination thereof and can also include PSTN or ISDN sub-networks. The network 2160 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 2108, such as a NVIDIA GeForce GTX or Quadro graphics adaptor from NVIDIA Corporation of America for interfacing with display 2110, such as a Hewlett Packard HPL2445w LCD monitor. A general purpose I/O interface 2112 interfaces with a keyboard and/or mouse 2114 as well as a touch screen panel 2116 on or separate from display 2110. General purpose I/O interface also connects to a variety of peripherals 2118 including printers and scanners, such as an OfficeJet or DeskJet from Hewlett Packard.

A sound controller 2120 is also provided in the computing device such as Sound Blaster X-Fi Titanium from Creative, to interface with speakers/microphone 2122 thereby providing sounds and/or music.

The general purpose storage controller 2124 connects the storage medium disk 2104 with communication bus 2126, which may be an ISA, EISA, VESA, PCI, or similar, for interconnecting all of the components of the computing device. A description of the general features and functionality of the display 2110, keyboard and/or mouse 2114, as well as the display controller 2108, storage controller 2124, network controller 2106, sound controller 2120, and general purpose I/O interface 2112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 22.

Figure 22:
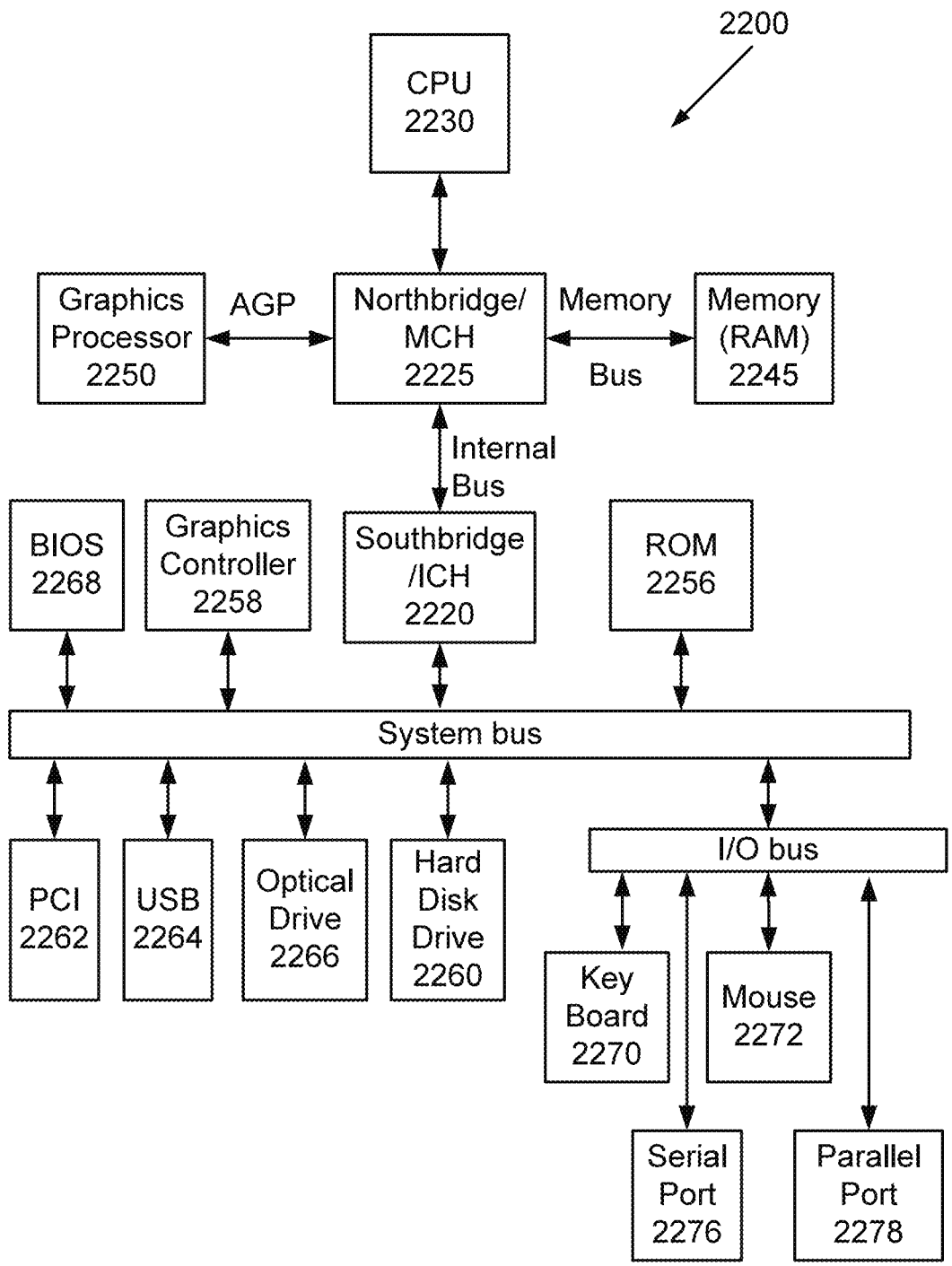
FIG. 22 is an exemplary schematic diagram of a data processing system used within the computing system, according to certain embodiments.

FIG. 22 shows a schematic diagram of a data processing system, according to certain embodiments, for performing the functions of the exemplary embodiments. The data processing system is an example of a computer in which code or instructions implementing the processes of the illustrative embodiments may be located.

In FIG. 22, data processing system 2200 employs a hub architecture including a north bridge and memory controller hub (NB/MCH) 2225 and a south bridge and input/output (I/O) controller hub (SB/ICH) 2220. The central processing unit (CPU) 2230 is connected to NB/MCH 2225. The NB/MCH 2225 also connects to the memory 2245 via a memory bus, and connects to the graphics processor 2250 via an accelerated graphics port (AGP). The NB/MCH 2225 also connects to the SB/ICH 2220 via an internal bus (e.g., a unified media interface or a direct media interface). The CPU Processing unit 2230 may contain one or more processors and even may be implemented using one or more heterogeneous processor systems.

Figure 23:
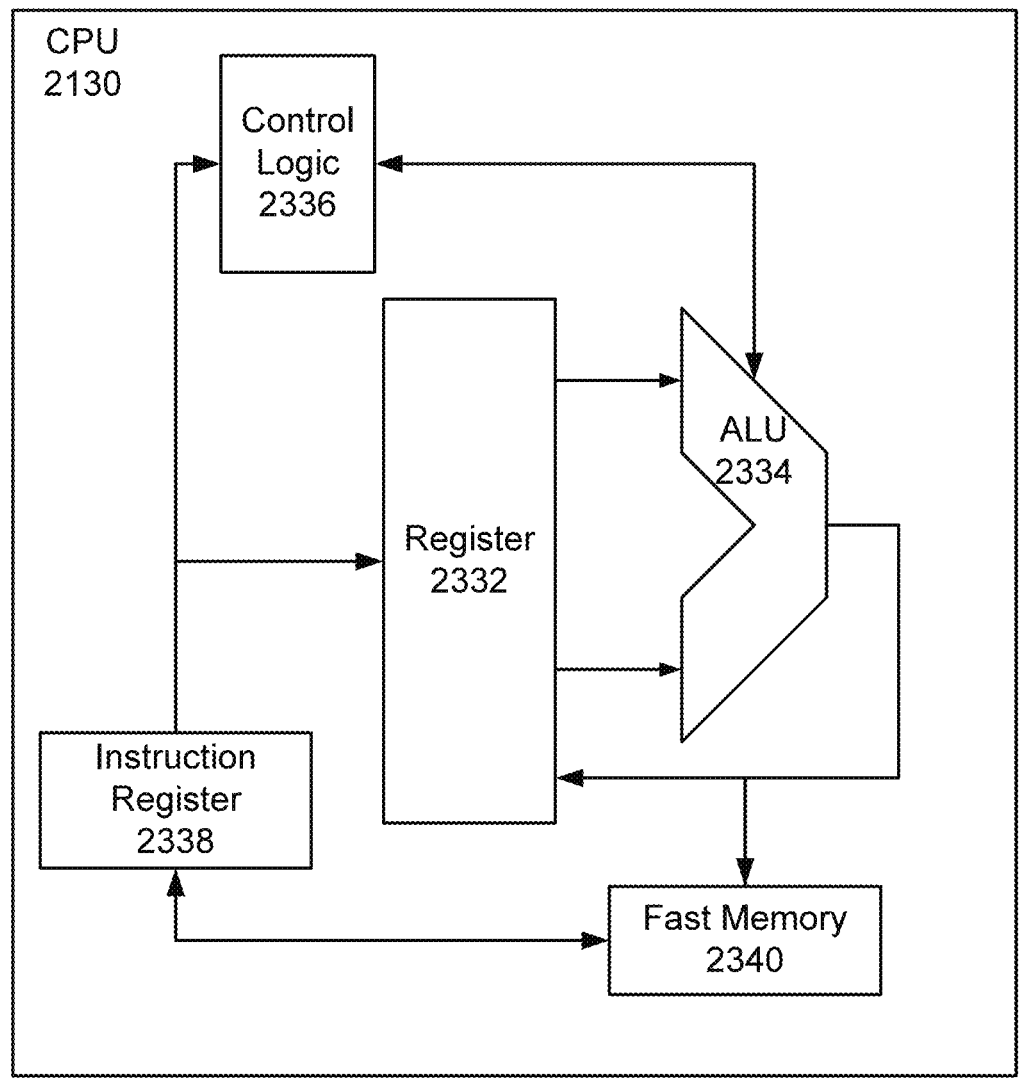
FIG. 23 is an exemplary schematic diagram of a processor used with the computing system, according to certain embodiments.

For example, FIG. 23 shows one implementation of CPU 2230. In one implementation, the instruction register 2338 retrieves instructions from the fast memory 2340. At least part of these instructions are fetched from the instruction register 2338 by the control logic 2336 and interpreted according to the instruction set architecture of the CPU 2230. Part of the instructions can also be directed to the register 2332. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 2334 that loads values from the register 2332 and performs logical and mathematical operations on the loaded values according to the instructions. The results from these operations can be feedback into the register and/or stored in the fast memory 2340. According to certain implementations, the instruction set architecture of the CPU 2230 can use a reduced instruction set architecture, a complex instruction set architecture, a vector processor architecture, a very large instruction word architecture. Furthermore, the CPU 2230 can be based on the Von Neuman model or the Harvard model. The CPU 2230 can be a digital signal processor, an FPGA, an ASIC, a PLA, a PLD, or a CPLD. Further, the CPU 2230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 22, the data processing system 2200 can include that the SB/ICH 2220 is coupled through a system bus to an I/O Bus, a read only memory (ROM) 2256, universal serial bus (USB) port 2264, a flash binary input/output system (BIOS) 2268, and a graphics controller 2258. PCI/PCIe devices can also be coupled to SB/ICH 2288 through a PCI bus 2262.

The PCI devices may include, for example, Ethernet adapters, add-in cards, and PC cards for notebook computers. The Hard disk drive 2260 and CD-ROM 2266 can use, for example, an integrated drive electronics (IDE) or serial advanced technology attachment (SATA) interface. In one implementation the I/O bus can include a super I/O (SIO) device.

Further, the hard disk drive (HDD) 2260 and optical drive 2266 can also be coupled to the SB/ICH 2220 through a system bus. In one implementation, a keyboard 2270, a mouse 2272, a parallel port 2278, and a serial port 2276 can be connected to the system bus through the I/O bus. Other peripherals and devices that can be connected to the SB/ICH 2220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 24:
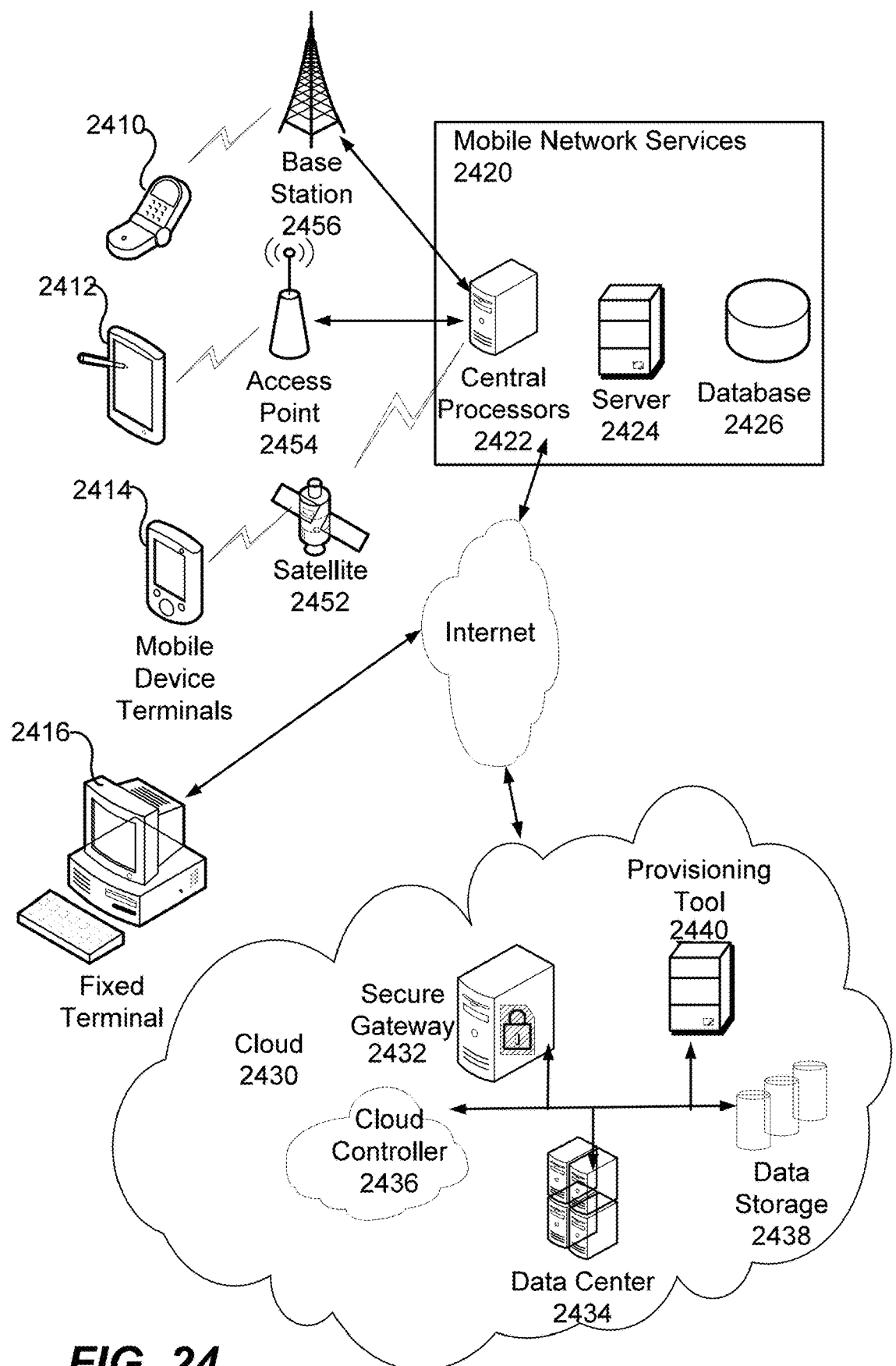
FIG. 24 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 24, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for torque control and capacitor voltage balancing of a dual three-level (3L) T-type multilevel converter connected to an open ends three-phase induction motor (OEIM) having a stator, a rotor, and first, second and third parallel phase paths, each phase path having a first end and a second end, wherein the first end is connected to a first T-type converter including two capacitors and a first plurality of silicon carbide (SiC) semiconductor switches, and the second end is connected to a second T-type converter including two capacitors and a second plurality of silicon carbide (SiC) semiconductor switches, comprising:

selecting a first set of voltage vectors, each voltage vector including a set of four possible switching states of the first plurality of SiC semiconductor switches and the second plurality of SiC semiconductor switches;

evaluating a first cost function ($J_1$) for each voltage vector of the first set of voltage vectors to generate a set of first cost functions;

minimizing the set of first cost functions;

identifying a first optimum voltage vector ($V_{opt-1}$) from the first set of voltage vectors which minimizes the set of first cost function;

identifying four redundant switching states of the first optimum voltage vector ($V_{opt}$) which minimizes the first cost function $J_j$;

evaluating a second cost function ($J_2$) using the four redundant switching states of the first optimum voltage vector ($V_{opt-1}$) which minimizes the first cost function $J_j$ and generating a set of second cost functions;

minimizing the set of second cost functions;

identifying a second optimum voltage vector ($V_{opt-2}$) having optimum switching states of the first plurality of SiC semiconductor switches and the second plurality of SiC semiconductor switches, wherein the second optimum voltage vector minimizes the second cost function $J_2$;

updating the set of four possible switching states with the optimum switching states of the second optimum voltage vector $V_{opt-2}$) which minimizes the second cost function $J_2$;

generating gating signals for the SiC semiconductor switches using the updated set of four possible switching states;

applying the gating signals to the SiC semiconductor switches to actuate the OEIM and balance the voltages of the capacitors;

wherein evaluating the first cost function $J_1$ includes:

receiving a rated torque value $T_{rated}$, a reference torque value $T^{ref}$, a rated stator flux value $\|\psi_{s\_rated}\|$, a reference stator flux value $\psi_s^{ref}$ and a flux weighting factor $K\psi$;

estimating a torque value deviation of the OEIM;
estimating a flux value deviation of the OEIM; and
calculating each first cost function $J_1$ based on:

$$J_1 = \frac{|T^{ref} - T^{k+2}|}{T_{rated}} + K_\psi \frac{|\|\psi_s^{ref}\| - \|\psi_s^{k+2}\||}{\|\psi_{s\_rated}\|},$$

for k=1 to 61, wherein minimizing the set of first cost functions generates a voltage vector which minimizes the torque value deviations and the flux value deviations of the OEIM.

2. The method of claim 1, further comprising:
measuring a voltage $V_s$ across the stator for each voltage vector;
identifying the first optimum voltage vector ($V_{opt-1}$) which minimizes the first cost function $J_1$ on the voltage $V_s$ across the stator for each voltage vector.

3. The method of claim 2, further comprising:
measuring a first set of voltages $\{V_{c1}, V_{c2}, V_{c3}, V_{c4}\}$ of the capacitors ($C_1, C_2, C_3$ and $C_4$) of the multilevel converter;
determining a set of switching states of the first optimum voltage; vector ($V_{opt-1}$)
identifying four redundant switching states of the first optimum voltage; vector ($V_{opt-1}$);
evaluating the second cost function $J_2$ for each of the four redundant switching states to generate the set of second cost; wherein
evaluating the second cost function $J_2$ is based on $J_2=|V_{C1}^{k+1}-V_{C2}^{k+1}|+|V_{C3}^{k+1}-V_{C4}^{k+1}|$ for each k =1 to 61.

4. The method of claim 3, further comprising:
identifying the second optimum voltage vector ($V_{opt-2}$) which minimizes the set of second cost functions based, on minimizing each second cost function $J_2$ for $V_s^{k+1}$, for each k=1 to 61;
generating the gating signals of the SiC semiconductor switches based on the second optimum voltage vector ($V_{opt-2}$); and
applying the gating signals to the SiC semiconductor switches to balance the capacitor voltages.

5. A system for torque control and capacitor voltage balancing of a dual three-level (3L) T-type multilevel converter, comprising:
an open ends three-phase induction motor (OEIM) having a stator, a rotor, and first, second and third parallel phase paths having first ends and second ends;
a first 3L T-type converter connected to the first ends of the first, second and third parallel phase paths and a second T-type converter connected to the second ends of the first, second and third parallel phase paths;
a first voltage source block connected to the first T-type converter and a second voltage source block connected to the second T-type converter, wherein each voltage source block includes a voltage source and a first capacitor in series with a second capacitor, wherein each voltage source block has a positive connector, a negative connector and a common connector, wherein the common connector is located at a midpoint of the series connection of the first capacitor and the second capacitor;
wherein the first T-type converter includes:
first, second and third phase legs, each phase leg including:
first and second series connected switches, wherein the first switch is connected to the common connector and the second switch is connected to the first end of one of the parallel phase paths;

a set of third switches, each third switch connected between the positive connector and the first end of the one of the parallel phase paths and a set of fourth switches, each fourth switch connected to the negative connector and the first end of the one of the phase paths;

wherein the second T-type converter includes:

first, second and third phase legs, each phase leg including:

first and second series connected switches, wherein the first switch is connected to the common connector and the second switch is connected to a second end of one of the parallel phase paths;

a set of third switches, each third switch connected between the positive connector and the second end of the one of the phase paths and a set of fourth switches, each fourth switch connected to the negative connector and the second end of the one of the phase paths;

a plurality of sensors configured to measure torque deviations in the rotor, flux deviations in the stator, and the voltages of the first and second capacitors of each voltage source block;

a control system having circuitry connected to the switches of each T-type converter and the plurality of sensors, the control system including a central processing unit (CPU) having program instructions stored within that, when executed by one or more processors of the CPU, cause the one or more processors to receive the measured torque deviations and flux deviations and generate gating signals to the first switch, the second switch and the set of third switches of each T-type converter, wherein the gating signals are configured to reduce the torque deviations in the rotor and the flux deviations in the stator of the OEIM and balance the voltages of the capacitors;

wherein the plurality of sensors include:

a plurality of voltage transducers configured to measure the voltages $V_{c1}$ and $V_{c2}$ of the first capacitors of the first voltage source block and the voltages $V_{c3}$ and $V_{c4}$ of the second capacitors of the second voltage source block and to measure a voltage $V_3$ across the stator;

an encoder configured to measure an angular speed $w_r$, of the rotor of the OEIM;

a plurality of current transducers configured to measure current in each of the phase paths;

wherein the circuitry of the control system includes:

an input/output port configured for receiving a rotor angular speed reference value $\omega_{ref}$, a flux weighting factor ($K_\psi$), a rated torque value $T_{rated}$, a rated stator flux value $\|\psi_{s\_rated}\|$, and a reference stator value $\psi_s^{ref}$;

an adder operatively connected to the input/output port and the encoder, the adder configured to subtract the angular speed $\omega_r$ of the rotor from the rotor angular speed reference value $\omega_{ref}$ and generate a difference rotor flux value;

a proportional integral derivative (PID) controller connected to the adder and configured to receive the difference rotor flux value and generate a reference torque value $T^{ref}$, wherein the one or more processors of the CPU are configured to receive the reference torque value $T^{ref}$, the reference stator flux value $\omega_s^{ref}$, and the voltages of the capacitors and execute the program instructions to generate the gating signals;

wherein the program instructions are configured to:

select a first set of voltage vectors from the voltages of the capacitors;

evaluate a first cost function $J_1$ for each voltage vector of the first set of voltage vectors to generate a set of first cost functions;

minimize the set of first cost functions;

identify a first optimum voltage vector from the first set of voltage vectors which minimizes the set of first cost functions;

identify four redundant switching states of the first optimum voltage vector which minimizes the set of first cost functions;

evaluate a second cost function $J_2$ using the four redundant switching states of the first optimum voltage vector which minimizes the first cost function $J_1$ to generate a set of second cost functions;

minimize the set of second cost functions;

identify a second optimum voltage vector which minimizes the second cost function $J_2$, wherein the second optimum voltage vector includes optimum switching states of the first and second series connected switches, the set of third switches and the set of fourth switches of the first T-type converter and the first and second series connected switches, the set of third switches and the set of fourth switches of the second T-type converter;

update the set of four possible switching states with the optimum switching states of the second optimum voltage vector which minimizes the second cost function $J_2$, wherein the control system is configured to generate the gating signals for the SiC semiconductor switches using the updated set of four possible switching states; and apply the gating signals to the switches to actuate the OEIM and balance the voltages of the capacitors.

6. The system of claim 5, wherein the CPU further comprises program instructions configured to:

receive, from the current transducers, the measured current through each of the phase paths;

receive, from the encoder, the angular speed $\omega_r$ of the rotor;

estimate a first torque value T and a first flux value ω of the OEIM from the measured currents and angular; speed $\omega_r$ of the rotor;

predict a first torque value deviation and a first flux value deviation of the OEIM;

evaluate the set of first cost functions ($J_1$) based on:

$$J_1 = \frac{|T^{ref} - T^{k+2}|}{T_{rated}} + K_\psi \frac{\|\psi_s^{ref}\| - \|\psi_s^{k+2}\|}{\|\psi_{s\_rated}\|},$$

for each voltage vector, k, of the first set of voltage vectors, where k=1 to 61; and generate a voltage vector which minimizes the torque value deviations and the flux value deviations of the three-phase induction motor.

7. The system of claim 5, wherein the CPU further comprises program instructions configured to:

identify the first optimum voltage vector which minimizes the first cost function ($J_1$) based on the voltage $V_s$, across the stator for each voltage vector.

8. The system of claim 7, wherein the CPU further comprises program instructions configured to:
evaluate each cost function ($J_2$) of the set of second cost functions based on $J_2 = |v_{C1}^{k+1} - v_{C2}^{k+1}| + |v_{C3}^{k+1} - v_{C4}^{k+1}|$; and
minimize each cost function ($J_2$) of the set of second cost functions for $V_s^{k+1}$, for each k=1 to 61, wherein minimizing the set of second cost functions balances the capacitor voltages.

9. The system of claim 5, wherein each switch is a silicon carbide (SiC) MOSFET semiconductor switch in parallel with a diode,
wherein the diodes of the first and second switches are antiparallel to each other; and
wherein the diodes of the third and fourth switches are parallel to each other.

10. A non-transitory computer readable medium having instructions stored therein that, when executed by one or more processors, cause the one or more processors to perform a method for torque control and capacitor voltage balancing of a dual three-level T-type multilevel converter connected to an open ends three-phase induction motor (OEIM) having a stator, a rotor, and first, second and third parallel phase paths, each phase path having a first end and a second end, wherein the first end is connected to a first T-type converter including two capacitors and a first plurality of silicon carbide (SiC) semiconductor switches, and the second end is connected to a second T-type converter including two capacitors and a second plurality of SiC semiconductor switches, comprising:
selecting a first set of voltage; each voltage vector including a set of four possible switching states of the first plurality and the second plurality of silicon carbide (SiC) semiconductor switches;
evaluating a first cost function ($J_1$) for each voltage vector of the first set of voltages voltage vectors and generating a set of first cost functions;
minimizing the set of first cost functions;
identifying the voltage a first optimum voltage vector ($V_{opt-1}$) from the first set of voltage vectors which minimizes the set of first cost functions;
identifying four redundant switching states of the first optimum voltage vector ($V_{opt-1}$);
evaluating a second cost function ($J_2$) using the four redundant switching states of the first optimum voltage vector ($V_{opt-1}$) and generating a set of second cost functions;
minimizing the set of second cost functions;
identifying a second optimum voltage vector the switching state ($V_{opt-2}$) having optimum switching states of the first plurality of SiC semiconductor switches and the second plurality of SiC semiconductor switches, wherein the second optimum voltage vector which minimizes the second cost function $J_2$;
updating the set of four possible switching states with the optimum switching states of the second optimum voltage vector switching state ($V_{opt-2}$) which minimizes the second cost function $J_2$;
generating gating signals for the SiC semiconductor switches using the updated set of four possible switching states;
applying the gating signals to the SiC semiconductor switches to actuate the OEIM and balance the voltages of the capacitors;
performing a two step model predictive control including:
a first step model predictive control process, including:
receiving a rated torque value $T^{rated}$, a reference torque value, $T^{ref}$, a rated stator flux value $\|\psi_{s\_rated}\|$, a reference stator flux value $\psi_s^{ref}$, and a flux weighting factor $K_{104}$;
receiving, from an encoder, a first torque value T of the rotor and a first flux value $\psi$ of the stator;
estimating a first step torque value deviation of the OEIM;
estimating a flux value deviation of the OEIM;
evaluating the first cost function ($J_1$) based on:

$$J_1 = \frac{|T^{ref} = T^{k+2}|}{T_{rated}} + K_\psi \frac{\|\psi_s^{ref}\| - \|\psi_s^{k+2}\|}{\|\psi_{s\_rated}\|},$$

for each voltage vector of the first set of voltage vectors, where k=1 to 61;
identifying a first optimum voltage vector ($V_{opt-1}$) which minimizes the first cost function ($J_1$) based on the voltage $V_s$ across the stator, for each voltage vector;
then performing a second step model predictive control process, including
determining a set of switching states of first optimum voltage vector ($V_{opt-1}$);
measuring, with a voltage transducer, a first set of voltages $\{V_{c1}, V_{c2}, V_{c3}, V_{c4}\}$ of the capacitors ($C_1$, $C_2$, $C_3$, and $C_4$) of the multilevel converter; and
evaluating the second cost function ($J_2$) based on $J_2 = |v_{C1}^{k+1} - v_{C2}^{k+1}| + |v_{C3}^{k+1} - v_{C4}^{k+1}|$ for each k for each of the four redundant switching states of ($V_{opt-1}$) to generate the set of second cost functions; and generate the set of second cost functions; and
minimizing the set of second cost functions based on minimizing each second cost function $J_2$ for $V_2^{k+1}$, for each k=1 to 61.

* * * * *